US012811640B2

(12) United States Patent
Xu et al.

(10) Patent No.: US 12,811,640 B2
(45) Date of Patent: Nov. 24, 2026

(54) HIERARCHICAL BEAMFORMER

(71) Applicants: Innophase, Inc., San Diego, CA (US); Parallel Wireless, Inc., Nashua, NH (US)

(72) Inventors: Yang Xu, San Diego, CA (US); Steven Paul Papa, Windham, NH (US); Efi Dror, Kadima-Zoran (IL); Yaniv Kaver, Kefar Seva (IL)

(73) Assignees: Innophase, Inc., San Diego, CA (US); Parallel Wireless, Inc., Nashua, NH (US)

( * ) Notice: Subject to any disclaimer, the term of this patent is extended or adjusted under 35 U.S.C. 154(b) by 449 days.

(21) Appl. No.: 18/346,192

(22) Filed: Jun. 30, 2023

(65) Prior Publication Data

US 2024/0007160 A1 Jan. 4, 2024

Related U.S. Application Data

(60) Provisional application No. 63/357,587, filed on Jun. 30, 2022.

(51) Int. Cl.
*H04B 7/06* (2006.01)
*H04B 7/08* (2006.01)

(52) U.S. Cl.
CPC .......... *H04B 7/0617* (2013.01); *H04B 7/086* (2013.01)

(58) Field of Classification Search
CPC .............................. H04B 7/0617; H04B 7/086
See application file for complete search history.

(56) References Cited

U.S. PATENT DOCUMENTS 6,266,517 B1 7/2001 Fitzpatrick et al.
6,359,504 B1 3/2002 Cozzarelli
6,934,341 B2 8/2005 Sahlman
(Continued)

FOREIGN PATENT DOCUMENTS

CN 112994733 A 6/2021
EP 3734865 A1 11/2020
(Continued)

OTHER PUBLICATIONS

International Search Report and Written Opinion for PCT/US2023/069556, Oct. 25, 2023, 1-13 (13 pages).
(Continued)

*Primary Examiner* — Natasha W Cosme
*Assistant Examiner* — Benjamin T. Ranew

(57) ABSTRACT

An apparatus and method for uplink and/or downlink beamforming operation are disclosed. In one embodiment, each of a plurality of distributed secondary beamformer processors is associated with a respective region of an antenna array and associated with a respective beamforming submatrix. Each transmit or receive beamforming submatrix contains beamforming combining weights associated with antenna elements in the respective region of the antenna array. Further, each secondary beamformer processor uses the respective beamforming submatrix and a respective set of frequency-domain IQ data points (representing user data layers for transmission, or received FDIQ data from a corresponding set of transceiver ICs) to form a respective plurality of sets of beamformed frequency-domain IQ data points.

11 Claims, 18 Drawing Sheets

(56) References Cited

U.S. PATENT DOCUMENTS

| | | | | |
|---|---|---|---|---|
| 7,034,614 | B2 | 4/2006 | Robinson et al. | |
| 7,035,323 | B1 | 4/2006 | Arato et al. | |
| 7,230,570 | B2 | 6/2007 | Thomas et al. | |
| 9,362,973 | B2 | 6/2016 | Rexberg et al. | |
| 10,243,573 | B1 | 3/2019 | Goyal et al. | |
| 10,263,330 | B2 * | 4/2019 | Martikkala | H01Q 21/00 |
| 10,367,261 | B2 | 7/2019 | Webb et al. | |
| 10,389,411 | B2 | 8/2019 | Noam et al. | |
| 10,756,443 | B1 | 8/2020 | Struhsaker et al. | |
| 11,018,416 | B2 | 5/2021 | Bisiules et al. | |
| 11,158,942 | B1 | 10/2021 | Scott et al. | |
| 11,956,058 | B1 | 4/2024 | Abdelmonem | |
| 12,027,771 | B2 | 7/2024 | Shi | |
| 2002/0048326 | A1 | 4/2002 | Sahlman | |
| 2004/0263249 | A1 | 12/2004 | Leffel et al. | |
| 2005/0012665 | A1 | 1/2005 | Runyon et al. | |
| 2005/0017802 | A1 | 1/2005 | Robinson | |
| 2005/0110567 | A1 | 5/2005 | Rabinovich et al. | |
| 2005/0287978 | A1 | 12/2005 | Maltsev et al. | |
| 2006/0244675 | A1 | 11/2006 | Elliot et al. | |
| 2011/0134972 | A1 | 6/2011 | Zhu et al. | |
| 2012/0155572 | A1 | 6/2012 | Kim et al. | |
| 2013/0116011 | A1 | 5/2013 | Lee et al. | |
| 2014/0210666 | A1 * | 7/2014 | Maltsev | H01Q 3/40 343/893 |
| 2014/0269785 | A1 | 9/2014 | Branlund et al. | |
| 2014/0370823 | A1 | 12/2014 | Yu | |
| 2016/0072605 | A1 | 3/2016 | Kruecker et al. | |
| 2016/0197660 | A1 | 7/2016 | O'Keeffe et al. | |
| 2016/0240922 | A1 | 8/2016 | Veihl et al. | |
| 2016/0352010 | A1 | 12/2016 | Haskell et al. | |
| 2017/0063590 | A1 | 3/2017 | Dhananjay et al. | |
| 2017/0085005 | A1 | 3/2017 | Aue et al. | |
| 2017/0262398 | A1 | 9/2017 | Lugo et al. | |
| 2018/0048063 | A1 | 2/2018 | Hallivuori | |
| 2018/0059215 | A1 | 3/2018 | Turbiner et al. | |
| 2018/0359018 | A1 | 12/2018 | Ling | |
| 2019/0020400 | A1 | 1/2019 | Ling et al. | |
| 2019/0089434 | A1 | 3/2019 | Rainish et al. | |
| 2019/0349783 | A1 | 11/2019 | Barker et al. | |
| 2020/0220613 | A1 | 7/2020 | Rutt et al. | |
| 2020/0241590 | A1 | 7/2020 | Elgaard et al. | |
| 2020/0274591 | A1 | 8/2020 | Kumar et al. | |
| 2020/0336289 | A1 | 10/2020 | Deng et al. | |
| 2021/0297131 | A1 | 9/2021 | Xu et al. | |
| 2021/0314008 | A1 | 10/2021 | Törmänen et al. | |
| 2021/0376837 | A1 | 12/2021 | Jacquet et al. | |
| 2021/0391904 | A1 | 12/2021 | Jam et al. | |
| 2022/0013921 | A1 | 1/2022 | Xu et al. | |
| 2022/0233174 | A1 | 7/2022 | Hwang | |
| 2023/0026148 | A1 | 1/2023 | Livneh et al. | |
| 2023/0155652 | A1 | 5/2023 | Pianka | |
| 2025/0063586 | A1 * | 2/2025 | Huang | H04B 7/0456 |

FOREIGN PATENT DOCUMENTS

| | | | |
|---|---|---|---|
| JP | 2007532031 | A | 11/2007 |
| WO | 2019098897 | A1 | 5/2019 |
| WO | 2024007025 | A1 | 1/2024 |

OTHER PUBLICATIONS

International Search Report and Written Opinion for PCT/US2023/085926, May 3, 2024, 1-10 (10 pages).

International Search Report and Written Opinion for PCT/US2023/085923, Apr. 4, 2024, 1-10 (10 pages).

International Search Report and Written Opinion for PCT/US2023/085924, May 6, 2024, 1-12 (12 pages).

International Search Report and Written Opinion for PCT/US2023/069562, Oct. 19, 2023, 1-11 (11 pages).

International Search Report and Written Opinion for PCT/US2023/069558, Nov. 2, 2023, 1-13 (13 pages).

International Search Report and Written Opinion for PCT/US2023/069557, Nov. 2, 2023, 1-9 (9 pages).

International Search Report and Written Opinion for PCT/US2023/069561, Oct. 23, 2023, 1-10 (10 pages).

International Search Report and Written Opinion for PCT/US2023/069560, Oct. 24, 2023, 1-11 (11 pages).

Fulton, Caleb , et al., "Digital Phased Arrays: Challenges and Opportunities", Proceedings of the IEEE, vol. 104, No. 3, Mar. 1, 2016, 487-503 (17 pages).

Zhou, Xiaoping , et al., "A Manifold Learning Two-Tier Beamforming Scheme Optimizes Resource Management in Massive MIMO Networks", IEEE Access, vol. 8, Jan. 6, 2020, 22976-22987 (12 pages).

* cited by examiner

HIERARCHICAL BEAMFORMER

CROSS-REFERENCE TO RELATED APPLICATIONS

This application claims the benefit of U.S. Provisional Application No. 63/357,587, filed Jun. 30, 2022, naming Yaniv Kaver, Efi Dror, Jongheon Kim, and Robert Irvine as inventors, entitled "Hierarchical Beamformer", the entirety of which is hereby incorporated herein by reference for all purposes.

BACKGROUND

The present disclosure relates to the field of telecommunications, and more specifically to a distribution of signals for transmission over antenna radiating elements. It may find applications in the field of wireless communications such as 2G/3G/4G, LTE, LTE Advanced, and 5G, and the like.

This section is intended to introduce the reader to various aspects of art, which may be related to various aspects of the present disclosure that are described and/or claimed below. This discussion is believed to be helpful in providing the reader with background information to facilitate a better understanding of the various aspects of the systems and methods described herein. Accordingly, it should be understood that these statements are to be read in this light, and not as admissions of prior art.

SUMMARY

Embodiments described herein include a hierarchical beamformer apparatus having a primary beamformer processor and a set of secondary beamformer processors. In these embodiments, the primary beam processor assigns beamforming combining weights (in combination with precoder combining weights, as appropriate) to form the full beamforming matrix, and then distributes portions of the beamforming matrix to respective secondary beamformer processors. In some embodiments, the transceiver integrated circuits (ICs) may be partitioned according to their physical location on the panel, with each set of transceiver ICs or transceiver IC subarrays in a given partition being serviced by and interconnected with a corresponding secondary beamformed processor, where the secondary beamformer processors may in some embodiments be distributed across the panel to be adjacent to or within the partition. Each distributed secondary beamformer processor may perform transmit beamforming, receive beamforming, or both. In the transmit direction (i.e., downlink or DL), the secondary beamformer receives the frequency-domain subcarrier in-phase and quadrature (IQ) user data layers, and applies the respective distributed beamforming weights to the IQ user data layers to calculate the fully beamformed IQ data points for distribution to its respective partitioned subset of transceiver ICs or transceiver IC subarrays. In the receive direction (i.e., uplink or UL), the secondary beamformer receives the frequency-domain subcarrier IQ data packets from the transceiver ICs, and applies the respective distributed receive beamforming weights to the IQ received packets to calculate one or more partially beamformed IQ data packets and forwards them to the primary receive beamformer where the partially beam-formed IQ data is combined with the other partially beamformed packets from the other secondary receive beamformers. In some embodiments, the secondary receive beamformers each calculate one partially beamformed packet per receive data layer. In other embodiments each partially beamformed packets may correspond to separately tilted beams. Embodiments of the secondary beamformer processors may include digital signal processor circuitry executing software instructions to perform matrix multiplication operations, or may take the form of data registers interconnected with hardware multiplier circuits to perform the matrix operations.

According to embodiments described herein an apparatus comprises: a primary receive beamformer processor; a plurality of distributed secondary receive beamformer processors connected to the primary receive beamformer processor, the plurality of distributed secondary receive beamformer processors being physically distributed so that each distributed secondary receive beamformer processor is positioned within or adjacent to a respective region of an antenna array associated with a respective one of a plurality of receive beamforming submatrices, each receive beamforming submatrix containing receive beamforming combining weights associated with antenna elements in the respective region of the antenna array; and a plurality of sets of transceiver integrated circuit (IC) subarrays connected to the plurality of distributed secondary receive beamformer processors, wherein: (i) each set of transceiver IC subarrays is connected to a corresponding one of the plurality of distributed secondary receive beamformer processors and is positioned within the respective region of the antenna array associated with the corresponding distributed secondary receive beamformer processor, and (ii) each distributed secondary receive beamformer processor is configured to receive one or more respective sets of frequency-domain IQ data points from the corresponding set of transceiver IC subarrays, and to use the respective set of frequency-domain IQ data points and the respective receive beamforming submatrix to form a respective plurality of sets of receive partial beamformed frequency-domain IQ data points, and to transmit the respective plurality of sets of receive partial beamformed frequency-domain IQ data points to the primary receive beamformer processor.

In some embodiments, the primary receive beamformer processor is configured to combine corresponding sets of receive partial beamformed frequency-domain IQ data points received from all of the plurality of distributed secondary receive beamformer processors to form a plurality of fully beamformed frequency domain subcarrier IQ user data layers. Further, in some embodiments, the primary receive beamformer processor is configured to partition a receive beamforming matrix of beamforming combining weights into the plurality of receive beamforming submatrices, and to transmit each respective receive beamforming submatrix to a corresponding one of the plurality of distributed secondary receive beamformer processors.

In some embodiments, each distributed secondary receive beamformer processor is further configured to form the respective plurality of sets of partial beamformed frequency domain IQ points by applying the receive beamforming combining weights of the respective receive beamforming submatrix to the respective set of frequency domain IQ data points. The respective plurality of sets of receive partial beamformed frequency-domain IQ data points represent, in some embodiments, a respective plurality of partial beamformed frequency-domain subcarrier IQ user data layers.

In some embodiments, each distributed secondary receive beamformer processor comprises a packet processor configured to use the respective plurality of sets of receive partial beamformed frequency domain IQ data points to form a corresponding plurality of receive partial beamformed frequency-domain IQ data packets for transmission to the primary receive beamformer processor. In this regard, in some embodiments, the corresponding plurality of receive partial beamformed frequency domain IQ data packets have headers indicating at least component carrier information. Further, in some embodiments, each distributed secondary receive beamformer processor comprises serial data interface circuits for communicating with each transceiver IC or with each transceiver IC subarray in the corresponding set of transceiver ICs or IC subarrays.

Additionally, in some embodiments, the apparatus further comprises: a transmit primary beamforming processor; and a plurality of distributed secondary transmit beamformer processors connected to the transmit primary beamforming processor, wherein the primary transmit beamformer processor and the primary receive beamformer processor are implemented in a signal processor circuit, a Field Programmable Gate Array (FPGA), or the like, and wherein the plurality of distributed secondary transmit beamformer processors and the plurality of distributed secondary receive beamformer processors comprise a plurality of distributed secondary beamformer processors, each distributed secondary beamformer processor performing both transmit and receive beamforming operations.

According to embodiments described herein a method comprises: receiving, at each of a plurality of distributed secondary receive beamformer processors connected to a primary receive beamformer processor, a respective set of frequency-domain IQ data points from a corresponding one of a plurality of transceiver integrated circuits (ICs) or sets of transceiver IC subarrays, wherein the plurality of distributed secondary receive beamformer processors are physically distributed so that each distributed secondary receive beamformer processor is positioned within or adjacent to a respective region of an antenna array associated with a respective one of a plurality of receive beamforming submatrices, each receive beamforming submatrix containing receive beamforming combining weights associated with antenna elements in the respective region of the antenna array, and wherein the corresponding set of transceiver IC subarrays is positioned within the respective region of the antenna array associated with the distributed secondary receive beamformer processor; using, by each distributed secondary receive beamformer processor, the respective set of frequency-domain IQ data points and the respective receive beamforming submatrix to form a respective plurality of sets of receive partial beamformed frequency-domain IQ data points; and transmitting, by each distributed secondary receive beamformer processor, the respective plurality of sets of receive partial beamformed frequency-domain IQ data points to the primary receive beamformer processor.

In some embodiments, the method further comprises combining, by the primary receive beamformer processor, corresponding sets of receive partial beamformed frequency-domain IQ data points received from all of the plurality of distributed secondary receive beamformer processors to form a plurality of frequency domain subcarrier IQ user data layers. In some embodiments, using, by each distributed secondary receive beamformer processor, the respective set of frequency-domain IQ data points and the respective receive beamforming submatrix to calculate the respective plurality of sets of partial beamformed frequency domain IQ data points includes applying the receive beamforming combining weights of the respective receive beamforming submatrix to the respective set of frequency domain IQ data points. Also, in some embodiments, the respective plurality of sets of receive partial beamformed frequency domain IQ data points represent a respective plurality of partial beamformed frequency-domain subcarrier IQ user data layers.

Further, in some embodiments, the method comprises partitioning, by the primary receive beamformer processor, a receive beamforming matrix of beamforming combining weights into the plurality of receive beamforming submatrices, and to convey each respective receive beamforming submatrix to a corresponding one of the plurality of distributed secondary receive beamformer processors. The weights may be conveyed through control plane messages containing the weights, or containing beamforming indices pointing to predetermined beamformer weights stored at the secondary beamformer. In some embodiments, the corresponding plurality of receive partial beamformed frequency domain IQ data packets have headers indicating at least component carrier information.

Additionally, in some embodiments, each distributed secondary receive beamformer processor comprises serial data interface circuits for communicating with each transceiver IC or with each transceiver IC subarray of a corresponding set of transceiver IC subarrays.

References in the specification to "one embodiment," "an embodiment," "an example embodiment," and the like indicate that the embodiment described may include a particular feature, structure, or characteristic; but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

DETAILED DESCRIPTION

Figure 1:
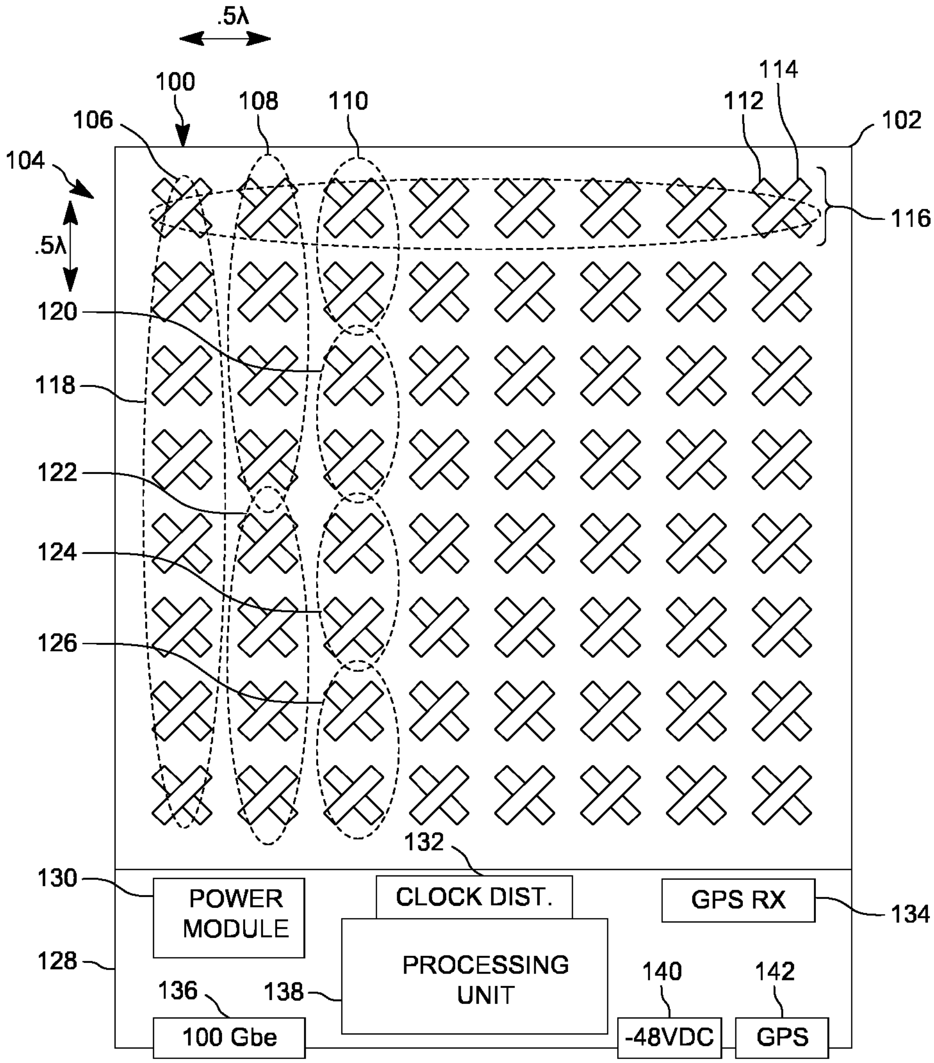
FIG. 1 depicts one embodiment of an active antenna array assembly, or active antenna unit (AAU)

FIG. 1 depicts an antenna array assembly 100, in accordance with some embodiments. As depicted, the antenna array assembly 102 has a grid of radiating elements (also referred to herein as antenna elements or antenna radiating elements) generally arranged in rows (e.g., a row 104) and columns (e.g., a column 100) on a panel 102, which may be a printed circuit board (PCB) or other suitable support structure for the radiating elements. Locations within the grid, such as a location 116, may have collocated radiating elements such as elements 112 and 114, to provide different radiating polarizations, typically referred to as horizontal and vertical polarities, or equivalently, plus 45 degrees)(+45° and minus 45 degrees)(−45°. The grid of radiating elements may be arranged in a regular array pattern as shown in FIG. 1. In one embodiment the radiating elements are positioned at approximately ½ wavelength (λ) distance apart, where the wavelength λ is associated with the desired frequency operating range of the antenna array, which may be associated with a carrier frequency of the system or, more generally, a center frequency of the system, especially in embodiments employing a frequency division duplex system (FDD) utilizing multiple carrier frequencies. Some embodiments may operate within multiple frequency bands, and in one such embodiment, an array such as that shown in FIG. 1 may be configured to operate within a first band using a first frequency with wavelength $\lambda_1$, and to operate in a second frequency band having a wavelength $\lambda_2=2\lambda_1$. In such an embodiment, operation in the first band ($\lambda_1$) may utilize adjacent antenna radiating elements spaced apart by distance $0.5\lambda_1$ as shown, but for operation in the second, lower frequency band (having wavelength $\lambda_2$), elements spaced two apart (e.g., every other row, or every other column) have a spacing of $0.5\lambda_2$, and therefore may be used for operation in the second frequency band.

Although the antenna array panels may be configured with more antenna pairs (e.g., 128, 194, 256, 512, etc.) or even fewer antennas (e.g., 32, 16, etc.), the specific array of FIG. 1 depicts 64 horizontal radiating elements and 64 vertical radiating elements that are pair-wise collocated and arranged in an 8×8 square configuration on a panel approximately 35-40 centimeters by 35-40 centimeters, where the radiating elements are spaced approximately 4.3 centimeters apart. The antenna array assembly 100 also includes a circuit board assembly 128 including a power module 130, a clock distribution circuit 132, a global positioning satellite (GPS) receiver 134, a processor circuit 138 for performing, inter alia, packet protocol processing, and in some embodiments, beamforming, a network data interface 136, power supply connector 140 and GPS connector 142.

In various embodiments as described herein below, the radiating elements may be grouped into subarrays such as the column subarray 106 having eight vertical radiating elements and eight horizontal radiating elements, or smaller subarrays such as grouping 108 and 122 each having four horizontal and four vertical elements, or groupings 110, 120, 124, 126, each having two vertical and two horizontal radiating elements. In some embodiments, antenna subarrays may comprise a two-dimensional set of elements, such as four cross-polarized radiating elements arranged in a square configuration, or six cross-polarized pairs arranged in a 2×3 grid. Alternatives include a set of two or more adjacent vertical polarized elements forming one antenna element subarray, and the corresponding set of vertical polarized elements of the cross-polarized pairs forming a separate subarray. In a further embodiment each cross-polarized pair of radiating elements may be individually driven array elements.

Each subarray of radiating elements may be driven by a radio frequency (RF) signal generated by a set of transceivers located adjacent to the antennas. As used herein, the term "antenna subarray" refers to a grouping of radiating elements that are positioned in a corresponding array pattern that are functionally interrelated primarily according to their connections to a corresponding set of cooperative RF transceiver integrated circuits (ICs) that are used to process the RF signals associated with the radiating elements of the antenna subarray. In such a case, the transceiver circuits comprise a set, or group, of serially-connected transceiver integrated circuit packages (referred to hereinafter as "transceiver ICs"), that have a first transceiver IC connected via a serial data connection (or "link") to a beamformer processor, and a series of point-to-point serial data connections between the transceiver ICs, where, in some embodiments, the data path terminates at the last transceiver IC of the group. In an alternative embodiment, the transceiver ICs may be interconnected in a ring configuration where the last transceiver IC in the chain may be connected either back to the beamformer processor with an additional serial data connection, or may be connected to the last transceiver IC in a separate subarray chain of serially-connected transceiver ICs.

Note that in some embodiments, a given group of transceiver ICs in a transceiver IC subarray (i.e, a set of serially-connected transceiver ICs) that is associated with a corresponding antenna subarray may be capable of processing independent RF signals for each radiating element. Thus, as used herein, the term "antenna subarray" refers to that set of antenna elements (of a possibly larger antenna element array) that is associated with a given set of transceiver ICs. In some embodiments described herein, a group of radiating elements may act in a coordinated fashion by transmitting the same or similar RF signals (or set of RF signals for H and V polarizations) with possible phase differences between them so as to achieve a desired radiation pattern for beamforming, antenna tilt, or similar directionality.

Figure 2:
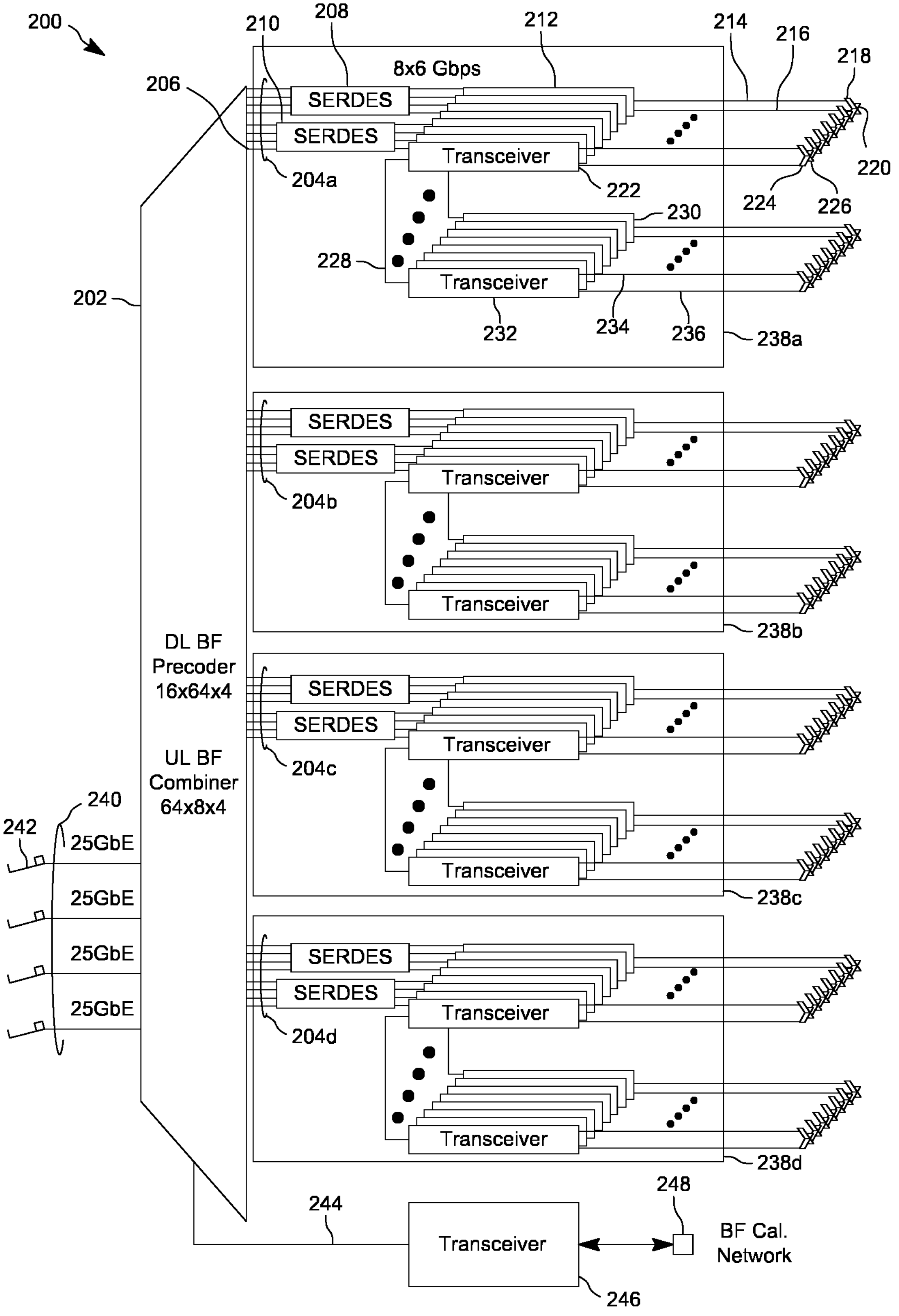
FIG. 2 depicts a radio unit architecture having a plurality of groups of serially connected transceivers used to process RF communication signals associated with corresponding groups of antenna radiating elements, in accordance with some embodiments.

FIG. 2 depicts a radio unit architecture having a plurality of groups of serially-connected transceivers used to process RF communication signals associated with corresponding groups of antenna radiating elements, in accordance with some embodiments. As shown in FIG. 2, each serially-connected transceiver IC group contains at least two serially-connected transceiver ICs being physically arranged in a transceiver IC subarray. Specifically, transceiver IC 222, which is connected to the beamformer processor 202 over serial data link 206, is also serially connected to transceiver IC 232 via full-duplex serial data link 228, thereby forming a vertically-oriented transceiver IC subarray along a column of the panel array, such as grouping 110. Similarly, transceiver IC 212 is connected to transceiver IC 230, forming another transceiver IC subarray.

Each serial data link from the beamformers (primary and/or secondary) and the transceiver ICs, and, for embodiments using IC subarrays, between transceiver ICs (e.g., 228), utilizes a Serdes (SERializer/DESerializer) transceiver or set of Serdes transceivers to establish the point-to-point links. In one embodiment, each transceiver IC includes two such Serdes transceivers. Alternatively, a higher number of Serdes devices may be included to provide a higher level of interconnectivity among the transceiver ICs. The Serdes may be implemented as low-voltage I/O transceivers that utilize a standard serial data signaling format, such as 2-level pulse-amplitude-modulated (PAM2) non-return to zero (NRZ) differential signal transmitted on a pair of conductors. PAM3 and PAM4-based signaling is also suitable. Higher level protocols may be used in combination with the physical layer SERDES, such as PCIe (Peripheral Component Interconnect Express), or USB (Universal Serial Bus), etc. The serial data connections may include multi-lane links (multiple serial data connections working in parallel in each link). In one embodiment, a data rate of 6 G bits-per-second (Gbps) PAM2 is sufficient to convey aggregated signal-port IQ data packets (including headers), as well as to provide additional throughput capacity for transmitting control-plane messaging to the transceiver ICs. Serial link data rates may be selected to accommodate the data packets to and from the individual transceiver IC subarrays according to the desired deployment, including a desired number of independent signal ports, a desired number of component carriers, multi-band operation (thereby adding further carriers), FDD or TDD, the number of transceiver ICs connected in the transceiver IC subarray, etc.

Additionally, in some embodiments, each serial data link between the beamformer processor 202 and a given transceiver IC or transceiver IC subarray, as well as serial data links serially interconnecting individual transceiver ICs within the given transceiver IC subarray, may have sufficient data rates to accommodate data packets carrying IQ data that is in either the frequency domain or the time domain. In this regard, each transceiver IC or IC subarray may, e.g., (i) receive/transmit an aggregated frequency-domain IQ data packet to/from the beamformer processor if frequency-to-time domain conversion (on the transmit DL side) and time-to-frequency domain conversion (on the receive UL side) is carried out at an individual transceiver IC (e.g., via the iFFT (inverse fast-Fourier Transform) and FFT (Fast Fourier Transform) processing, respectively) or (ii) receive/transmit an aggregated time-domain IQ data packet to/from the beamformer processor if frequency-to-time domain conversion (on the transmit DL side) and time-to-frequency domain conversion (on the receive UL side) is instead carried out at the beamformer processor (e.g., via the iFFT and FFT processing, respectively).

As one illustration of a serial link date rate, one symbol of a 100 Mhz OFDM 5G carrier with 30 KHz subcarrier spacing would be transmitted in a 33.33 microsecond (μsec) time window. The data rate required for such a transmission on two signal ports (e.g., separate signals for H and V polarizations), having 3,300 subcarriers, with 2 samples per subcarrier (I/Q), having, e.g., 12 bits/sample, results in 2*3,300*2*12=158.4 kbps for each of 14 OFDM symbol time slots, 14 of which will be transmitted in a 0.5 millisecond transmission slot, resulting in a net required data rate of 158.4k*14 bits/0.5 millisceonds=4.43 Gbps. If **8*b*-10*b*** encoding is used on the serial data links, and an additional 10% is added for packet header and protocol overhead, then a throughput of approximately 1.1*4.43*10/8 Gbps=6.1 Gbps would be required per carrier, for a dual signal port. In some embodiments, a serial data transmission capacity of 6.1 Gbps for each transceiver IC is sufficient. For transceiver IC subarray, (i.e., a set of serially-linked transceiver ICs) 6.1 Gbps is still sufficient for many deployment scenarios. For other embodiments having independently controlled signal ports at each transceiver IC, a total throughput on the order of 12 Gbps, or even 20 Gbps is sufficient for most applications and configurations as described herein, although 30 Gbps may be achieved if desired for certain other embodiments.

For a lower-capacity deployment, a lower serial data rate is sufficient. For example, a dual polarized 20 MHz 4G LTE data signal, utilizing a size 2,048 FFT, occupying a 66.67 μsec transmission slot time window, requires a data throughput of: 2 ports*1,200 subcarriers×2 (I/Q samples/subcarrier)×12 (bits/sample)/66.67 μsec window=1,200×2×12×/66.67 μsec=approximately 864 Mbps. If the data rate is increase by 10/8 to accommodate 8 b-10 b encoding, and 10% for overhead, the data rate is approximately 1.2 Gbps.

In a further embodiment of the transceiver IC serial data ports, a four-wire interface may be used to double the data rate. Alternatively, so-called ensemble NRZ (ENRZ) signaling, using correlated signals in the form of vector signal codes, may be sent over the four wires to carry 3 bits/baud (i.e., per signaling interval), resulting in a tripling of the data rate (at the same baud rate) rather than a mere doubling. Thus, using a 7.5 G baud/sec signaling rate, data throughput of 22.5 Gbps may be reliably achieved across the distances from the beamformer to the transceiver IC subarrays. As a further alternative, PAM4 signaling may be used (in combination with NRZ or ENRZ signaling), or other vector signal formats (e.g., correlated NRZ (so-called CNRZ-5), using correlated signals to convey 5 bits over six wires) to provide increased data throughput without large increases in signaling baud rates.

In its entirety, FIG. 2 depicts a total of 8 columns of transceiver ICs, each column having 8 transceiver ICs for a total of 64 transceiver ICs, where each transceiver IC is configured to process two separate transmit signals (e.g., different RF signals on H and V signal ports) and two separate receive signals (H/V signal ports). However, because in the embodiment of FIG. 2, the first two rows of 8 transceiver ICs are pair-wise connected, these 16 transceiver ICs form a single "row" 238*a* of 8 transceiver IC groups, also referred to herein as transceiver IC subarrays. Similarly, the other transceiver ICs are grouped into 3 more "rows" (238*b*, 238*c*, 238*d*) of 8 transceiver subarrays each, for a total of 8 columns×4 rows of transceiver IC groups (32 transceiver IC subarrays). In physical dimensions, each column is the width associated with a single collocated cross-polarized antenna, but each "row" of transceiver IC groups encompasses two rows of cross-polarized antenna elements.

Figure 4:
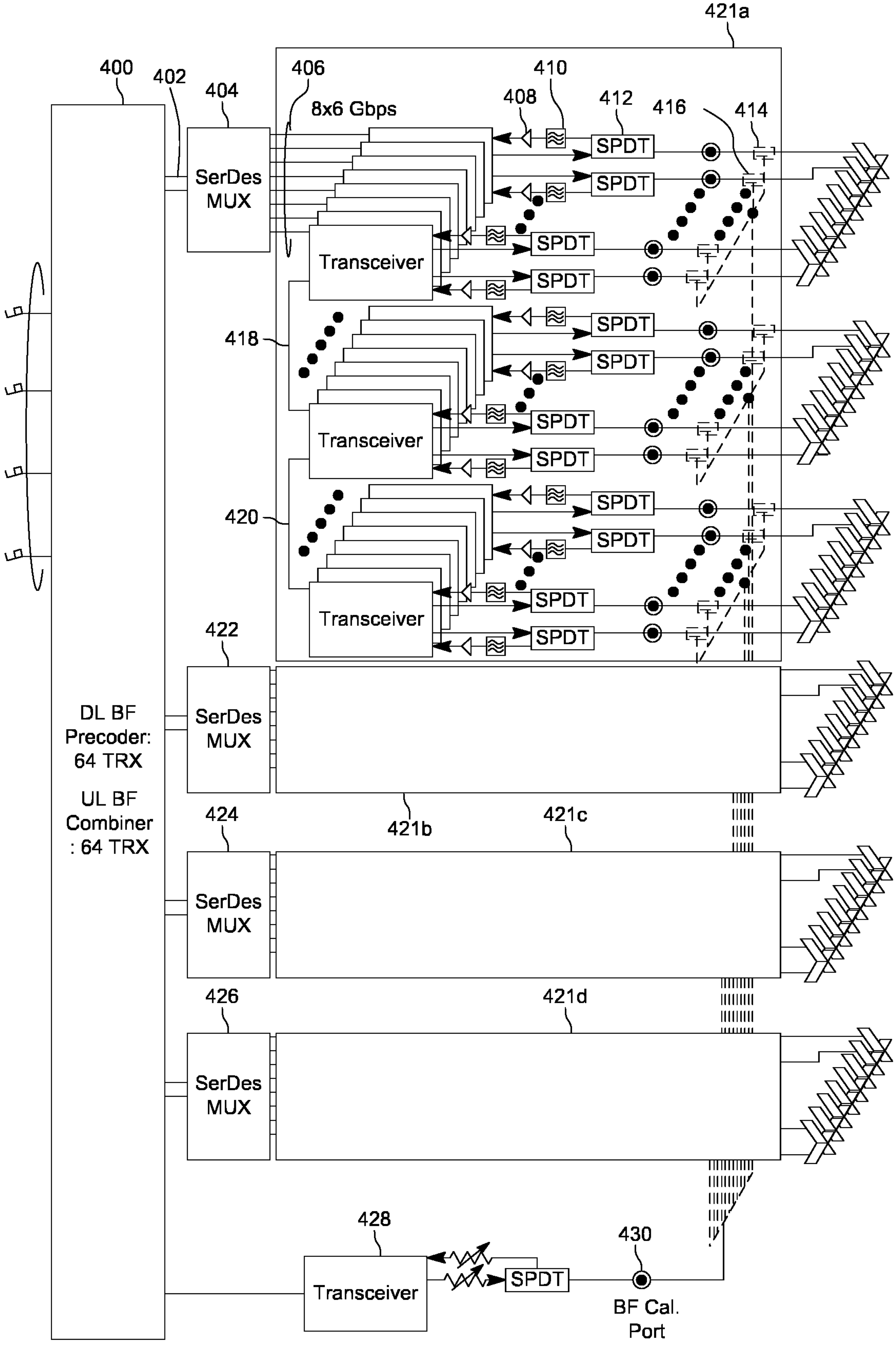
FIG. 4 is an alternative embodiment of a radio unit architecture having a hierarchical data distribution topology to the respective groups of serially connected transceivers.

FIG. 4, described further herein below, also depicts 32 transceiver IC subarrays in an 8×4 transceiver IC subarray configuration. However, each transceiver IC subarray comprises three serially-connected transceiver ICs. Note that the transceiver IC subarrays are positioned element-wise adjacent to corresponding radiating antenna elements arranged in a corresponding antenna subarray. In some embodiments, the transceiver IC subarrays are positioned on the backside of the antenna array panel 102, but still adjacent (i.e., in close proximity) to the respective radiating elements used to transmit and/or receive the RF communication signals associated with the given transceiver IC. In some embodiments, the transceiver ICs may be coupled to the radiating elements through vias, intermediate structures, and/or circuits, such as transmit and receive filters mounted on the panel, or on subpanels positioned behind the structure supporting the array(s) of antenna radiating elements.

Element-wise adjacency refers to the relative positioning of the transceiver IC subarrays and the corresponding antenna subarrays being superimposed with each other, such that each individual transceiver IC of the given transceiver IC subarray is positioned in a region of the panel 102 associated with the corresponding antenna radiating elements of the antenna array or subarray that will be used to transmit and receive the signals associated with that individual transceiver IC.

As a further example of element-wise adjacency, in some embodiments, such as a frequency division duplex (FDD) system, two transceiver ICs (one dedicated for generating two transmit (HN) signals at a transmit frequency, the other for processing two receive (HN) signals at the receive frequency) may form a transceiver IC subarray that is associated with an antenna subarray consisting of a single collocated cross-polarized antenna. In a dual-band FDD configuration, four transceiver ICs may be linked as a transceiver subarray and positioned adjacent to an antenna subarray consisting of a single collocated cross-polarized antenna.

The feature of element-wise adjacency provides for a distributed transceiver IC architecture that allows the amplified transmit RF signals generated by each given transceiver IC to suffer very little power loss or noise degradation as it traverses the very short physical connection from the transceiver IC to the radiating elements. In some embodiments, different ratios of transceiver ICs and radiating elements may be pair-wise adjacent, such as two transceiver ICs may be placed adjacent to each set of three cross-polarized elements, etc.

Throughout this description, many embodiments are depicted utilizing transceiver ICs (e.g., 212, 222, 230, 232, etc.) that include two independent full-duplex transceivers comprising two transmitters/amplifiers and two independent receivers, each transceiver associated with an RF signal port (e.g., 214 or 216) that is interconnected to a respective antenna radiating element (e.g., 218, 220, respectively). Thus, in one embodiment, a single transceiver IC comprises an integrated circuit having two full transceivers that transmit and receive two independent RF signals, configured such that one RF signal port (tx/rx) is associated with an H-polarized signal port (e.g., 214) and one RF signal port (tx/rx) is associated with a V-polarized signal port (e.g., 216)). In such embodiments, each transceiver IC may be referred to as a 2T2R transceiver IC, and may be associated with a pair of collocated cross-polarized radiating elements. As illustrative examples, each cross-polarized pair of radiating elements (218, 220); (224, 226); and (234, 236) is associated with a respective single transceiver integrated circuit, such as transceiver IC 212 associated with cross-polarized radiating elements (218, 220), transceiver IC 222 associated with elements (224, 226), and transceiver IC 232 associated with elements (234, 236).

In other embodiments, the transceiver ICs may each be configured to provide, e.g., four separate analog RF transmit and receive paths through four independent signal ports (4T4R). Such embodiments may include dual PLLs for generating carrier frequencies of both a transmit carrier and a receive carrier for full utilization of the transceiver IC when operating in an FDD signaling mode. The specific number of transceivers contained within a given transceiver IC may depend on such factors as total desired output power of the panel, the use of additional external power amplifiers, FDD or TDD operation, the data carrying capacity of the serial data links that provide interconnections between the transceiver ICs, as well as many other factors.

More generally with reference to FIG. 2, the circuitry of Radio Unit 200, all of which may be deployed within a single active antenna panel assembly, includes a high-throughput packet-based interface 252 to a base station or Distributed Unit (DU) (not shown). The interface 252 may comprise a plurality of separate physical network interfaces, such as four separate 25 Gbit ethernet links provided over fiber optic cables using small form factor pluggable (SFP) modules 242, or quad SFP (QSFP) modules. The ethernet protocol, the CPRI/eCPRI protocols, or similar protocols may be used to convey data across the interface 240. The beamformer processor (BFP) 202 performs precoding and beamforming operations for downlink transmit data, and responsively generates aggregated signal-port IQ data packets for transmission to the respective transceiver IC subarrays, as further described below with reference to FIGS. 8, 9 and 10. In some embodiments, the IQ data packets may contain frequency-domain IQ values for subcarriers within an OFDM (Orthogonal Frequency Division Multiplexing) communication system, such as LTE, or 5G, communication systems. In other embodiments, the IQ data packets may instead contain time-domain IQ values representing the sum of the subcarriers within the OFDM communication system. In the uplink direction, the BFP 202 performs beamformer combining to obtain the virtual beamformed antenna port signals, and further combining to recover user data layers, as further described below with respect to FIG. 11.

In the embodiment depicted in FIG. 2, the beamformer processor 202 is connected to each transceiver IC subarray via a serial data link such as link 206. Depending upon the length of the data links, depicted as 4 sets 204*a*, 204*b*, 204*c*,

204*d* of 8 links each, each data link may utilize a Serdes repeater/retimer, 208, 210, to extend the range of the serial data link from the BFP 202 to the regions of the panel 102 where the given transceiver IC subarrays (and corresponding antenna subarray elements) are located. In an alternative embodiment shown in FIG. 4, the BFP 400 is connected to a set of transceiver IC subarrays over a high-speed Serdes link 402, whereupon a Serdes multiplexer (MUX) 404 (and respective high-speed links to Serdes MUXs 422, 424, 426) de-multiplexes (i.e., separates) the high-rate serial data streams into lower-rate serial data streams 406 directed to each individual transceiver IC subarray. The Serdes MUX devices 404, 422, 424, 426 perform the reverse multiplexing operation for uplink data being conveyed from the transceiver IC subarrays to the BFP 202.

Referring to FIG. 2, one example transceiver IC subarray comprises transceiver IC 222 and transceiver IC 232, which are coupled via serial data link 228. These two transceiver ICs are located adjacent to their respective antenna radiating elements 224, 226 and 234, 236, respectively. In some embodiments, they are placed on one side of a PC board, in close proximity to the antenna elements, and electrically connected using a thru-via, or by intermediate circuit elements such as a filter, biplexer, quadriplexer, SPDT (single-pole double-throw) TDM switch, etc. As shown in FIG. 2, each transceiver IC generates two separate RF transmit downlink (DL) signals for H and V polarities, and receives and process two separate RF uplink (UL) signals. Also depicted is an observation transceiver 260 connected to the BFP 202 by serial data link 256, with the RF signal connections 258 being interconnected with each transceiver over a calibration network.

Figure 3:
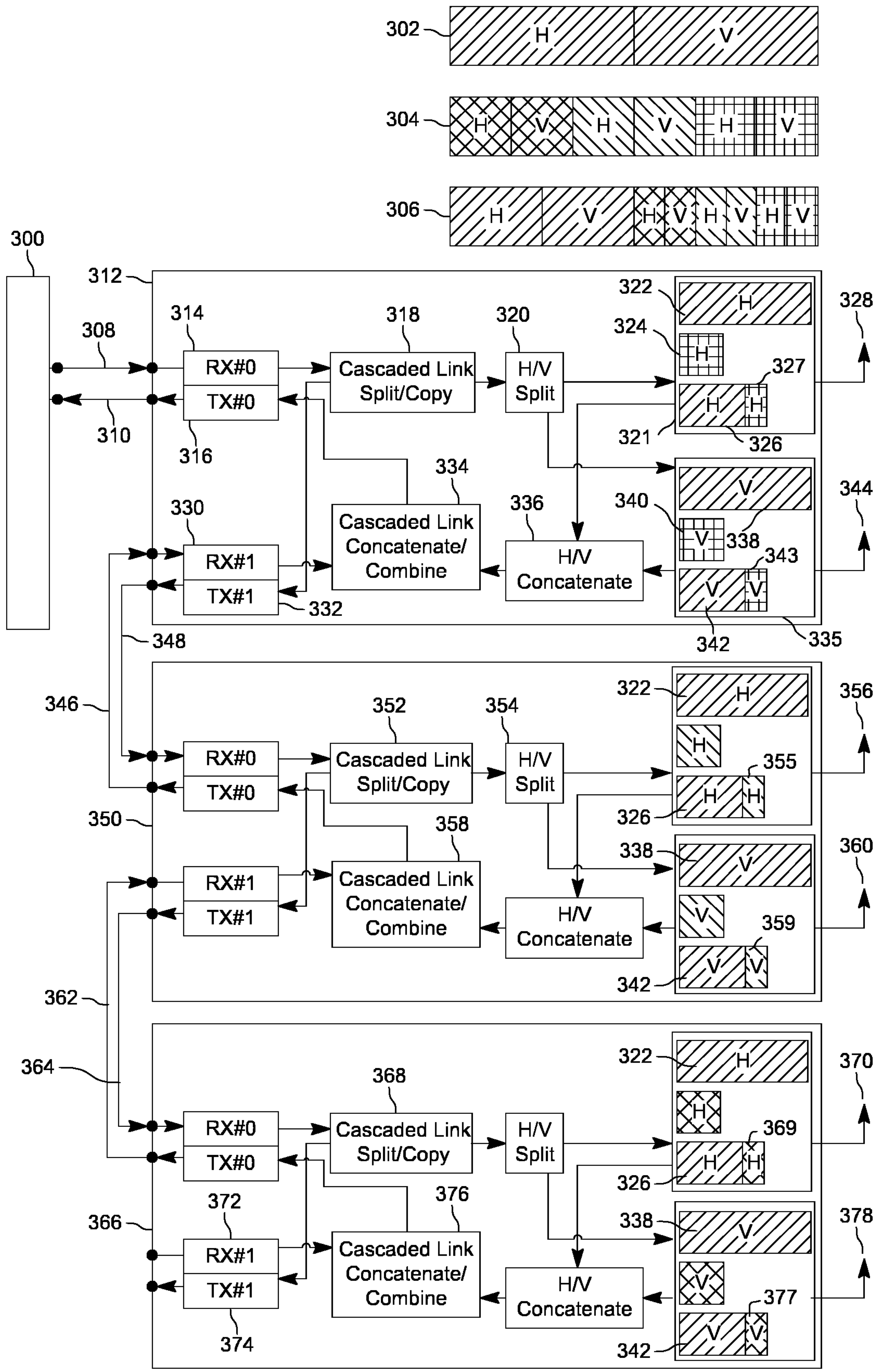
FIG. 3 depicts one such group of serially-connected transceivers where incoming packets for transmission are received at a first transceiver and are propagated through serial data connections to the other transceivers in the group and where incoming RF signals are processed and packetized for forwarded back along the serial transceiver chain, in accordance with some embodiments.

FIG. 3 depicts one such group of serially-connected transceivers that would be placed in a transceiver IC subarray position, element-wise adjacent to antenna radiating elements of a corresponding antenna subarray positioned within the antenna panel array 102. Incoming packets for DL transmission are received over serial data link 308 from the BFP at a first transceiver IC 312, and at least some of the packets are propagated through serial data connections 348, 364 to the other transceiver circuits in transceiver ICs 350, 366 in the transceiver group. Similarly, incoming RF signals on the UL are processed and packetized for forwarding back along the serial data transceiver IC chain 362, 346, 310. In this embodiment, each transceiver IC is configured to process two separate transmit signal paths and two separate receive signal paths, through two separate signal ports, typically associated with two corresponding antenna radiating elements. The transceiver subarray of FIG. 3, operating in a TDD mode, is configured such that transceiver IC 312 transmits and receives RF signals on the first signal port 328, and transmits and receives RF signals on the second signal port 344. Similarly, transceiver IC 350 is associated with signal ports 356 and 360, while transceiver IC 366 is associated with signal ports 370 and 378.

As previously described, the two transceiver signal ports for a transceiver IC may be interconnected to a single set of cross-polarized antenna elements. For TDD operation, this provides 2T2R (two transmit, and two receive) signal processing capacity. In an alternative embodiment, the two signal ports may each be connected to corresponding radiating elements in two different cross-polarized antenna pairs, e.g., where a first transceiver of the transceiver IC processes transmit and receive signals for a vertical polarized element of first cross-polarized radiating element pair, while the second transceiver of the same transceiver IC processes transmit and receive signals for the vertical polarized element of a second cross-polarized radiating element pair. A second transceiver IC may then be used to process signals associated with the two horizontal-polarized elements of the two cross-polarized pairs.

In further alternative embodiments, the output of each signal port may be split and connected to a plurality of radiating elements in parallel, such as one signal port being connected in parallel to the vertical polarized radiating elements of two (or three, etc.) cross-polarized pairs, and the other signal port being connected in parallel to the horizontal polarized radiating elements of the same two (or three, etc.) cross-polarized pairs. In still further embodiments described herein below, the amplified RF signals generated by a transceiver IC, or by a plurality of transceiver IC's, maybe provided to additional amplifier stages external to the transceiver IC, and/or combined, before being provided to the radiating element(s).

In some embodiments, frequency domain I/Q data packets are transmitted to sets of serially-connected transceiver ICs distributed on an active antenna panel. The aggregated data packets are a superposition of frequency domain subcarrier-specific data, typically representing allocated resource blocks (RBs) across many data layers and possibly many users, with different beamforming weights applied, and thus contain fully beamformed (including MIMO precoding when used) subcarrier IQ sample data for a designated band, component carrier and signal port. Each IQ data packet may have a single header, but nonetheless include concatenated or interleaved data for multiple signal ports, such as for H and V signal ports. Such packets may be referred to as a dual-signal port packets. In some embodiments, the packet header may include identification data associated with a particular transceiver IC, and may include IQ data for any number of signal ports that are processed by that transceiver IC, and may generally be referred to as multi-signal port data.

The user-aggregated frequency domain data of packet 302 in FIG. 3, indicates a frequency domain IQ data packet that is commonly processed by the transceiver ICs in a given transceiver IC subarray. Packet 302 may include a header (not shown, for clarity) that identifies various aspects of the type of data contained in the packet, as well as packet identification data such as one or more of: a frequency band ID, a component carrier ID, a signal port ID, and/or a transceiver ID. The primary payload data in the packets 302 comprise subcarrier-specific IQ data for a signal port (without limitation, a horizontal-polarized RF signal for, e.g., a specific component carrier, labeled "H" in FIG. 3). The same packet (or, in some embodiments, a separate packet with a separate header and ID data fields), includes subcarrier IQ data for a second signal port (e.g., a vertical-polarized RF signal for, e.g., the same component carrier, labeled "V" in FIG. 3). In numerous embodiments described herein, a single transceiver IC is configured to process two separate signal port IQ packets, and the corresponding IQ data for the two signal ports may be combined in a single packet with a single header, and may be referred to herein from time to time as a "dual signal port packet". The packet 302 is depicted as concatenated IQ data sets for subcarriers of the H polarized signal port, and for the V polarized signal port, but the IQ data may also be interleaved, such as an IQ sample pair for the H signal port, and a pair for the V signal port, for subcarrier 1, followed by IQ pairs for H and V for subcarrier 2, etc. Each I and Q sample may be represented as some number of bits, such as 12, 14 or 16, etc., depending upon the desired signal resolution. A packet 302 may contain IQ sample data for a number of subcarriers such as 612,

1,596, 3,276, or more, subcarriers, for each signal port, for specific carriers, and frequency bands.

Note that aggregated beamformed IQ data packets communicated over serial data connections (links) from/to a BFP (beamformer processor) and between and among transceiver ICs may contain either frequency-domain IQ data or time-domain IQ data. In this regard, it should be noted that packet data transmissions of aggregated beamformed frequency domain IQ data packets over the serial data connections from/to the BFP and between and among transceiver ICs is more efficient than packet data transmissions of aggregated beamformed time-domain IQ data. In particular, frequency-domain IQ data specifies in-phase and quadrature (IQ) values for specific subcarriers that are to be used in the transmission (and reception) of data in a given communication system. However, for DL signals, such as in a OFDM communication system (e.g., LTE or 5G communication system), prior to converting frequency-domain IQ data to time-domain digital data via iFFTs, zero values may need to be inserted in the IQ data set to account for unused subcarriers within a given component carrier (e.g., subcarriers used as guard bands), thereby resulting in a time domain sequence of converted IQ data having many more IQ data points that need to be conveyed to the transceiver ICs/transceiver IC subarrays (e.g., originally conveyed from the BFP and then distributed accordingly between the transceiver ICs in a given transceiver IC subarray). Similarly, for UL signals, frequency-domain IQ data processed via FFTs may exclude frequency domain values for unused subcarriers, whereas the equivalent time-domain IQ data associated with unused subcarriers is a constituent part of the time-domain IQ data that may not be removed prior to transmission of the time-domain data over the serial data connections as described herein.

In this regard, depending on a bandwidth of a given communication channel, an increase in an efficiency of communicating frequency-domain IQ data over the corresponding time-domain IQ data may be of relative importance. By way of example, for a 20 MHz-wide LTE channel, a ratio of unused subcarriers to data-modulated subcarriers will be larger than a similar ratio for a 100 MHz-wide LTE channel. Accordingly, it becomes more efficient to communicate subcarrier-specific IQ data in the frequency-domain rather than in time domain. More specifically, as discussed above, even if a subset of subcarriers remains unused (not modulated/loaded with data), time-domain representation of those subcarriers will still result in complex time-domain samples, thereby increasing the amount of data that needs to be transmitted over serial data links. Additionally, serial data links between the BFP and transceiver IC subarrays, as well as serial data links interconnecting individual transceiver ICs in a given transceiver subarray, may have limited data-carrying capacity (e.g., how much data can be communicated over those links per given period of time (data rate)). Hence, in some embodiments, it may be more desirable to carry out IQ packet data transmissions from/to the BFP and between and among transceiver ICs in the frequency domain.

Nonetheless, various embodiments of the signal processing methods and apparatus described herein may utilize time-domain IQ data packets instead. More particularly, in some embodiments, a beamformer processor (BFP) (e.g., the BFP 202, 300, 400, etc.) may be configured to include digital signal processing architecture (e.g., iFFT and FFT processing elements) to transmit and receive time-domain IQ data packets from/to transceiver ICs/transceiver IC subarrays. For instance, in some embodiments, the beamformer processor may include a digital signal processor (DSP) configured with suitable programming instructions to execute algorithms for IFFT and FFT operations.

The transceiver subarray depicted in FIG. 3 is one of many such subarrays on a panel, and each serially-connected transceiver IC group receives a unique data stream of the aggregated signal-port (or dual-signal-port, or multi-signal-port) IQ data packets. Recall that each serially-connected transceiver IC group has at least two serially-connected transceiver ICs, and is physically arranged in a transceiver IC subarray. The transceiver IC subarray, in turn, is positioned element-wise adjacent to corresponding radiating antenna elements arranged in a corresponding antenna subarray.

Transceiver IC 312 receives the unique data stream of aggregated signal-port IQ data packets at the serial port receiver 314 and provides the data to split-copy register 318 for further processing. In one embodiment, the split-copy register 318 is a packet header processor configured to examine the packet header to determine if the IQ data is intended for processing by its corresponding transceiver IC, and if so forwards the packet to the signal-port split processor 320. The signal-port split processor 320 (also labeled HN Split) identifies packets or portions of packets that are destined for different signal ports within the transceiver IC, and which may be H and V polarized signals, or other configurations as described herein. The signal-port split processor 320 may be implemented as a register that performs a memory write operation to a digital signal processor (DSP) memory space integrated within the transceiver IC 312. In addition, the split-copy register 318 may determine that the same packet should also be forwarded to the next transceiver IC in the transceiver IC subarray for processing by one or more of the serially-connected transceiver IC's. To reduce latency, the packet header processor, or split-copy register, 318 need not buffer an entire signal-port IQ data packet prior to making a determination to forward the packet to the next transceiver IC by sending the data to serial data transmitter 332 for transmission over serial link 348. In further embodiments, the packet header processor 318 may be configured to operate in transparent mode, where all packets are both saved for local processing and forwarded without header inspection out the second serial transceiver.

With respect to the signal-port packet format 302, the aggregated IQ signal-port packet is forwarded to each transceiver IC using the split-copy circuits 318, 352, 368, and is commonly processed by each transceiver IC. Note that transceiver IC 366 is the last transceiver IC in the chain, and in the embodiment shown, split-copy register 368 forwards packets to the corresponding signal-port split processor, but serial transceiver 372/374 is unused.

Each transceiver IC, in turn, processes the packet by first separating IQ data for a first signal port (H IQ data 322) and the second signal port (V IQ data 338), and providing the data to the transmitters within transceivers 321 and 335, for conversion to the time domain via inverse fast-Fourier Transform (iFFT). As described earlier, the individual IQ port-specific data may be conveyed in separate packets, in which case, the signal port data may be directly stored for further processing without the need for any separation or deinterleaving. The iFFT processing and subsequent time domain processing generates an aggregated signal-port discrete time-domain baseband data signal, followed by conversion to amplified radio frequency (RF) signals at ports 328, 344. The transmitters of the transceivers 321, 335, which will be more fully described with respect to FIGS. 12A and 13A, include a DSP for calculating iFFTs, frequency domain and time domain signal processing elements (cyclic prefix addition, phase and gain adjustments, frequency offsets, filtering and sample rate conversions, Crest Factor Reduction (CFR), Digital pre-Distortion (DPD), etc.), as well as RF modulation and amplification circuits in the form of a multi-phase carrier generator and digital power amplifier. Note that, in alternative embodiments involving, e.g., communication of aggregated signal-port/user IQ data packets in the time domain (as mentioned above), the iFFT processing may be carried out at the beamformer processor instead of the transceiver IC itself.

Hence, some embodiments may include a method comprising: receiving a unique data stream of aggregated signal-port IQ data packets at each serially-connected transceiver IC group of a plurality of serially-connected transceiver IC groups, each serially-connected transceiver IC group comprising at least two serially-connected transceiver ICs being physically arranged in a transceiver IC subarray and positioned element-wise adjacent to corresponding radiating antenna elements arranged in a corresponding antenna subarray; within each serially-connected transceiver IC group, forwarding at least a subset of the aggregated signal-port IQ data packets from a first transceiver IC to a next serially-connected transceiver IC; and at each transceiver IC of the at least two serially-connected transceiver ICs within each serially-connected transceiver IC group: processing at least some of the aggregated signal-port IQ data packets with the transceiver IC's integrated Inverse Fast Fourier Transform (IFFT) processor to convert the aggregated signal-port IQ data packets to an aggregated signal-port discrete time-domain baseband data signal; converting the aggregated signal-port discrete time-domain baseband data signal to an amplified modulated radio frequency signal using the transceiver IC's integrated digital power amplifier and multi-phase carrier generator; and, transmitting the amplified modulated radio frequency signal on at least one of the corresponding adjacent radiating antenna elements.

Further, some embodiments may include an apparatus comprising a plurality of transceiver IC subarrays, each transceiver IC subarray comprising: a first transceiver IC having (i) a first serial digital data port providing a serial data connection to a beamformer processor, the first serial digital data port configured to receive a unique data stream of aggregated signal-port IQ data packets; and, (ii) a second serial digital data port; and, a second transceiver IC having a third serial digital data port connected to the second serial data port of the first transceiver IC and providing a serial data connection to the first transceiver IC. The first and second transceiver ICs may be physically arranged in a transceiver IC subarray and positioned element-wise adjacent to a plurality of radiating antenna elements arranged in an antenna subarray. The first transceiver IC of each transceiver IC subarray may further include a packet processor configured to forward at least a subset of the aggregated signal-port IQ data packets received from the beamformer processor to the respective second transceiver IC. The first and second transceiver ICs may each include a digital signal processor configured to perform an Inverse Fast Fourier Transform (IFFT) to convert the aggregated signal-port IQ data packets to an aggregated signal-port discrete time-domain baseband data signal; time domain processing circuitry configured to convert the aggregated signal-port discrete time-domain baseband data signal to an oversampled signal-port discrete time-domain data signal; and an integrated digital power amplifier and multi-phase carrier generator configured to convert the oversampled signal-port discrete time-domain data signal to an analog modulated radio frequency signal.

When receiving uplink (UL) signals, the receiver portions of transceivers 321, 335, perform frequency down conversion and analog-to-digital conversion, followed by further time-domain processing (e.g., sample rate conversion, quadrature error correction, filtering, frequency offset corrections, cyclic prefix detection and removal, etc.) followed by FFT conversion to frequency domain IQ data values for each of a plurality of subcarriers in an OFDM signal. Thus, in the receive mode of operation, the transceiver ICs are generating the IQ data packets 322, 338 depicted in FIG. 3, from received RF signals.

In one embodiment, the transceiver IC includes a Digital Signal Processor (DSP) that not only performs all of the iFFT calculations to generate the downlink (DL) transmit time-domain signal port signals, but also processes received uplink (UL) data samples via FFTs to generate receive frequency-domain IQ data signals associated with each of the signal ports. With respect to an embodiment associated with packet structure 302, the UL frequency domain IQ data from each signal port may first be concatenated into a single packet of the format of packet 302, with an H and V portion, representing the locally-generated UL receive frequency-domain IQ information at the transceiver IC. But as receive IQ packets are conveyed along the transceiver IC subarray, the receive UL frequency domain IQ packets received over the serial data link from another transceiver IC in the subarray may be combined with the local-generated receive IQ data before transmission to the next transceiver IC. Specifically, when transceiver IC 350 receives an UL IQ packet on link 362 from transceiver IC 366, UL IQ packet processor 358 combines the received IQ data with its locally-generated UL IQ data. As described more fully herein, the combination may involve a sample-by-sample addition (i.e., for each subcarrier, the I data samples are added, and the Q samples are added), or the I and Q data of one packet may have a phase rotation added prior to combining. In turn, the combined UL IQ data packet received on link 346 via Serdes receiver 330, is further combined with locally-generated UL IQ data from transceivers 321 and 335, stored in UL signal-port IQ data concatenator 336. In this manner, for the embodiment associated with packet data format 302, the amount of receive data transmitted along the links 362, 346, 310, remains the same for each serial data link along the transceiver IC subarray.

In a further embodiment, a method comprises: receiving modulated RF signals at a plurality of signal ports of each transceiver IC in a subarray of serially connected transceiver ICs, generating one or more frequency domain digital data packets of subcarrier IQ data associated with each signal port by demodulating each modulated RF signal from each signal port using an FFT processor within the respective transceiver ICs, forming a plurality of combined frequency domain digital data packets from the transceiver ICs using a set of serial data links between the transceiver ICs of the subarray of serially connected transceiver ICs, and transmitting the plurality of combined frequency domain digital data packets from the subarray of transceiver ICs to a beamformer processor.

In some embodiments, each transceiver IC may be configured to processes signals from two signal ports, such as from a cross-polarized antenna elements, or set of parallel-connected elements. Other embodiments may use transceiver ICs having four separate signal ports. In each embodiment, a given signal port may receive multiple modulated carriers (each have a set of subcarriers), and the demodulated frequency domain data may be packetized according to the component carrier from which it was received. Thus, the one or more frequency domain digital data packets of subcarrier IQ data associated with each signal port may be packetized along with header information identifying the signal port (such as a signal port id), a component carrier (such as a component carrier id), as well as additional identifying information (e.g., a subcarrier subset id for use in multi-tier beamforming). Each transceiver IC may participate in forming the plurality of combined frequency domain digital data packets by receiving frequency domain digital data packets of subcarrier IQ data from a neighboring transceiver IC via the serial data link, and combining it with its own locally-generated frequency domain digital data packets of subcarrier IQ data. Depending on the location of a given transceiver IC with the transceiver IC subarray, some transceiver ICs will actually receive a partially-formed combination of frequency domain digital data packets.

For an embodiment associated with packet structure 304 (note that headers are not illustrated, for clarity), six separate signal-port packets may be provided to the transceiver IC subarray, from which six independent transmit signals may be generated. In general, the AAU system's capability to generate independent RF transmit signals from separate digital IQ data associated with each radiating element is referred to herein as full-dimensional beamforming. In this embodiment, representing a full-dimensional digitally beamformed signal, all six packets are received at transceiver IC 312 over link 308 at receive Serdes 314 and provided to split-copy processor 318. The split-copy processor 308 inspects the packet headers and forwards a first set of two signal port packets (the right-most HN portions 324, 340, of format 304) to signal-port split processor 320 for transmission processing of IQ data 324 by transceiver 321 (for port 328), and of IQ data 340 by transceiver 335 (for port 344), and forwards the remaining four packets to Serdes transmitter 332. The next transceiver IC 350 receives the four packets over link 348 at its Serdes receiver, and split-copy processor 352 performs packet header analysis to forward two signal-port packets to its signal-port split processor 354 within 350, and the remaining two packets to the Serdes transmitter (TX #0 of transceiver IC 350) for transmission over link 364 to transceiver IC 366. Signal-port split processor 354 provides the H and V signal port IQ data to its transceivers for transmission on signal ports 356, 360, respectively. Transceiver IC 366 receives and processes the remaining two IQ data packets in a similar manner for transmission on ports 370, 378. Note that the amount of serial data decreases along the transceiver IC subarray for DL IQ data packets. In this embodiment, the receive processing does not involve any UL IQ packet data combining. Rather, the packets are merely retransmitted from each transceiver IC (using UL IQ packet processor 358 and UL IQ packet processor 334 for the concatenation/retransmission), such that all six receive UL signal-port IQ packets are conveyed to beamformer processor over link 310 (the packets may be formatted with individual headers, or may be conveyed as concatenated payload with a single header). Note that the amount of data increases as the packets on link 362 from transceiver IC 366 are concatenated with the IQ data from transceiver IC 350 at UL IQ packet processor 358 for transmission over link 346. The amount of data again increases over link 310 as UL IQ data 340 and 324 from UL signal-port IQ data concatenator 336 are concatenated by UL IQ packet processor 334.

In some embodiments, full dimensional beamformed packets that are unique to each signal port may be provided for smaller bandwidth signals, such as 20 MHz data bandwidths. This may be desirable in certain deployments where an AAU panel has been configured with lower rate serial data connections in the transceiver IC subarrays. Thus, even systems having lower speed serial data interconnects can support a full control of signal port signals (and corresponding radiating elements) by concatenating the separate IQ data of the interconnected transceiver IC's, and extracting the relevant data set at each IC. This will allow for support of MU-MIMO in the vertical plane with much higher precision, and support use-cases associated with airborne drones (either drones having data connectivity as a user within the system, or by blocking interference from high elevation interfering drones).

In a third embodiment of the antenna array system, a multi-tier beamforming signaling scheme may be used to provide data transmission and reception. In this embodiment, some transmit IQ data packets are processed commonly among a plurality of transceiver ICs to achieve a first level of beamforming resolution, while additional sets of IQ data packets are distributed to each of the transceiver IC subarrays, where each packet of a given additional set of transmit IQ packets is processed among fewer (or even one) transceiver IC in the transceiver IC subarray, to obtain a second, higher resolution level of beamforming. Specifically, data format 306 provides a combination of beamforming resolutions, whereby two signal-port IQ data packets (e.g., the first two H and V portions of 306, 326, 342) are processed for transmission by each of the transceiver ICs 312, 350, and 366 in a manner similar to the signal processing described above with respect to packet format 302. Because the same IQ data is transformed and transmitted by multiple corresponding radiating elements in a subarray, these IQ data packets, referred to herein as "commonly-processed" IQ data result in a first tier of beamforming resolution, where the beams are formed as a result of the phased-signal contributions emanating from the other subarrays (i.e., inter-subarray beamforming). But in addition, a further set of six signal port IQ data packets (the three additional sets of H/V data of 306) are distributed across the given transceiver IC subarray in a manner similar to the signal processing described above with respect to packet format 304 for full-digital beamformed data. These additional packets are specific to a given signal port and/or transceiver IC, and provide unique IQ data streams for transmission by each individual signal port in the given transceiver IC subarray, thereby providing for transmission and reception of a second tier of beamforming resolution. Specifically, where the beams are formed as a result of the phased-signal contributions emanating from other transceiver ICs within the given subarray, as well as the phased-signal contributions emanating from other transceiver ICs within other transceiver IC subarrays (i.e., second tier beamforming from both intra-subarray beamforming as well as inter-subarray beamforming).

The multi-tier beamforming having packets of the form 306 shown in FIG. 3, and as further described hereinbelow with respect to FIGS. 12, 13A and 13B, utilizes the processing of two separate signal-port IQ packets indicated to be combined for transmission on the same signal port, such as IQ data 326 and IQ data 327 (and, similarly, 342, 343). In one embodiment, the separately beam-formed IQ packets may include the IQ data points for different subcarriers within a single component carriers set of subcarriers. Thus, each transceiver IC may form its own unique combined set(s) of IQ data points for its respective signal ports prior to iFFT processing. Specifically, transceiver IC 312 combines, via concatenation, IQ data 326 and 327 for transmission on signal port 328, while combining IQ data 342 with IQ data 343 for transmission on signal port 344. Transceiver IC 350, the next transceiver IC in the transceiver IC subarray, combines IQ data 326 (the same as that processed by transceiver 321 of transceiver IC 312) with signal port IQ data 355, and combines IQ data 342 (the same commonly-processed IQ data as that processed by transceiver 335 of transceiver IC 312) with signal port IQ data 359. Similar unique concatenated combinations are shown in transceiver IC 366, where IQ signal-port data packets 326 and 342, are combined with unique signal-port IQ data 369, 377, respectively. Within the transceiver IC subarray, the commonly-processed IQ packets 326 and 342 provide for the first-tier beamforming component contributed by the subarray, while the additional sets of IQ packets distributed within the transceiver IC subarray provide the second-tier beamforming components associated with that subarray.

In a further embodiment, the separate IQ packets may have overlapping subcarriers, in which case the transceiver IC processing includes forming a weighted average of the overlapping subcarriers prior to iFFT processing. In such embodiments, the beamformer processor may convey one or more weights for the transceiver ICs to use when forming the combinations of IQ transmit data for the overlapping subcarriers.

Thus, in one embodiment, multi-tier transmit beamforming comprises receiving a first-tier beamformed IQ packet and a plurality of second-tier beamformed packets at a plurality of transceiver ICs of a transceiver IC subarray over serial data connections interconnecting the transceiver ICs; and at each transceiver IC: forming a multi-tier beamformed packet by combining the first-tier beamformed IQ packet with at least one of the second-tier beamformed packets of the plurality of second-tier beamformed packets; generating a time domain signal from the multi-tier beamformed packet; transmitting a multi-tier beamformed signal by transmitting respective amplified radio frequency time domain signals from the transceiver ICs of the transceiver IC subarray via a corresponding adjacent antenna element subarray.

In some embodiments, the multi-tier beamformed packets are formed by combining, via concatenation, IQ samples of separate subcarriers followed by processing the packet with the same iFFT operation. In other embodiments, the multi-tier beamformed packets are formed by combining overlapping subcarriers using weights provided via management plane messages, followed by processing by the same iFFT operation.

In yet a further embodiment, the IQ packets that convey data used for the second-tier beamforming may be associated with subcarriers of a separate component carrier. In such an embodiment, the additional higher-resolution beamformed data may be processed independently using a separate iFFT prior to combining the time domain signals of the two tiers of beamformed signals. Thus, in one embodiment, multi-tier transmit beamforming comprises receiving a first-tier beamformed IQ packet and a plurality of second-tier beamformed packets at a plurality of transceiver ICs of a transceiver IC subarray over serial data connections interconnecting the transceiver ICs; and at each transceiver IC: converting the first-tier (commonly-processed) beamformed IQ packet to a time domain signal and separately converting, via a separate iFFT, at least one of the second-tier beamformed IQ packets of the plurality of second-tier beamformed IQ packets to a time domain signal; combining the two time domain signals to form a signal-port specific multi-tier beamformed time domain signal; transmitting a multi-tier beamformed signal by transmitting amplified radio frequency time domain signals generated from the respective signal-port specific multi-tier beamformed time domain signals from the transceiver ICs of the transceiver IC subarray via a corresponding adjacent antenna element subarray. Multiple transceiver IC subarrays and their counterpart antenna element subarrays cooperatively generate the multi-tier beamformed signals.

In multi-tier beamforming using the distribution of multi-tier IQ packet data among each of a plurality of transceiver IC subarrays, one set of users may be served by aggregated IQ signal-port packets that are copied and forwarded for processing by each transceiver IC along a given transceiver IC subarray, resulting in a first level of beamforming resolution (as determined, for example, by an overall number of unique independent signal-port IQ packet streams sent to an overall number of corresponding transceiver IC subarrays, for processing by each transceiver IC). But in addition, a separate set of users may be served by a higher resolution of beamforming, by distributing additional signal-port specific IQ data packets along the transceiver IC subarray for separate processing by each individual transceiver IC (i.e., not commonly-processed IQ data).

In many embodiments, note that the commonly-processed IQ packets of the multi-tier beamforming signal processing are unique to the particular transceiver IC subarray. In some scenarios, however, to achieve certain desired beam radiation patterns (i.e., those with an even lower degree of beamforming resolution), some commonly-processed IQ packets may be the same for two or more transceiver IC subarrays.

The receive UL signal processing for multi-tier beamforming is also a hybrid of the UL receive signal processing described above, where IQ data combining may be performed for a first pair of signal port IQ packets, and IQ data concatenation may be performed for additional sets of independent UL signal port IQ data packets. Thus, the first-tier beamforming is performed by each transceiver IC participating in forming the UL combined frequency domain digital data packets by receiving frequency domain digital data packets of subcarrier IQ data from a neighboring transceiver IC via the serial data link, and combining it with its own locally-generated frequency domain digital data packets of subcarrier IQ data. The second tier beamformer processing involves conveying the UL receive IQ packets along the transceiver IC subarray without combination, but rather via concatenation (sample-wise or packet-wise, so as to not alter the IQ samples).

In some embodiments configured as an array of N×M transceiver ICs comprising a set of N transceiver IC subarrays each having M serially-connected transceiver ICs, the multi-tier beamforming may be characterized by processing a first set of aggregated beam-formed frequency-domain IQ user data according to a first tier of a beamforming resolution to generate N unique beamformed IQ data packets (or sets of packets, such as an IQ data set for each signal port (e.g., H and V) within a transceiver IC), each for distribution to a respective one of the N transceiver IC subarrays, while also processing a second set of beam-formed aggregated frequency-domain IQ user data sets according to a second tier of beamforming resolution to generate N different sets of M unique beam-formed IQ data packets (or sets of packets for the set of signal ports of each transceiver IC), and with each of the N sets of M packets being distributed to a respective one of the N transceiver IC subarrays. Each of the various packets is sent over respective serial data links to the N transceiver IC subarrays. Each transceiver of a given subarray will commonly process packets associated with the first-tier beamforming data, in combination with only a portion of the separately beamformed second-tier beamformed packets.

Figure 16:
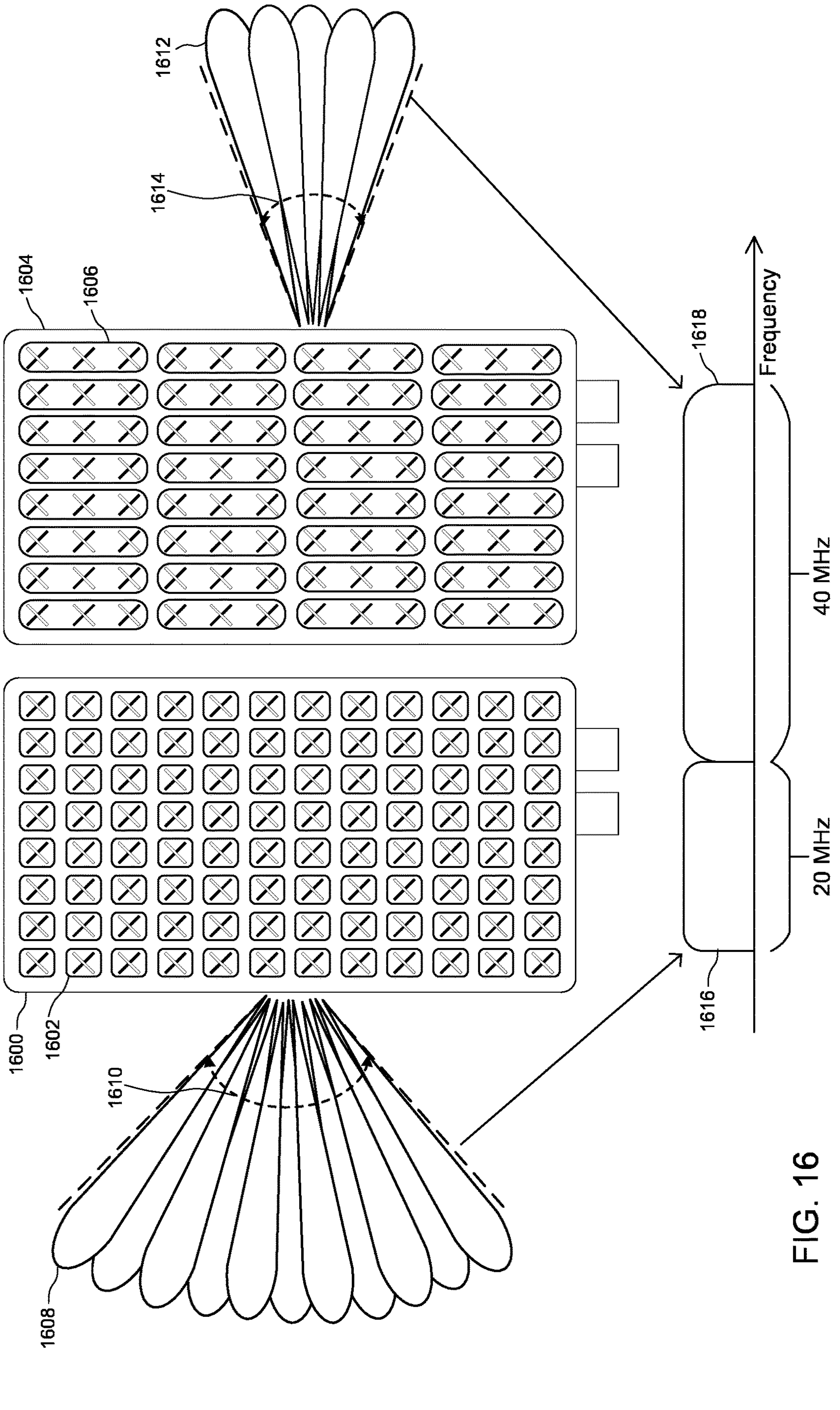
FIG. 16 depicts various additional details of multi-tier beamforming, in accordance with some embodiments; and, FIG. 17 illustrates aspects of beamforming weight errors within a subarray-beamformed signal processing system, in accordance with some embodiments.

With reference to FIG. 16, an embodiment of two-tier beamforming is illustrated, whereby a panel may be configured to process UL and DL data according to a first tier of beamforming using subarray-level beamforming (as shown in 1604) with three dual-polarized elements per subarray 1606, and providing beams (e.g., 1612) within scan range 1614. In the embodiment shown, the subarray-level beamformer generates beamformed IQ packets for frequency content 1618 that are commonly-processed within each respective subarray, as described with respect to IQ data 326, and 342. The same panel may simultaneously be configured (as shown in 1600) to provide another, or second, tier of beamforming having higher phase resolution with unique beamformed IQ data sets for generating unique signals at each cross-polarized element 1602. In the embodiment of FIG. 16, the frequency content 1616 may be allocated to the high-resolution beamformed tier, such as data 327, 343, 355, 359, 369, and 377. The frequency content of frequency range 1616 and frequency range 1618 may correspond to different subcarriers within a single component carrier, or may be separate component carriers, etc. as described herein.

Figure 17:
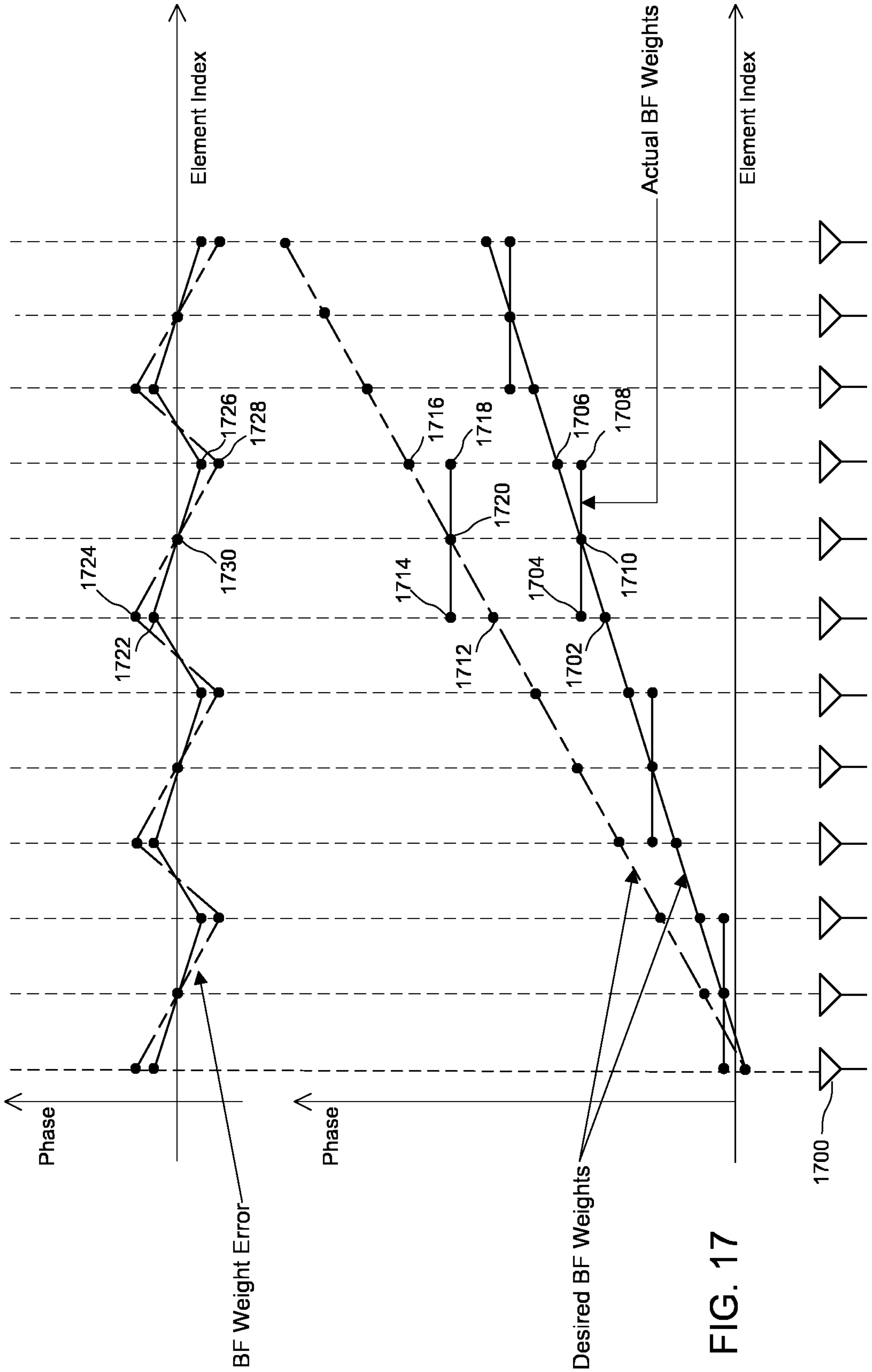

Note that in the second tier of beamforming, the individual beams (e.g., 1608) may be directed across a wider scan range 1610 due to the higher phase resolution. In contrast, the scan angle in subarray beam forming (where a plurality of signal ports transmit and receive signals processed according to a common IQ beamformed packet) has a limited scan range due to the increased quantization error in beam forming weights, as depicted in FIG. 17. In particular, the scan angles of two representative beams represented by diagonal lines labeled “Desired BF Weights” depict two individual beams having different scan angles. In full-dimensional beamforming, the IQ data for each signal port is formed using the desired weights having phases as indicated, including, for example, points 1702, 1710, and 1706 for the lower-angle scan angle, and example points 1712, 1720, and 1716 for the steeper scan angle (shown as the dashed line). However, in subarray beamforming, the commonly processed beamformed IQ data may be generated with an average phase for the desired beam across the elements in the given subarray, shown by example phases 1704, 1710, 1708 for one beam, and phases 1714, 1718, 1720 for the steeper beam. The corresponding beamforming weight phase errors are shown with the lines labeled “BF Weight Error”. Note that the steeper scan angle has higher beamformer weight errors. Consequently, the second tier of beam forming allows greater scan angles because no quantization error, and subarray beamforming has a reduced scan range. Note that for two-element subarrays, the beamforming weights used in forming individual beams may be the average value of between two desired phase values, or a value otherwise between the two desired weight phases. The finer phase control avoids what is sometimes called “quantization lobes”, which are generated because the applied weights are constrained to be the same for several adjacent elements in the subarray. The quantization lobes increase as the scan angle increases.

In short, the full-dimensional beamforming is done with a higher level of precision in the beamformer weights, whereas the subarray beamforming is performed with an average of the desired weights, introducing errors. Thus, the elements configured according to 1600 that have full dimensional control have a larger scan range than the subarray beamformed configuration 1604 that is beamformed using averaged bf weights for each given beam (such as UE-specific beams, or spatial multiplexing layer beams, etc.).

The multi-tier beamforming described herein may be used to provide high quality service to a set of users, such as those located in a high rise building within the cell sector without sacrificing coverage (e.g., by limiting the allocated data bandwidth) for other user devices located on the ground level. Similarly, the system enables support of communication with drones and other high elevation devices in combination with ground-level user devices. The system described herein is configured to provide these alternative beamformed transmissions amongst user devices within a single radio unit.

A multi-mode beamforming system may be configured to sequentially or dynamically allocate OFDM transmissions on a slot-by-slot basis according to two or more levels of beamforming resolution. In particular, a first time transmission time interval (TTI) or even a first OFDM symbol time slot, may be allocated to user devices that are beamformed according to a first tier of subarray-level beamforming, such that during transmission signal processing, the transmit IQ data packets sent to each transceiver IC subarray are commonly processed by each of the transceiver ICs within each such subarray. And similarly, during signal reception, the processed IQ data packets of each transceiver IC are combined as they are conveyed from transceiver IC to transceiver IC along the serially-connected transceiver ICs in each subarray. In a second, or subsequent time slot, frequency resource blocks may be allocated to user devices for higher resolution beamforming, including full-control beamformed IQ data according to a second tier of higher phase resolution beamforming, where individual transmit IQ packets are separately formed for serial data transmission, and which are sent to each transceiver IC subarray, for individual processing by specifically addressed transceiver ICs within each such subarray.

In some embodiments, the transmission bandwidth (i.e., the number of IQ sample pairs corresponding to the number of modulated subcarriers) associated with the full-control digital beamformed IQ data packets may be less than the bandwidth being utilized by the commonly processed IQ data packets, such as the comparison between the commonly-processed packet data of 302 and the fully-digital beamformed packet data of 304. In some embodiments, a method of multi-tier beamforming comprises: receiving a first-tier beamformed frequency-domain IQ data packet and a plurality of second-tier beamformed frequency-domain IQ data packets at a transceiver integrated circuit (IC) subarray having a plurality of interconnected transceiver ICs, the transceiver ICs interconnected via a plurality of serial data connections; at each transceiver IC of the transceiver IC subarray: forming a multi-tier beamformed frequency-domain IQ data set by combining beamformed frequency-domain IQ data from the first-tier beamformed frequency-domain IQ data packet with beamformed frequency-domain IQ data from selected ones of the second-tier beamformed frequency-domain IQ data packets of the plurality of second-tier beamformed frequency-domain IQ data packets; generating a discrete-time-domain signal from the multi-tier beamformed frequency-domain IQ data set using a digital signal processor (DSP) within the transceiver IC; generating a modulated radio frequency (RF) signal from the discrete-time-domain signal; and, transmitting a multi-tier beamformed signal by transmitting respective modulated RF signals from the transceiver ICs of the transceiver IC subarray via a corresponding adjacent antenna element subarray. Transmitting the multi-tier beamformed signal may be performed by transmitting respective modulated RF signals from transceiver ICs of a plurality of transceiver IC subarrays via a corresponding plurality of adjacent antenna element subarrays.

In some embodiments, the method includes receiving a first-tier beamformed frequency-domain IQ data packet and a plurality of second-tier beamformed frequency-domain IQ data packets at a transceiver integrated circuit (IC) subarray further comprises: forwarding the first-tier beamformed frequency-domain IQ data packet from a first transceiver IC of the transceiver IC subarray to additional transceiver ICs of the transceiver IC subarray for common processing; and, forwarding only a subset of the second-tier beamformed frequency-domain IQ data packets of the plurality of second-tier beamformed frequency-domain IQ data packets from the first transceiver IC to the additional transceiver ICs. The method may include wherein the subset of the second-tier beamformed frequency-domain IQ data packets is identified according to packet headers. Some methods combine the beamformed frequency-domain IQ data from the first-tier beamformed frequency-domain IQ data packet with beamformed frequency-domain IQ data from selected ones of the second-tier beamformed frequency-domain IQ data packets by concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. Combining beamformed frequency-domain IQ data from the first-tier beamformed frequency-domain IQ data packet with beamformed frequency-domain IQ data from selected ones of the second-tier beamformed frequency-domain IQ data packets is performed in some instances by forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The weighted sum may be calculated according to beamforming weights received from a beamformer.

In further embodiments, combining beamformed frequency-domain IQ data from the first-tier beamformed frequency-domain IQ data packet with beamformed frequency-domain IQ data from selected ones of the second-tier beamformed frequency-domain IQ data packets is done in the time domain by converting the beamformed frequency-domain IQ data from the first-tier beamformed frequency-domain IQ data packet to a first-tier beamformed time-domain signal; converting the beamformed frequency-domain IQ data from selected ones of the second-tier beamformed frequency-domain IQ data packets to a second-tier beamformed time-domain signal; and, adding the first-tier beamformed time-domain signal and the second-tier beamformed time-domain signal.

The first-tier beamformed frequency-domain IQ data packet and the selected ones of the second-tier beamformed frequency-domain IQ data packets may be associated with different component carriers. The method may involve queuing the data packets according to the location of the intended transceiver IC, so that second-tier beamformed frequency-domain IQ data packets are received for processing by transceiver ICs at an end of the transceiver IC subarray prior to receiving second-tier beamformed frequency-domain IQ data packets for processing by transceiver ICs at a beginning of the transceiver IC subarray.

Some example embodiments of an apparatus comprise: a beamformer processor configured to generate a first-tier beamformed frequency-domain IQ data packet and a plurality of second-tier beamformed frequency-domain IQ data packets; a transceiver integrated circuit (IC) subarray connected to the beamformer processor and having a plurality of interconnected transceiver ICs interconnected via a plurality of serial data connections; each transceiver IC of the transceiver IC subarray comprising: a digital signal processor (DSP) configured to form a multi-tier beamformed frequency-domain IQ data set and to generate a discrete-time-domain signal from the multi-tier beamformed frequency-domain IQ data set; a radio frequency modulator configured to generate a modulated radio frequency (RF) signal from the discrete-time-domain signal; and, an antenna element subarray connected to the transceiver IC subarray configured to transmit a multi-tier beamformed signal by transmitting respective modulated RF signals from the transceiver ICs of the transceiver IC subarray. The transceiver IC subarray may comprise a first transceiver IC having a packet header processor configured to forward the first-tier beamformed frequency-domain IQ data packet from the first transceiver IC to additional transceiver ICs of the transceiver IC subarray for common processing and configured to forward only a subset of the second-tier beamformed frequency-domain IQ data packets from the first transceiver IC to the additional transceiver ICs. The packet header processor may be configured to identify the subset of the second-tier beamformed frequency-domain IQ data packets according to packet headers.

The DSP may be configured to combine beamformed frequency-domain IQ data from the first-tier beamformed frequency-domain IQ data packet with beamformed frequency-domain IQ data from selected ones of the second-tier beamformed frequency-domain IQ data packets by concatenating beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The DSP may be configured to combine beamformed frequency-domain IQ data from the first-tier beamformed frequency-domain IQ data packet with beamformed frequency-domain IQ data from selected ones of the second-tier beamformed frequency-domain IQ data packets by forming a weighted sum of beamformed frequency-domain IQ data from the first-tier beamformed frequency-domain IQ data packet with the beamformed frequency-domain IQ data from selected ones of the second-tier beamformed frequency-domain IQ data packets prior to a frequency-to-time domain conversion. The DSP may be configured to calculate the weighted sum according to beamforming weights received from the beamformer processor.

In some embodiments, the DSP is configured to: convert the beamformed frequency-domain IQ data from the first-tier beamformed frequency-domain IQ data packet to a first-tier beamformed time-domain signal; convert the beamformed frequency-domain IQ data from selected ones of the second-tier beamformed frequency-domain IQ data packets to a second-tier beamformed time-domain signal; and, add the first-tier beamformed time-domain signal and the second-tier beamformed time-domain signal.

The apparatus may include a packet header processor configured to identify separate component carriers associated with the first-tier beamformed frequency-domain IQ data packet and the selected ones of the second-tier beamformed frequency-domain IQ data packets. The beamformer processor may be configured to transmit the second-tier beamformed frequency-domain IQ data packets for processing by transceiver ICs at an end of the transceiver IC subarray prior to transmitting second-tier beamformed frequency-domain IQ data packets for processing by transceiver ICs at a beginning of the transceiver IC subarray. The apparatus may also include a plurality of transceiver IC subarrays and a corresponding plurality of adjacent antenna element subarrays, configured to transmit the multi-tier beamformed signal.

Some embodiments may utilize Full-Dimensional Beamformed Data Streams in Serially-Connected Transceiver Arrays. In these embodiments, each signal port has unique signals for full control over the beamforming phases. Thus, unique packets are sent to each transceiver IC subarray that are addressed through a combination of one or more field IDs, or combinations of sets of IDs) to each transceiver in a subarray. The packets may be time ordered to accommodate latency so that IQ packets addressed to transceiver ICs at the end of serially-linked chain of transceiver ICs are sent first so they are received at the end of the array. Packets may thus be ordered in a round-robin fashion, where a first packet is sent to each transceiver IC so that processing may begin at each IC, followed by additional packets to each transceiver IC.

Each transceiver has a serial link and a packet header analyzer circuit for performing header inspection, where each stream to each subarray includes separate data packets with unique digital beam formed data addressed to individual transceivers within the serially-connected set of transceivers. The packet header analyzer within each transceiver Serdes may make packet-by-packet forwarding decisions. In one configuration, the packet bandwidth is allocated equally between two signal paths of each transceiver IC, such as packets for two signal ports (H and V).

When receiving signals in the serially-linked transceiver ICs in a subarray, the serial data rate is between ICs is limited and thus subarray beamforming may include receive IQ data combining prior to transmission back to the beamformer. In some embodiments, combining weights are provided to the transceivers in a given subarray so they would adjust phases as part of the receive combining. Electronic tilt is one such situation.

FIG. 4 is an alternative embodiment of a radio unit architecture having a hierarchical data distribution topology from the DL/UL beamformer 400 to the respective groups of serially connected transceiver ICs (e.g., one such transceiver IC subarray is the set of transceiver ICs connected via serial links 418 and 420). In this embodiment, the beamformer 400 has high rate serial data connections (e.g., 402) to intermediate Serdes MUX devices 404, (as well as connections to 422, 424, 426), each of which then provide separate serial data connections (e.g., the set of links 406). The separate serial connections from each Serdes MUX may utilize a lower data rate for connections to the respective subset of transceiver IC subarrays 421*a*, 421*b*, 421*c*, 421*d*. In the embodiment of FIG. 4, the subset of transceiver IC subarrays 421*a* contains 8 transceiver IC subarrays, with each subarray having three transceiver ICs connected to corresponding antenna elements. Note that the remaining sets of transceiver IC subarrays 421*b*, 421*c*, 421*d* are depicted in simplified fashion (including connectivity to a simplified set of antenna element subarrays) for clarity.

The transceiver IC subarrays of FIG. 4 are also configured in a Time Division Duplexed (TDD) configuration with SPDT (Single-Pole Double-Throw) switches 412. The receive signals may be filtered via filter 410 and amplified with low Noise Amplifiers (LNA) 408. Also depicted are signal couplers, e.g., 414, 416, that provide a signal copy (typically at a much lower power) of the transmitted RF signal to a monitoring, or observation, transceiver 428 via a calibration port 430.

Figure 5:
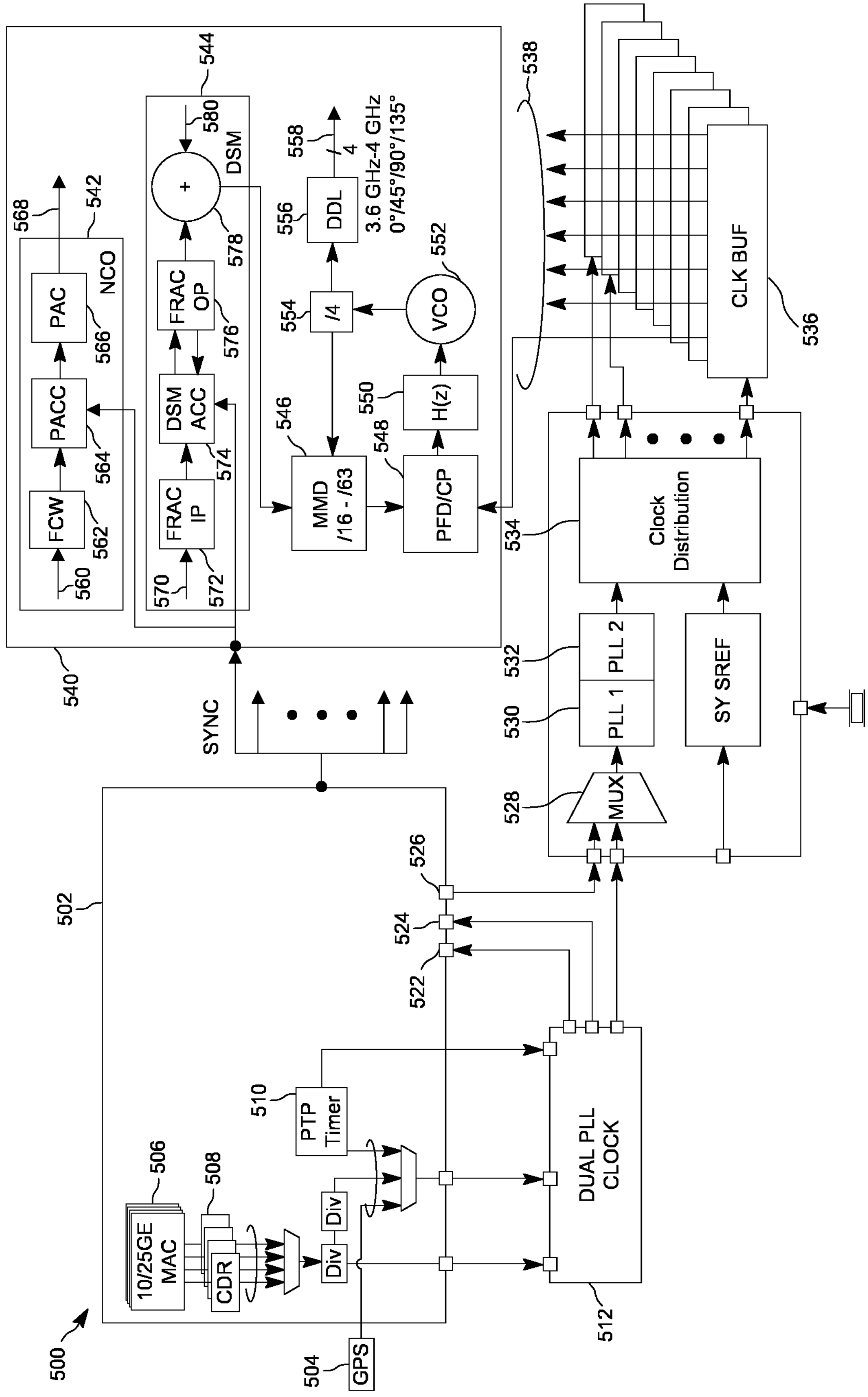
FIG. 5 depicts an embodiment of a synchronization and clock distribution circuit for use with the transceivers distributed across the active antenna array assembly.

FIG. 5 depicts an embodiment of a synchronization and clock distribution circuit 500 for use with the transceiver ICs distributed across the active antenna array assembly. More specifically, some embodiments include a method comprising: receiving a clock signal and at least one synchronization pulse signal at each transceiver IC of a plurality of transceiver IC subarrays, wherein each transceiver IC subarray contains a respective set of serially connected transceiver ICs. The method further includes, at each transceiver IC: (i) synchronizing the transceiver IC with other transceiver ICs of the respective set of serially connected transceiver ICs by resetting a delta-sigma modulator (DSM) circuit to a predetermined state in accordance with the received at least one synchronization pulse signal; (ii) generating a carrier frequency signal using a phase-locked loop (PLL) circuit that includes the DSM circuit; and (iii) using the generated carrier frequency signal to process frequency domain inphase and quadrature (IQ) data.

Further, some embodiments include an apparatus comprising: a plurality of transceiver IC subarrays, wherein each transceiver IC subarray contains a respective set of serially connected transceiver ICs; a beamformer processor coupled to the plurality of transceiver IC subarrays, wherein the beamformer processor is configured to generate at least one synchronization pulse signal, and to provide the at least one synchronization pulse signal to each transceiver IC; and a plurality of clock buffer circuits coupled to the beamformer processor via a clock distribution circuit, wherein the plurality of clock buffer circuits are configured to output a plurality of clock signals, and to provide a respective clock signal to each transceiver IC, and wherein each transceiver IC is configured to: (i) receive the respective clock signal and the at least one synchronization pulse signal; (ii) synchronize the transceiver IC with other transceiver ICs of the respective set of serially connected transceiver ICs by resetting a delta-sigma modulator (DSM) circuit to a predetermined state in accordance with the received at least one synchronization pulse signal; (ii) generate a carrier frequency signal using a phase-locked loop (PLL) circuit that includes the delta-sigma modulator (DSM) circuit; and (iv) use the generated carrier frequency signal to process frequency domain IQ data.

Referring back to FIG. 5, within a beamformer processor circuit 502, data interface circuit(s) 506 may be used to generate clock signals from Clock and Data Recovery (CDR) circuits 508, which are then provided to a Dual PLL clock circuit 512 that provides clock signals 522, 524 for use by a beamformer processor 502, which may in turn generate a further clock signal on line 526. Clock signal distribution to the transceiver ICs (e.g., one such transceiver IC 540 is depicted in FIG. 5) over clocking lines 538 is provided by clock buffers 536 receiving inputs from a clock distribution circuit 534 driven by a PLL2 532, a PLL1, 530, based on a selection from a MUX 528, in conjunction with a System Reference clock. Hence, in some embodiments, the clock distribution circuit 534 is driven by the clock signal (on line 526) from the beamformer processor 502 and the System Reference clock.

In some embodiments, the distributed clock signal is a high-frequency signal in a frequency range of 50 MHz to 150 MHz. Further, in some embodiments, the clock buffer clock circuits 536 are configured to adjust clock signal timing at an output of each clock buffer circuit so that the respective clock signal is received by each transceiver IC at substantially same time. For example, in one illustrative embodiment, the clock buffer circuits 536 are programmable and configurable to adjust the clock signal timing at each output to accommodate signal transmission latencies associated with the clock signal paths so that the clock signals (specifically, rising and/or falling edge transitions of clock signals) arrive at each transceiver IC with low relative skew. In this regard, low skew means arrival at substantially the same time, having an arrival time distribution in the range of less than one or two nanoseconds of each other. In some embodiments, low skew refers to less than 333 picoseconds (⅓ nanosecond). In this regard, the clock buffers 536 may be adjusted according to a calibration procedure.

In some embodiments, in addition to receiving substantially synchronized clock signals, the transceiver ICs (e.g., the transceiver IC 540) are also synchronized with respect to each other at a macro timing level by an additional at least one synchronization pulse signal for one or more purposes. In particular, the transceiver ICs, which may be interconnected in transceiver IC subarrays via asynchronous serial data buses, and which are also interconnected directly or indirectly with the beamformer processor 502, as described herein, have one or more subsystems that may benefit from further synchronization. In some embodiments, as shown in FIG. 5, such synchronization pulse signal (denoted as "SYNC" pulse signal) is generated by the beamformer processor 502, and provided o each transceiver IC for further synchronization.

In one aspect, each of the transceiver ICs that are physically distributed across an antenna array assembly are configured for independently processing the low-skew distributed (e.g., high-frequency) clock signal and responsively generating a carrier frequency signal for processing transmit and receive modulated RF signals. As such, the voltage-controlled oscillator (VCO) of each transceiver IC that is used to generate the carrier phases for modulating the transmit signal and for mixing/downconverting the received RF signals are closely aligned across the transceiver IC subarrays that are distributed across the antenna array assembly.

In some embodiments, the transceiver IC VCOs employed herein use a VCO adjustment loop comprising a phase-locked loop (PLL) circuit) that includes a Delta Sigma Modulator (DSM) 544, a multiple-modulus divider (MMD) 546, a Phase/Frequency Detector (PFD) 548, a loop filter 550, a VCO 552, and a divider 554. Fractional dividers in the VCO adjustment loop function to adjust a modulus of frequency division (i.e., a divide ratio) used by the MMD 546. The MMD 546 utilizes a sequence of divisor values obtained from the DSM 544.

In this regard, as noted above, some embodiments described herein include the method comprising (among others) synchronizing the transceiver IC with other transceiver ICs of the respective set of serially connected transceiver ICs (in the respective transceiver subarray) by resetting the DSM circuit to the predetermined state in accordance with the received at least one synchronization pulse signal; and generating the carrier frequency signal using the PLL circuit that includes the DSM circuit.

Additionally, in one embodiment, to generate the carrier frequency signal using the PLL circuit (that includes the DSM circuit), each transceiver IC is configured to (i) use the DSM circuit to set a divide ratio of the MMD, and (ii) provide a divided-frequency signal from the MMD to the PFD for comparison against the clock signal to further adjust the divide ratio of the MMD. In a further embodiment, the DSM circuit includes a plurality of accumulators, and wherein to reset the DSM circuit to the predetermined state in accordance with the received at least one synchronization pulse signal, each transceiver IC is further configured to set the plurality of accumulators of the DSM circuit in accordance with the received at least one synchronization pulse signal.

As a general matter, various embodiments described herein utilize the DSM circuit (such as the DSM 544) to increase frequency resolution of carrier frequency signals generated by each transceiver IC for processing transmit and receive modulated RF signals. In this regard, in some embodiments, the DSM circuit is configured to use a time varying sequence representing a fractional input portion in combination with a fixed integer input portion to obtain a relatively high-resolution carrier frequency. In one example, with the use of the DSM circuit in the PLL circuit, the VCO frequency resolution may be as fine as 0.114 Hz. The DSM circuit operation is described in more detail below.

As depicted in FIG. 5, the DSM 544 may include a fractional input (FRAC IP) block 572, a DSM accumulator (DSM ACC) 574, a factional output (FRAC OP) block 576, and a summation circuit 578. In operation, the FRACP IP receives an input 570 including a digital fractional input value and generates a corresponding fractional input portion that is input into the DSM ACC 574. As further shown, the DSM accumulator 574 and the FRAC OP 576 form a loop. Generally, in this loop, the fractional input portion passed to the DSM accumulator 574 for the current time is also being referenced back to the DSM accumulator from the FRAC OP 576. Here, the current fractional output is subtracted from the current fractional input portion value stored in the accumulator 574. Although not explicitly shown in FIG. 5, in an illustrative embodiment, the DSM ACC 574 includes multiple accumulators where each accumulator may receive (i) a prior stored version of its accumulated output, (ii) use a feedback from the FRAC OP 576 to subtract the current fractional output, and (iii) pass the result to a subsequent accumulator.

As a result of the above-described operation, the overall fractional output generated by the FRAC OP 576 is provided to the summation circuit 578. In turn, the summation circuit 578 sums (adds) the fractional output portion with an actual integer input portion 580 to generate a desired divisor value provided as an input to the MMD 546. In some embodiments, the output of the DSM 544 is in the form of a divisor control word (e.g., a set of data bits) that configure the MMD 546 what divisor to use. Because of the time varying nature of the fractional input portion, the control word will be varying over time as well. However, for a given interval of operation, on the average, a desired ratio may be achieved.

As noted above, in one embodiment, the transceiver IC 540 is synchronized with other transceiver ICs of its respective transceiver IC subarray by resetting the DSM circuit (such the DSM 544) to the predetermined state in accordance with the received at least one synchronization pulse signal. In this regard, as further shown in the example of FIG. 5, the transceiver 540 is configured to receive such synchronization pulse signal (here, the "SYNC" pulse signal from the beamformer processor 502), where the synchronization pulse signal is provided to the DSM ACC 574 in order to set the plurality of accumulators of the DSM ACC 574 in accordance with the synchronization pulse signal.

In some embodiments, the reset provided by the synchronization pulse signal is a one-time event performed, for example, during startup. Thereafter, transceiver IC synchronization may be obtained automatically because of the globally shared high-speed clock distributed to each transceiver IC (as described above).

During normal operation, the MMD 546 will utilize a sequence of divisor ratios obtained from the DSM 544. In this manner, the sequence of divisors used to divide the VCO frequency from the VCO 552 (or an already frequency-divided signal provided by a divider such as the divider 554) will be the same across all of the transceiver ICs. Hence, in some embodiments, the MMD 546 is configured to utilize the sequence of divisor ratios provided by the DSM 544, where the sequence of divisors is synchronized across all of the transceiver ICs according to the synchronization pulse signal.

As further illustrated in FIG. 5, the divided frequency signal from the MMD 546 is provided to the PFD 548 for comparison against the high-frequency distributed clock signal from clock buffers 536. The PFD 548 generates a phase error signal that is then filtered by the loop filter 550 having a transfer function H(z). The filtered phase error signal is then provided to the VCO 552 to correct for the phase errors. Synchronization of the VCO phase error measurement circuits, such as the DSM 544 divisor sequences, across the transceiver ICs, provides reduction in jitter of the carrier frequencies used for transmit and receive signal processing between the transceiver ICs.

Further, as shown in FIG. 5, the output carrier frequency signal out of the divider 554 may be provided to a digital delay line (DDL) 556. In some embodiments, the DDL 556 is configured to generate carrier frequency signals with multiple phases at an output 558. By way of example, in one embodiment, the multiple phases may include at least four phases of 0, 45, 90, and 135 degrees, with the carrier frequency in the range of 3.6 GHz to 4 GHz. As will be described in further detail below, the generated carrier phases (and, e.g., their inverses) may be used by a multi-phase digital power amplifier for RF modulation. More specifically, in some embodiments, a discrete time-domain signal representative of a DL (downlink) frequency domain IQ data may be modulated onto the generated carrier frequency signal using the multi phase DPA, where the multi-phase DPA uses selected phases of the generated carrier frequency signal for the RF modulation. The phases may be selected according to the discrete time-domain signal.

In another aspect, the transmit and receive signal processing circuits within transceiver IC may use numerically controlled oscillators (NCOs), such as an NCO 542 shown in FIG. 5. The NCOs may be used to provide frequency shifting (translation) via time-domain complex multiplications, as described herein with respect to FIGS. 13A, 13B.

The NCOs may also utilize components that may benefit from synchronization by the SYNC pulse signal. In some embodiments, the NCOs utilize a phase accumulator that is incremented by a frequency control word (FCW) at each clock interval. If various NCOs in different transceiver ICs have different phase accumulator values, then this may introduce phase offsets in the transmit and receive signal processing. Synchronization of the NCO phase accumulator circuits across the transceiver ICs provides reduction in phase offsets in the transmit and receive signal processing between the transceiver ICs.

Referring back to the example of FIG. 5, the NCO 542 includes an FCW register 562, a phase accumulator (PACC) 564, and a phase-to-amplitude converter (PAC) 566. As shown in FIG. 5, the FCW register 562 may receive an FCW input 560 (e.g., from a DSP or the like) and responsively generate an FCW to be loaded into the PACC 564 at each clock interval. In general, the FCW is a series of data bits and represents a phase increment value. In some embodiments, the FCW register 562 will be configured to use the FCW to generate a corresponding phase increment (e.g., via a look-up table or the like). In some embodiments, the PACC 564 is configured to add the corresponding phase increment to its internal memory register. In this manner, the phase value accumulated by the PACC 564 through a step-like phase increments is a binary representation of an angle that starts at 0 degrees, ramps up to 360 degrees, wraps around to 0 degrees again and starts all over at a next cycle (clock interval). The output phase value of the PACC 564 is then passed to the PAC 566 for conversion to a complex sinusoid to be output by the NCO 542. The PAC 566 is configured to convert the accumulated phase value from the PACC 564 to a dual output of sine and cosine functions of the angle corresponding to that phase value, representing real and imaginary components forming a complex sinusoid at an NCO output 568.

Additionally, in some embodiments, the NCO 542 receives the synchronization pulse signal to reset the NCO 542 in accordance with that synchronization pulse signal. This may synchronize NCO phase accumulator circuits across the transceiver ICs, as noted above. More specifically, in some embodiments, a phase accumulator of an NCO is reset in accordance with the received synchronization pulse signal. As shown in the example of FIG. 5, the SYNC pulse signal is provided to the PACC 564 of the NCO 542 to reset the PACC 564. With a benefit of such phase accumulation reset in each transceiver IC, all of the transceiver ICs distributed across the active antenna array assembly may start phase value accumulation at 0 degrees.

Note that (as described in connection with the operation of the DSM circuit), some embodiments provide the synchronization pulse signal reset as a one-time event performed, for example, sometime during startup. Thereafter, transceiver IC synchronization may be obtained automatically because of the globally shared high-speed clock distributed to each transceiver IC (as described above).

Figure 13A:
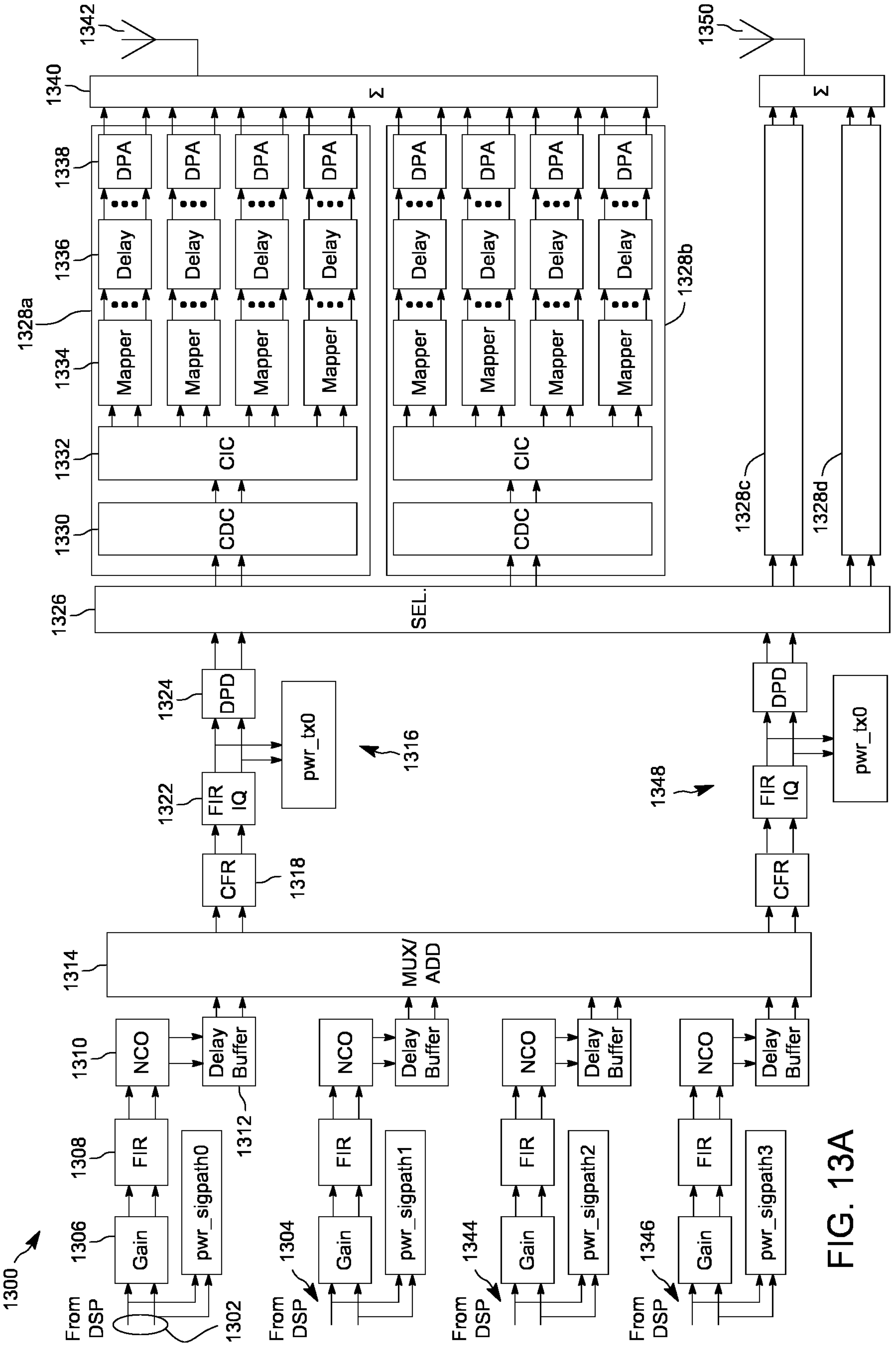
FIGS. 13A and 13B are a block diagram of the transceiver device transmit circuits that generate a plurality of amplified multi-carrier RF signals, and of the transceiver device receive circuits that generate a plurality of downconverted and sampled OFDM signals, respectively, in accordance with some embodiments.
Figure 13B:
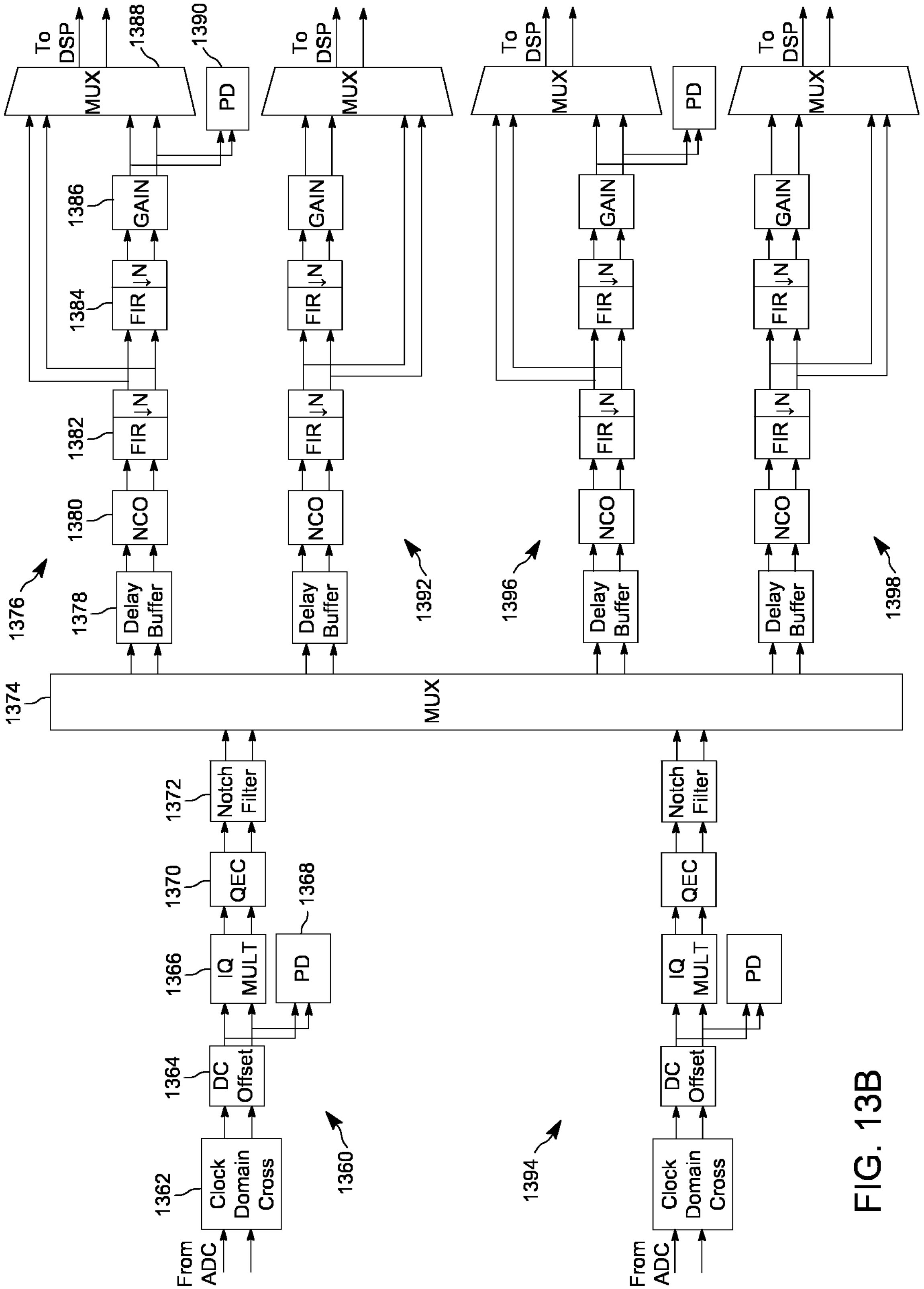

Further, the synchronized NCO 542 may be used to provide frequency shifting (translation) via time-domain complex multiplications, as described herein in more detail in connection with FIGS. 13A, 13B. For example, on a transmit side signal processing (FIG. 13A) within the transceiver 540, the NCO 542 may be configured to multiply the time domain signal by a complex sinusoid function to perform a frequency shift of a baseband signal to a desired frequency range, such as a separate frequency range that does not overlap with other component carriers. On a receive signal processing side (FIG. 13B), a complex multiplication via the NCO 542 can shift the signal received by the transceiver IC 540 to a desired baseband signal.

In additional embodiments, the synchronized NCO 542 may be used to operate on frequency-domain data to provide incremental phase rotations on the subcarrier-specific frequency-domain IQ data for electronic beam tilt, as described herein. Of course, multiple instances of NCO 542 may be utilized for various signal processing functions as described herein.

Figure 6:
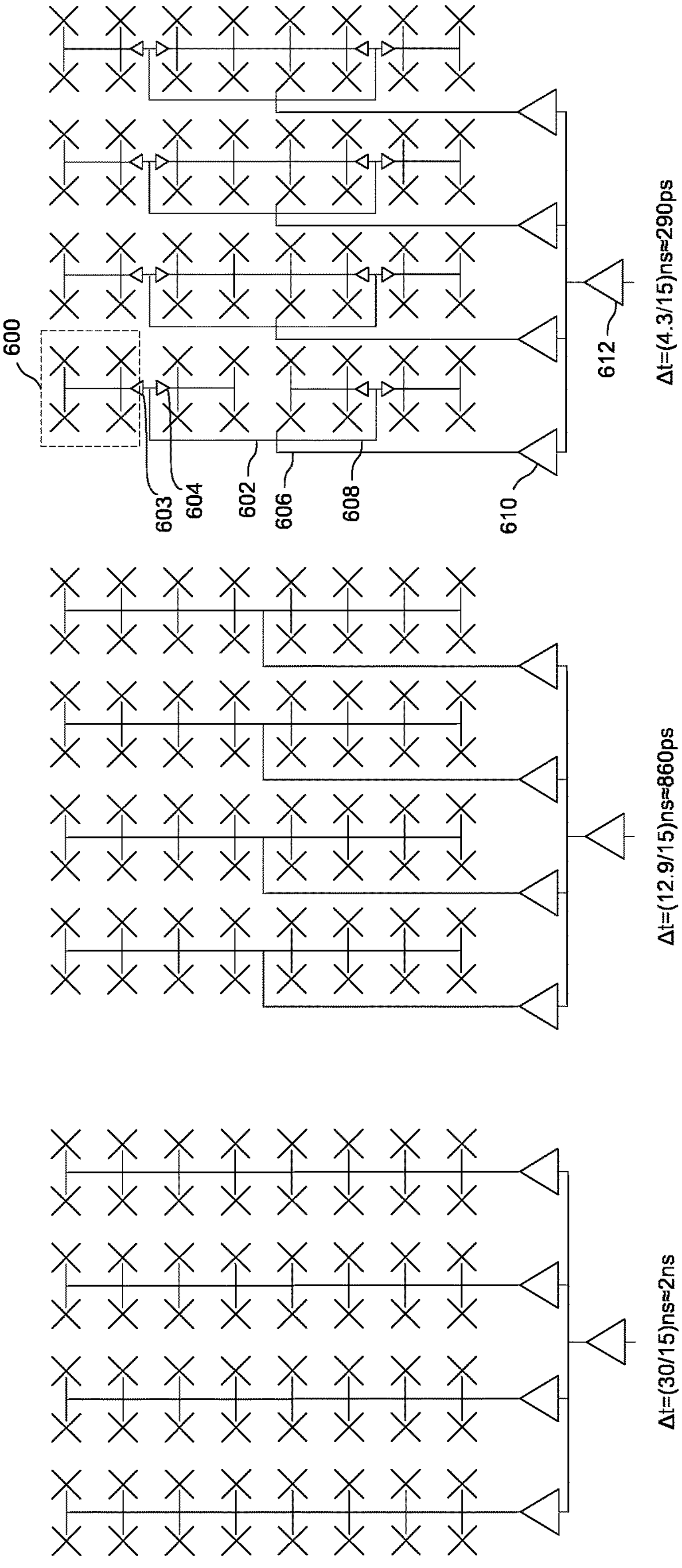
FIG. 6 depicts various clock distribution trees to provide clock signals to the transceiver arrays to reduce clock skew, in accordance with some embodiments.

Clock distribution is configured according to signal lines routed across panel 102 as depicted in various embodiments illustrated in FIG. 6 to provide clock signals to the transceiver IC subarrays to reduce clock skew. As noted above, in some embodiments, the plurality of clock buffer circuits (e.g., 536) may be configured to adjust clock signal timing at an output of each clock buffer circuit so that the respective clock signal is received by each transceiver IC at substantially the same time. In some further embodiments, the plurality of transceiver IC subarrays, the beamformer processor (e.g., 502) and the plurality of clock buffer circuits are all physically co-located within the antenna array assembly, and each clock buffer circuit is physically distributed across the antenna array assembly in physical locations corresponding to physical locations of one or more transceiver IC subarrays.

To illustrate, in one embodiment, the clock signal distribution has a tree-like structure symmetrically providing clock signals to each transceiver IC subarray, such as subarray 600 (which may be one or more transceiver IC subarrays). Specifically, in the embodiment shown, a given branch clock signal from clock buffer 610 is conveyed to clock signal conductor 606, which is split to provide clocking signals on lines 602, 608, which drive a further set of clock buffers (e.g., buffer 604 driven by line 602) and then provided to transceiver IC subarray(s), e.g., 600. In one embodiment, the four clock buffers at the level of 610 may be provided by the clock distribution circuit 534. Further, each clock buffer 536 is physically distributed across an antenna array assembly to serve the transceiver IC subarrays that are also physically distributed across an antenna array assembly. In the embodiment shown, each clock buffer may provide eight separate clock outputs to eight separate transceiver ICs. In the embodiment of FIG. 6, one clock buffer circuit is depicted as clock buffers 603, 604, providing clocks signals to the four transceiver ICs within block 600, and the four transceiver ICs below it, as shown.

Figure 7:
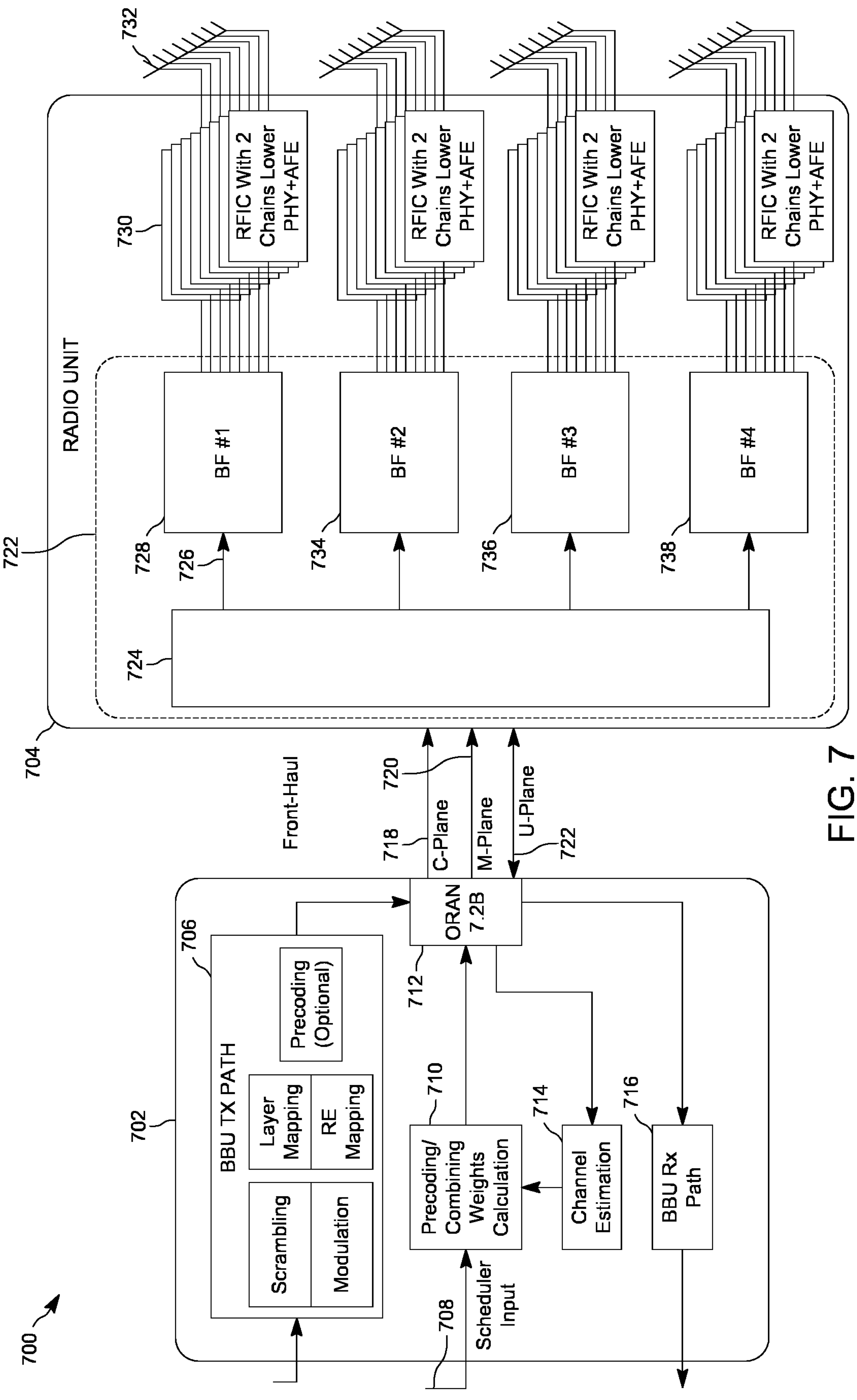
FIG. 7 is a block diagram of an ORAN (Open Radio Access Network)-based system including a distributed unit (DU) connected to a radio unit (RU) over a fronthaul data interface, and a hierarchical beamformer architecture within the radio unit, in accordance with some embodiments.

FIG. 7 is a block diagram of an ORAN (Open Radio Access Network)-based system 700 including a distributed unit connected to a radio unit over a fronthaul data interface, and a hierarchical beamformer architecture within the radio unit, in accordance with some embodiments. As a general matter, in ORAN architecture, base station functions (e.g., functions of 5G NR Node B (gNB)) may be split between a Centralized Unit (CU), one or more Distributed Units (DUs) that are connected to the CU through a midhaul interface, and one or more Radio Units (RUs) connected to the DU via a fronthaul interface. For example, FIG. 7 depicts a DU (distributed unit) 702, having, among others, a baseband transmit unit 706, a precoding/beamforming combining weights calculation unit 710 (that receives scheduler input 708), a channel estimation unit 714, and a baseband receive unit 716. The DU 702 includes an ORAN interface 712 for connectivity to a radio unit (RU) 704, over a fronthaul data interface carrying control information (a C-Plane (Control Plane) 718), management information (an M-Plane (Management Plane) 720) and user data (a U-Plane (User Plane) 722). Typically, the ORAN RU, such as the RU 704, may act as a fronthaul gateway (implemented, e.g., by an FPGA) that performs various baseband processing associated with a physical (PHY) layer, as well as RF front end functions for RF signal transmission and reception over the air interface.

Also depicted is a hierarchical beamformer architecture 722 within the radio unit 704. The hierarchical beamformer 722 includes a main (primary) beamformer processor 724 (or "main (primary) beamformer 724," for short), and a plurality of distributed secondary beamformer processors, such as BF #1 (728), BF #2 (734), BF #3 (736), and BF #4 (738) (or "distributed secondary (or second-tier) beamformers," for short), connected by serial data links (e.g., a link 726 from the main beamformer 724 to BF #1). In illustrative embodiments described hereinbelow, the main beamformer processor 722 comprises a primary beamformer processor and each of the distributed secondary beamformer processors 728, 734, 736, and 738 comprises a corresponding distributed secondary beamformer processor connected to the primary beamformer processor, all configured for downlink (transmit) communications or uplink (receive) communications, or both. Thus, in some additional embodiments, in the hierarchical beamformer architecture 722 the main beamformer processor 724 may comprise a primary receive beamformer processor and each of the distributed secondary beamformer processors 728, 734, 736, and 738 may also comprise distributed secondary receive beamformer processors. Hence, each distributed secondary beamformer processor (e.g., 728, 734, 736, and 738) may perform both transmit and receive beamforming operations.

In some embodiments of the hierarchical beamformer architecture 722, the main beamformer 724 is configured, e.g., to calculate a complete transmit beamforming matrix (as more fully described with respect to FIGS. 8-10) and distribute portions of the transmit beamforming matrix to the second-tier beamformers (e.g., BF #1-4). Further, the main beamformer 724 also transmits layers of user data in the form of frequency-domain subcarrier IQ data (frequency-domain subcarrier IQ user data layers) to each of the second-tier beamformers 728, 734, 736, and 738. In general, a user data layer refers herein to a set of IQ subcarrier-specific data points (values) representing actual modulation symbols. In some embodiments, the precoding/beamforming combing weights calculation unit 710 located in the DU 702 may be configured to determine and assign beamforming weights to the RU 702. Each second-tier beamformer receives a respective transmit beamforming submatrix from the main beamformer 724 and the plurality of layers of frequency-domain subcarrier IQ user data layers (or, in some places, "user data layer(s)" for short), and then forms a respective plurality of signal-port specific aggregated IQ data packets for transceiver ICs (or, e.g., in some embodiments, a set of transceiver IC subarrays) that they serve by using the respective transmit beamforming submatrix and the plurality of frequency-domain subcarrier IQ user data layers In some embodiments, each transmit beamforming submatrix contains transmit beamforming combining weights associated with antenna elements in a respective region of an antenna array (panel). Further, the distributed secondary transmit beamformer processors (e.g., the secondary (second-tier) beamformers 728, 734, 736, and 738, as in the present embodiment) are physically distributed so that each distributed secondary transmit beamformer processor is positioned within or adjacent to the respective region of the antenna array associated with a respective one of the plurality of transmit beamforming submatrices. Here, the main beamformer 724 may be configured to transmit the plurality of frequency-domain subcarrier IQ user data layers to each one of the plurality of distributed secondary transmit beamformer processors so that each distributed secondary transmit beamformer processor receives same frequency-domain subcarrier IQ user data layers. Note that, in the frequency domain, the beamforming (combining) weights (or "beamforming weights," for short) will be complex values having a real and imaginary parts for control of I and Q components, respectively.

As will be described in further detail, each distributed secondary (second-tier) transmit beamformer processor (e.g., BF #1-4 (728, 734, 736, and 738)) may then apply different respective transmit beamforming combining weights (contained in the received respective beamforming submatrix) to those frequency-domain subcarrier IQ user data layers to form a respective plurality of beamformed frequency domain IQ data packets. Further, the respective plurality of beamformed frequency-domain IQ data packets may be subsequently distributed by the secondary transmit beamformer processor to a corresponding set of transceiver ICs or transceiver IC subarrays positioned within the respective region of the antenna array associated with that distributed secondary transmit beamformer processor. In this regard, the corresponding transceiver ICs or set of transceiver IC subarrays may be coupled to the secondary transmit beamformer processor via, e.g., serial data connections, as described in various embodiments herein.

More particularly, some embodiments disclosed herein include an apparatus comprising: (i) a primary transmit beamformer processor configured to partition a transmit beamforming matrix of beamforming combining weights into a plurality of transmit beamforming submatrices, each transmit beamforming submatrix containing transmit beamforming combining weights associated with antenna elements in a respective region of an antenna array; and (ii) a plurality of distributed secondary transmit beamformer processors connected to the primary transmit beamformer processor. In some embodiments, the plurality of distributed secondary transmit beamformer processors being physically distributed so that each distributed secondary transmit beamformer processor is positioned within or adjacent to the respective region of the antenna array associated with a respective one of the plurality of transmit beamforming submatrices may be desired to allow for shorter serial data links. In the apparatus, each distributed secondary transmit beamformer processor is configured (i) to receive the respective transmit beamforming submatrix and a plurality of frequency-domain subcarrier IQ user data layers from the primary transmit beamformer processor, and (ii) to use the respective transmit beamforming submatrix and the plurality of frequency-domain subcarrier IQ user data layers to form a respective plurality of beamformed frequency domain IQ data packets. Further, the apparatus includes a plurality of transceiver ICs or sets of transceiver integrated circuit (IC) subarrays connected to the plurality of distributed secondary transmit beamformer processors. In this regard, each set of transceiver ICs or set of transceiver IC subarrays is connected to a corresponding one of the plurality of distributed secondary transmit beamformer processors and is positioned within the respective region of the antenna array associated with the corresponding distributed secondary transmit beamformer processor. Further, each set of transceiver IC subarrays is configured to receive the respective plurality of beamformed frequency domain IQ data packets from the corresponding distributed secondary transmit beamformer processor, with each transceiver IC subarray in the set of transceiver IC subarrays being configured to receive a given portion of the respective plurality of beamformed frequency-domain IQ data packets.

Further, some embodiments include a method comprising: partitioning, at a primary transmit beamformer processor, a transmit beamforming matrix of beamforming combining weights into a plurality of transmit beamforming submatrices, each transmit beamforming submatrix containing transmit beamforming combining weights associated with antenna elements in a respective region of an antenna array; receiving, at a plurality of distributed secondary transmit beamformer processors, the plurality of transmit beamforming submatrices, or beamformer weight index values, and a plurality of frequency-domain subcarrier IQ user data layers from the primary transmit beamformer processor, the plurality of distributed secondary transmit beamformer processors being physically distributed so that each distributed secondary transmit beamformer processor is positioned within or adjacent to the respective region of the antenna array associated with a respective one of the plurality of transmit beamforming submatrices, and each distributed secondary transmit beamformer processor receiving the respective transmit beamforming submatrix and the plurality of frequency-domain subcarrier IQ user data layers; using, by each distributed secondary transmit beamformer processor, the respective transmit beamforming submatrix and the plurality of frequency-domain subcarrier IQ user data layers to form a respective plurality of beamformed frequency-domain IQ data packets; and providing, by each distributed secondary transmit beamformer processor, the respective plurality of beamformed frequency domain IQ data packets to a corresponding one of a plurality of sets of transceiver integrated circuit (IC) subarrays, (i) the corresponding set of transceiver IC subarray being positioned within the respective region of the antenna array associated with the distributed secondary transmit beamformer processor, and (ii) each transceiver IC subarray in the corresponding set of transceiver IC subarrays receiving a given portion of the respective plurality of beamformed frequency-domain IQ data packets from the distributed secondary transmit beamformer processor.

Referring back to FIG. 7, in the embodiment shown in FIG. 7, the RU 704 is depicted as having beamformer connections to transceiver IC elements 730, which may be individual transceiver ICs having two, four, or more signal ports, for driving antenna elements 732, or may be transceiver IC subarrays of serially-connected transceiver ICs, according to various embodiments described herein. More specifically, as described hereinbefore, at least two serially-connected transceiver ICs may be physically arranged in a transceiver IC subarray (see, e.g., FIG. 2 and the description thereof). Thus, in some embodiments, each transceiver IC element is a set of IC subarrays that contains two or more transceiver IC subarrays. Further, in some embodiments, each of the secondary beamformers 728, 734, 736, and 738 may be implemented by the Serdes mux devices of FIG. 4 (e.g., 404), which may be each configured to additionally function as a partial beamformer processor of the hierarchical beamformer apparatus, such as the hierarchical beamformer architecture 722 depicted in FIG. 7.

In illustrative embodiments, the primary transmit beamformer processor (e.g., the main beamformer 724) assigns transmit (downlink) beamforming combining weights (in combination, e.g., with precoder combining weights, as appropriate) to form a full beamforming matrix (as more fully described with respect to FIG. 8), partitions the full beamforming submatrix and then distributes portions of the full beamforming matrix to the respective secondary transmit beamformer processors (e.g., the secondary beamformers 728, 734, 736, and 738). Each portion of the full beamforming matrix constitutes a respective transmit beamforming submatrix distributed to each corresponding secondary (transmit) beamformer processor. The actual weights may be conveyed to the secondary beamformers, or a set of beam indices may be used to identify beamforming weights previously stored in the secondary beamformer. More particularly, in some embodiments, a plurality of transceiver IC subarrays associated with antenna elements on an antenna panel may be partitioned according to their physical location on the panel (e.g., the antenna panel 102) into multiple sets of transceiver IC subarrays, with each set of transceiver IC subarrays in a given partition being serviced by and interconnected with a corresponding secondary beamformer processor, where the secondary beamformer processors (e.g. the secondary beamformers 728, 734, 736, and 738) may be distributed across the panel to be adjacent to or within the partition. Each distributed secondary beamformer processor also receives frequency-domain subcarrier IQ user data layers over the respective serial data link 726, and applies respective distributed beamforming weights in a given transmit beamforming submatrix to the frequency-domain subcarrier IQ user data layers to calculate fully beamformed IQ data points for distribution to its respective set of transceiver ICs or transceiver IC subarrays.

More specifically, in some embodiments, each distributed secondary beamformer processor may be configured to calculate multiple sets of beamformed frequency domain IQ data points by applying transmit beamforming combining weights of the respective transmit beamforming submatrix to the frequency-domain subcarrier IQ user data layers in order to form respective beamformed frequency domain IQ data packets, such as signal-port specific aggregated IQ data packets as described in connection with various embodiments herein. In this regard, in some embodiments, each distributed secondary transmit beamformer processor may be configured to packetize each set of beamformed frequency-domain IQ data points to form a corresponding set of beamformed frequency-domain IQ data packets. Further, each distributed secondary beamformer processor may be configured to distribute the corresponding set of beamformed frequency-domain IQ data packets to a corresponding set of transceiver ICs or transceiver IC subarrays connected to the distributed secondary transmit beamformer processor. With a benefit of the distributed architecture of a beamformer processor of the present embodiment, computational processing load that would normally be performed by an RU as a fronthaul gateway, may be reduced by distributing the computational functions between a primary beamformer and multiple secondary beamformers that are each designated to serve a respective set of transceiver ICs/IC subarrays.

In turn, each transceiver IC subarray in the corresponding set of transceiver IC subarrays may be configured to receive a respective subset of the corresponding set of beamformed frequency-domain IQ data packets. In this regard, beamformed frequency-domain IQ data packets in each corresponding set of beamformed frequency-domain IQ data packets may have respective headers indicating a destination signal port so as to direct the individual data packets to a transceiver IC subarray designated to receive the data packet. Within each transceiver IC subarray, individual transceiver ICs may be configured, e.g., serial digital data ports providing a serial data connection to a beamformer processor and/or communication with other transceiver ICs, suitable data and signal processing circuitry, etc. as described in various embodiments herein. In some embodiments, the respective subset of the corresponding set of beamformed frequency-domain IQ data packets includes a single frequency-domain IQ data packet (such, e.g., any of the data packets 302, 304, and 306, as described in connection with FIG. 3) that is provided to a respective transceiver IC subarray in the corresponding set of transceiver IC subarrays. In general, the above-described operation of formulating beamformed packets for distribution to transceiver IC subarrays may be carried out over a given time period to generate, e.g., streams of downlink data packets, with each data packet in the stream representing, for instance, a symbol time within a slot (such as in the LTE communication system).

Note that, as described above, a beamformer processor within a radio unit may be configured to transmit and receive IQ data packets in either time domain or frequency domain. As such, in some alternate embodiments, each distributed secondary transmit beamformer processor (e.g. each secondary beamformer 728, 734, 736, and 738) may be configured: (i) to formulate a respective set of beamformed frequency-domain IQ data packets as described above (i.e., by applying transmit beamforming combining weights in its respective transmit beamforming submatrix to frequency-domain subcarrier IQ user data layers), and (ii) to additionally convert those beamformed frequency-domain IQ data packets into a corresponding set of data packets containing (beamformed) time-domain IQ data instead. The set of beamformed time-domain IQ data packets may be then distributed among transceiver ICs/IC subarrays served by the distributed secondary transmit beamformer processor as described above (e.g., with a respective subset of time-domain IQ data packets (e.g., one data packet) being sent to each transceiver IC subarray in a set of transceiver IC subarrays associated with the distributed secondary transmit beamformer processor). In this regard, each distributed secondary transmit beamformer processor may be configured, for example, with suitable iFFT processing (e.g., a digital signal processor (DSP) configured with suitable programming instructions to execute an algorithm for IFFT operation) to perform computations involved in the conversion of frequency-domain IQ data into time-domain IQ data.

To carry out various other above-described functions, embodiments of each distributed secondary transmit beamformer processor (as well as distributed secondary receive beamformer processor, in some cases) (e.g. each secondary beamformer 728, 734, 736, and 738) may include digital signal processor circuitry executing software instructions to perform matrix multiplication operations (described in more detail in reference to FIG. 8), or may take the form of data registers interconnected with hardware multiplier circuits to perform the matrix operations. The hardware may include hardware processors, Field Programmable Gate Arrays (FPGAs), dedicated digital logic, or combinations thereof. In addition, in some embodiments, each distributed secondary transmit beamformer processor may include a packet processor (e.g., a dedicated DSP circuitry and/or the like) configured (i) to packetize each set of beamformed frequency-domain IQ data points in a plurality of sets of beamformed frequency-domain IQ data points calculated by a given distributed secondary beamformer processor to form a corresponding set of beamformed frequency-domain IQ data packets, and (ii) to distribute the set of beamformed frequency-domain IQ data packets to a corresponding set of transceiver IC subarrays connected to the distributed secondary transmit beamformer processor (as described above). In this regard, the distributed secondary transmit beamformer processor (as well as a distributed secondary receive beamformer processor, in some cases) may include serial data interface circuits for respectively communicating with each transceiver IC subarray in the corresponding set of transceiver IC subarrays. As described in greater detail earlier, communications between a beamformer processor and transceiver ICs may be carried over serial data connections.

In some embodiments, the packet processor may be further configured to obtain data layer information including component carrier identification information from the primary transmit beamformer processor. As described, for instance, in connection with FIG. 3, data packets carrying subcarrier-specific IQ data for a transceiver IC signal port may include a header (not shown, for clarity) that identifies various aspects of the type of data contained in the packet, as well as packet identification data such as one or more of: a frequency band ID, a component carrier ID, a signal port ID, and/or a transceiver ID.

Note that, in some embodiments, the plurality of frequency-domain subcarrier IQ user data layers sent over the serial data links 726 to each distributed secondary beamformer 728, 734, 736, and 738 may be compressed using so-called "modulation compression" technique defined for use, e.g., in ORAN. Modulation compression is a lossless compression technique that is used for modulated data transmitted over the user plane (e.g., the U-Plane 722) and is, more specifically, applied to DL (downlink) user-plane modulated data symbols before those symbols are transmitted over the fronthaul interface. Without modulation compression, both I and Q samples are represented by a given number of bits (referred to as "bitwidth") that is typically fixed (e.g., 10, 12, 14, 16 or more bits for each I and Q value). Modulation compression allows the bitwidth to be reduced in accordance with the maximum modulation order that is used over the DL air interface. Namely, in this technique, I and Q constellation points/samples may be represented by a number of (data) bits that corresponds to the largest modulation order used. For example, for 256 QAM, a number of bits for both I and Q samples for each subcarrier may be reduced to 8 bits of data (with I and Q samples coded with 4 bits, respectively), where the number of eight bits corresponds to the modulation order of M=8.

Hence, in some embodiments, the DU 702 may be configured with suitable signal processing to perform modulation compression so that amount of data contained in each of the plurality of frequency-domain subcarrier IQ user data layers sent (over the U-plane 722) from the primary beamformer 724 for distribution to each secondary beamformer (e.g., BF #1-4) may be substantially reduced. Additionally, as noted above (and described in more detail below), each distributed secondary beamformer may be then configured to apply a respective partial transmit beamforming matrix (or transmit beamforming submatrix) associated with that particular beamformer to the user data layers by performing complex matrix multiplication.

Once the beamforming weights are applied by performing complex multiply (described in more detail in connection with FIGS. 8-10), the amount of data to be transmitted to transceiver ICs or to a set of transceiver IC subarrays served by a given secondary beamformer will increase as result of, e.g., multiplication and summation operations normally associated with carrying out matrix multiplication. In one example, a beamformed frequency-domain IQ data point may be represented by 24 or 32 bits.

In addition, some alternate embodiments disclosed herein involve storing a predetermined set of beamforming weights at each distributed secondary transmit beamformer processor (e.g., BF #1-4 (728, 734, 736, and 738)) in advance, such as for instance, as a part of a system setup/initialization phase. Such weights may be subsequently stored at the distributed secondary transmit beamformer processor for a relatively long-term use. In some embodiments, the predetermined set of beamforming weights may be conveyed to the distributed secondary transmit beamformer processor via, e.g., the M-plane (e.g., the M-plane 720) messages that are used in ORAN to manage the radio unit functions. In some other embodiments, it may be possible to communicate the beamforming weights from the DU 702 to the RU 704 via the C-plane (e.g., the C-plane 718) that typically carries data used to control user data scheduling, as well as data used to control beamforming weight selection. Accordingly, the respective predetermined set of beamforming weights for a given distributed secondary transmit beamformer processor may be conveyed to the given distributed secondary transmit beamformer processor in advance of receipt of user data layers for UE(s) being served by the given distributed secondary transmit beamformer processor. Further, predetermined sets of beamforming weights for corresponding distributed secondary transmit beamformer processors may be communicated from the DU 702 via the primary transmit beamformer processor or may be sent directly from the DU 702 to each distributed secondary transmit beamformer processor using any suitable connection mechanism (e.g., the DU 702 may have direct communication links to each distributed secondary transmit beamformer processor).

In some embodiments, a predetermined set of beamforming weights may be stored at a given distributed secondary transmit beamformer processor in the form of, e.g., a lookup table. Each distributed secondary transmit beamformer processor may load its predetermined set of beamforming weights into such table for future use. In some embodiments, the beamforming weights stored in the look up table may be indexed using beamforming indices that, in turn, may be then associated with incoming frequency-domain subcarrier IQ user data layers to indicate which beamforming weights the distributed secondary transmit beamformer processor should apply to each frequency-domain subcarrier IQ user data layer. For instance, a given beamforming index or a set of given beamforming indices may be included in messages sent from the DU 702 and the RU 704 over the fronthaul interface to indicate which beamforming weights each distributed secondary transmit processor should apply to the incoming frequency-domain subcarrier IQ user data layers. In this regard, in some embodiments, each beamforming index may comprise a beam index corresponding to a given beam identified by a beam ID/beam index (e.g., BeamId/BeamIdx, as, e.g., defined for 5G/ORAN networks).

Note that a plurality of frequency-domain subcarrier IQ user data layers received by each secondary transmit beamformer processor may each include multiple physical resource blocks (PRBs, or RBs for short) for one or more users. Also recall that, as described above, the plurality of frequency-domain subcarrier IQ user data layers received by each distributed secondary transmit beamformer processor are the same. Each PRB contains frequency-domain IQ data for twelve (12) subcarriers for a given time period such as 7 symbol times (or 84 resource elements (REs) each representing one OFDM symbol). In some embodiments, each frequency-domain subcarrier IQ user data layer may be provided to each distributed secondary transmit beamformer processor for forming beamformed data in its entirety (i.e., as a full frequency-domain subcarrier IQ user data layer). In other embodiments, each frequency-domain subcarrier IQ user data layer may be provided to each distributed secondary transmit beamformer processor in a more granular fashion, such as one PRB at a time. In this regard, a single beamforming index would be used within a single PRB.

However, each PRB could be assigned a different beamforming index, depending on whether the PRB is for the same user device (e.g., a UE) or another user device (e.g., a UE).

In this regard, beamforming indices (e.g., beam indices (BeamIDs)) sent to each distributed secondary transmit beamformer processor in association with frequency-domain subcarrier IQ user data layers may be specified in different ways. In some embodiments, a full set of beamforming indices may be specified for use across all PRBs on a layer-by-layer basis (e.g., the beamforming indices could be sent in a type of "map" for mapping the indices across all PRBs in each layer). In other embodiments, the frequency-domain subcarrier IQ user data layers may be conveyed to each distributed secondary transmit beamformer processor in a more granular fashion, such as one PRB at a time. In such case, a data packet or a data frame carrying the single PRB could specify the beamforming index for that particular PRB only. Accordingly, for example, once predetermined beamforming weights are stored at each distributed secondary transmit processor for a relatively long-term use, when a given frequency-domain IQ data packet (carrying IQ data for a single PRB or a for full user data layer) is received at the distributed secondary transmit processor, it will include a beamforming index (for that one PRB frequency-domain IQ data packet (e.g., in a packet header)), or a full set of beamforming indices (for a full data layer frequency-domain IQ data packet). In turn, the distributed secondary transmit beamformer processor will use those one or more beamforming indices to look up corresponding beamforming weights and use those weights to perform complex multiplication (as noted above) to form beamformed IQ data.

As noted above, a given beamforming index or a set of given beamforming indices may be included in messages sent from the DU 702 to the RU 704 over the fronthaul interface to indicate which beamforming weights each distributed secondary transmit beamformer processor should apply to the incoming frequency-domain subcarrier IQ user data layers. By way of example, in ORAN, a C-plane message (such as in a data frame format, for example) can have multiple sections that each include fields for "sectionId," "beamId," "startPrbc," and "numPrbc" (and hence, each section may specify a given PRB and a BeamID associated with that PRB). Similarly, a U-plane data frame can also have multiple sections with multiple fields identifying PRBs carrying IQ data and corresponding "sectionId." In some embodiments, when a distributed secondary transmit beamformer processor in the RU 704 gets the U-Plane data frame, it could be configured to find a corresponding section information of the C-plane data frame using the "sectionId" field within the U-plane data frame. The distributed secondary transmit beamformer processor could be further configured to read BeamID (beamforming index) from the "beamId" field, retrieve the beamforming weights indexed by that value of "beamId," and apply to those weights to the U-plane PRB data.

In additional embodiments, as noted above, the main (primary) beamformer processor 724 may also comprise a primary receive beamformer processor and each of the distributed secondary beamformer processors (distributed secondary beamformers) 728, 734, 736, and 738 may also comprise distributed secondary receive beamformer processors.

In this regard, for the uplink signal reception, in some embodiments, the second-tier beamformers 728, 734, 736, and 738 may each have a respective receive beamforming submatrix that contains receive beamforming combining weights associated with antenna elements in a respective region of an antenna array (panel) for each receive user data layer. Further, the distributed secondary receive beamformer processors (e.g., the secondary beamformers 728, 734, 736, and 738, as in the present embodiment) are physically distributed so that each distributed secondary receive beamformer processor is positioned within or adjacent to the respective region of the antenna array associated with the respective receive beamforming submatrix. As will be described in further detail, each distributed secondary (second-tier) receive beamformer processor may receive, from a corresponding set of transceiver IC subarrays that it serves, packet data carrying a respective set of frequency-domain IQ data points. Each distributed secondary receive beamformer processor may apply different respective receive beamforming combining weights (contained in its respective beamforming submatrix) to that set of frequency-domain IQ data points to calculate respective sets of receive partial beamformed frequency-domain IQ data points, and may then transmit the respective sets of receive partial beamformed frequency-domain IQ data points to the primary receive beamformer processor.

In a further embodiment, the primary receive beamformer processor may then combine (e.g., add (sum)) corresponding sets of receive partial beamformed frequency-domain IQ data points received from all of the multiple distributed secondary receive beamformer processors to form multiple frequency-domain subcarrier IQ user data layers (e.g., up to eight (8) such layers on the uplink (receive) side). In some embodiments, the respective sets of receive partial beamformed frequency-domain IQ data points formed at each secondary receive beamformer processor represent a respective plurality of partial beamformed frequency-domain subcarrier IQ user data layers. More particularly, each set of receive partial beamformed frequency-domain IQ data points represents one corresponding partial frequency-domain subcarrier IQ user data layer (e.g., a first set of receive partial beamformed frequency-domain IQ data points represents a first partial frequency-domain subcarrier IQ user data layer, a second set of receive partial beamformed frequency-domain IQ data points represents a second different partial frequency-domain subcarrier IQ user data layer, and so on (e.g., up to 8 partial frequency-domain subcarrier IQ user data layers). This way, each secondary receive beamformer processor may calculate a partially beamformed frequency-domain subcarrier IQ user data layer for each frequency-domain subcarrier IQ user data layer. In turn, the primary receive beamformer processor may then add the partial beamformed frequency-domain IQ data points for each user data layer to obtain a corresponding fully beamformed data layer.

Hence, some embodiments disclosed herein include an apparatus comprising: (i) a primary receive beamformer processor; (ii) a plurality of distributed secondary receive beamformer processors connected to the primary receive beamformer processor, and (iii) a plurality of sets of transceiver integrated circuits (ICs) or transceiver IC subarrays, connected to the plurality of distributed secondary receive beamformer processors. In the apparatus, the plurality of distributed secondary receive beamformer processors are physically distributed so that each distributed secondary receive beamformer processor is positioned within or adjacent to a respective region of an antenna array associated with a respective one of a plurality of receive beamforming submatrices, and each receive beamforming submatrix contains receive beamforming combining weights associated with antenna elements in the respective region of the antenna array. In this regard, each set of transceiver ICs/IC subarrays is connected to a corresponding one of the plurality of distributed secondary receive beamformer processors and is positioned within the respective region of the antenna array associated with the corresponding distributed secondary receive beamformer processor. Further, in the apparatus, each distributed secondary receive beamformer processor is configured (i) to receive a respective set of frequency-domain IQ data points from the corresponding set of transceiver ICs/IC subarrays, and (ii) to use the respective set of frequency-domain IQ data points and the respective receive beamforming submatrix to form a respective plurality of sets of receive partial beamformed frequency-domain IQ data points, and to transmit the respective plurality of sets of receive partial beamformed frequency-domain IQ data points to the primary receive beamformer processor.

A method comprising: (i) receiving, at each of a plurality of distributed secondary receive beamformer processors connected to a primary receive beamformer processor, a respective set of frequency-domain IQ data points from a corresponding one of a plurality of sets of transceiver integrated circuit (IC) subarrays, wherein the plurality of distributed secondary receive beamformer processors are physically distributed so that each distributed secondary receive beamformer processor is positioned within or adjacent to a respective region of an antenna array associated with a respective one of a plurality of receive beamforming submatrices, each receive beamforming submatrix containing receive beamforming combining weights associated with antenna elements in the respective region of the antenna array, and wherein the corresponding set of transceiver IC subarrays is positioned within the respective region of the antenna array associated with the distributed secondary receive beamformer processor; (ii) using, by each distributed secondary receive beamformer processor, the respective set of frequency-domain IQ data points and the respective receive beamforming submatrix to calculate a respective plurality of sets of receive partial beamformed frequency-domain IQ data points; and (iii) transmitting, by each distributed secondary receive beamformer processor, the respective plurality of sets of receive partial beamformed frequency-domain IQ data points to the primary receive beamformer processor.

In subarray beamforming as described earlier herein, during reception (hence on uplink side), each transceiver IC in a given subarray may generate, for example, frequency-domain IQ data packets that are aggregated at each transceiver IC as they traverse a set of cascaded transceiver ICs in the subarray on their way towards a beamformer processor. As described hereinabove (see, e.g., FIG. 3), the IQ packet data from each transceiver IC in a subarray may be, e.g., concatenated or combined IQ data for multiple signal ports (e.g., horizontal (H) and vertical (V) ports). The receive signals being commonly processed by the transceiver IC subarray are aggregated signals with components from multiple data layers, multiple individual beams, and possibly multiple users.

On the uplink side, the hierarchical beamformer 722 may receive, e.g., up to 8 user data layers in one symbol time (e.g. 66.7 μs). In this regard, in some embodiments, each secondary receive beamformer processor (e.g., each of the secondary beamformers 728, 734, 736, and 738) will receive packets carrying IQ data points from a corresponding set of transceiver IC subarray connected to the secondary receive beamformer processor. In some embodiments, the data packets may be in time domain or frequency domain. Here, each distributed secondary receive beamformer processor may be configured, for example, with suitable FFT processing (e.g., a digital signal processor (DSP) configured with suitable programming instructions to execute an algorithm for FFT operation) to perform computations involved in the conversion of time-domain IQ data into frequency-domain IQ data. Further, each distributed secondary receive beamformer processor may be configured with a suitable logic to processes the received packets to retrieve IQ data.

In illustrative embodiments, prior to recovering fully beamformed user data layers from the IQ data packets received from transceiver ICs/IC subarrays across an entire antenna array, each secondary receive beamformer processor receives IQ data packets from each transceiver IC/IC subarray it serves that have not been combined in any fashion. Because of the distributed nature of the hierarchical beamformer 722, none of the secondary receive beamformer processors have access to all receive signals (e.g., 64 uplink signals) received through a plurality of sets of transceiver ICs/IC subarrays associated with antenna elements across the entire antenna subarray. For example, in connection with the configuration shown in FIG. 2, each distributed secondary receive beamformer (e.g., each of BF #1-4) would have access only to 16 (sixteen) receive signals (8 receive signals from a set of 8 corresponding transceiver IC subarrays, for H-polarized and V-polarized signal ports, respectively).

In some embodiments, as noted above, each distributed secondary receive beamformer processor is configured to receive a respective set of frequency-domain IQ data points (carried, e.g., in IQ data packets) from a corresponding set of transceiver IC subarrays positioned within a given region of an antenna array associated with the distributed secondary receive beamformer processor and a respective receive beamforming submatrix, and to use the respective set of frequency-domain IQ data points and the respective transmit beamforming submatrix to form multiple sets of receive partial beamformed frequency-domain IQ data points for that distributed secondary receive beamformer processor. More particularly, in some embodiments, each distributed secondary transmit beamformer processor is further configured to calculate the respective sets of partial beamformed frequency-domain IQ data points by applying receive beamforming combining weights of the respective receive beamforming submatrix to the respective set of frequency-domain IQ data points, such by performing matrix multiplication. In some embodiments, each set of partial beamformed frequency-domain IQ data points represents a given partial beamformed frequency-domain subcarrier IQ user data layer for each frequency-domain subcarrier IQ user data layer. By applying receive beamforming combining weights of receive beamforming matrix to its set of frequency-domain IQ data points via matrix multiplication, each secondary receive beamformer processor may form a given number of subcombinations (partial sums) of frequency-domain IQ data points that represent a corresponding number of partial beamformed frequency-domain subcarrier IQ data layers.

Thereafter, in some embodiments, each distributed secondary receive beamformer processor may transmit the respective sets of receive partial beamformed frequency-domain IQ data points calculated by that secondary receive beamformer processor to the primary receive beamformer processor. In some embodiments, in turn, the primary receive beamformer processor (e.g., 722) is configured to combine corresponding sets of receive partial beamformed frequency-domain IQ data points received from all of the distributed secondary receive beamformer processors (e.g., 728, 734, 736, and 738) to form frequency-domain subcarrier IQ user data layers (e.g., up to eight layers). In this regard, in some embodiments, the primary receive beamformer processor may combine (e.g. add) corresponding sets of receive partial beamformed frequency-domain IQ data points for each user data layer received from all secondary receive beamformer processors to obtain each fully-beamformed frequency-domain subcarrier IQ user data layer.

More specifically, the primary receive beamformer processor may add together sets of partial beamformed frequency-domain IQ data points for user data layer 1 received from each secondary receive beamformer processor to obtain a fully beamformed user data later 1, sets of partial beamformed frequency-domain IQ data points for user data layer 2 received from each secondary receive beamformer processor to obtain a fully beamformed user data later 2, and so on. The primary receive beamformer processor may carry out this process up to a specified number of uplink user data layers to recover all fully beamformed uplink user data layers. In some embodiments, the primary receive beamformer processor may combine up to 8 data layers within each symbol time.

In some embodiments, each distributed secondary receive beamformer processor may transmit its locally-formed sets of receive partial beamformed frequency-domain IQ data points to the primary receive beamformer processor as packetized data. In this regard, in some embodiments, each distributed secondary receive beamformer processor may include a packet processor (e.g., a dedicated DSP circuitry and/or the like) configured to use the locally-formed sets of receive partial beamformed frequency-domain IQ data points to form corresponding receive partial beamformed frequency-domain IQ data packets for transmission to the primary receive beamformer processor. Further, in some embodiments, the packets have headers indicating at least component carrier information.

Note that, as noted above, each distributed secondary receive beamformer processor is configured to use a receive beamforming submatrix to form sets of receive partial beamformed frequency-domain IQ data points. In this regard, in some embodiments, the primary receive beamformer processor may be configured to partition a receive beamforming matrix of beamforming combining weights into a plurality of receive beamforming submatrices, and to transmit each respective receive beamforming submatrix to a corresponding one of the distributed secondary receive beamformer processors, in a similar fashion as described above with respect to a downlink (transmit) beamforming operation. In other embodiments, a predetermined set of receive beamforming combining weights may be instead stored at a given distributed secondary transmit beamformer processor in the form of, e.g., a lookup table, in a similar way as described above with respect to the downlink (transmit) beamforming operation.

Hence, in summary, in accordance with the embodiments described herein, each distributed secondary receive beamformer processor has access to a given portion of receive signals (e.g., a portion of uplink signals generated by a subset of transceivers (e.g., 2 out of 4, 4 out of 8, 4 of 16, or 16 of 64, etc)) and hence is able to form a partial beamformed frequency-domain IQ data layer for each of a plurality of specified uplink layers (e.g., 8 layers). Each distributed secondary receive beamformer processor (of which there may be 2, 3, 4, 8, or more, depending on the size of the system) may then send (e.g. over the link 726), the specified number of partial beamformed frequency-domain subcarrier IQ data layers to the primary receive beamformer processor. Subsequently, the primary receive beamformer processor may combine the individual partial beamformed frequency-domain subcarrier IQ data layers from all of the distributed secondary receive beamformer processors to form the specified number of fully beamformed user data layers. Thus, the primary receive beamformer processor may form the specified number of separate combinations of IQ sample data, with each combination corresponding to a frequency-domain subcarrier IQ user data layer.

Figure 8:
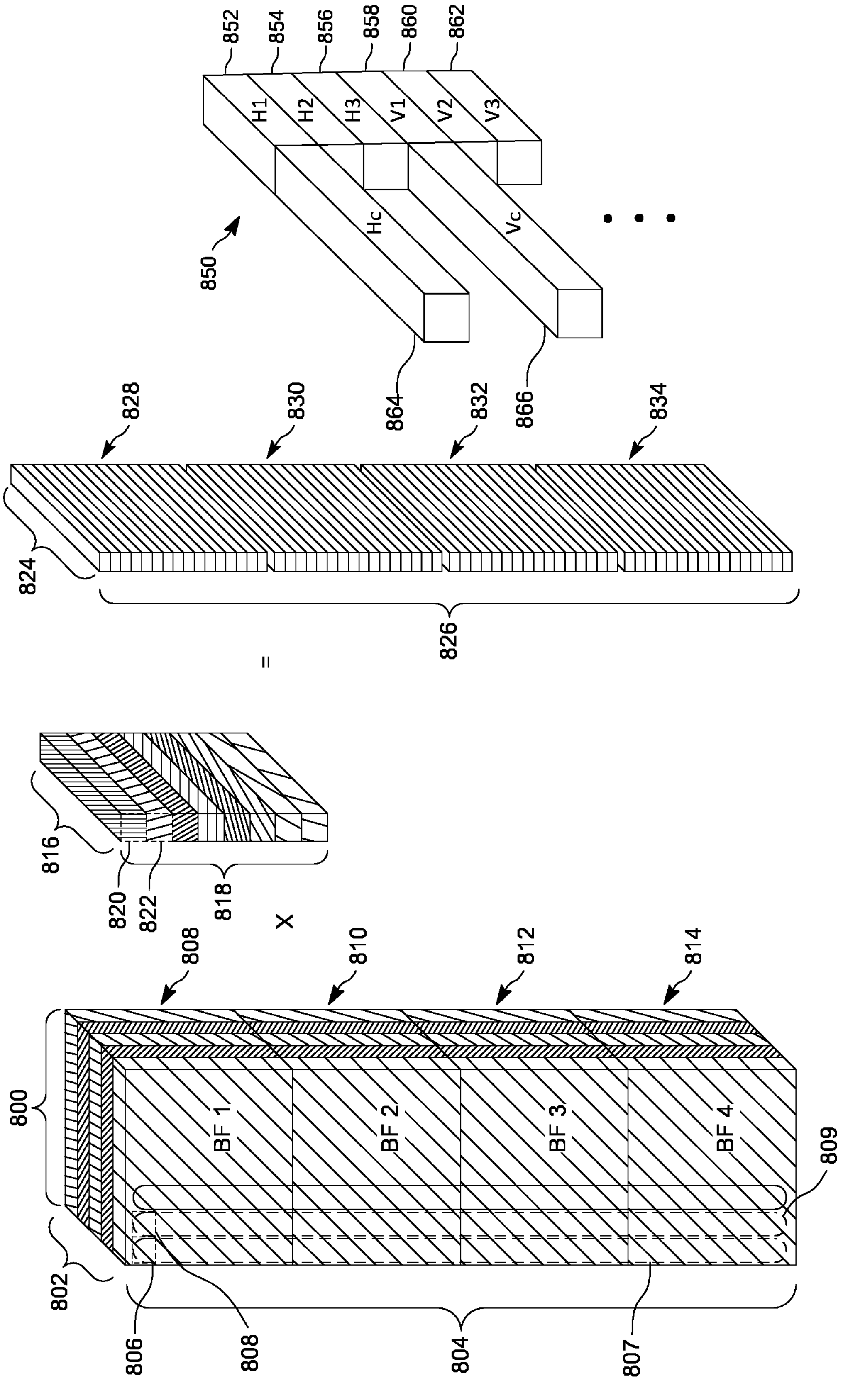
FIG. 8 is a graphical representation of a downlink transmit beamforming operation using a beamforming/precoding matrix operating on user data layers to generate antenna-specific IQ data, in accordance with some embodiments.

FIG. 8 is a graphical representation of a downlink transmit beamforming operation. The user data is represented by layers of data along dimension 818, with subcarrier-specific IQ data of each such layer depicted along dimension 816. In some embodiments, the user data layers along the dimension 818 are frequency-domain IQ data layers (e.g., such as the data layers distributed over the respective links 726 to individual secondary beamformers, as discussed in connection with FIG. 7). Each data layer, such as layers 820, 822, may in fact be aggregated user data for one or more users, with different users being assigned/allocated different subsets of subcarriers represented along dimension 816. Further, a given user may be allocated one or more layers of data (along the dimension 818), such as in the case of spatial multiplexing. In this regard, as noted above, each (user) data layer may include subcarrier-specific IQ data allocated among PRBs for one or more users (with each RB (defined as before)).

In some embodiments, the beamformer (e.g., 202, 300, 400, 724 (the primary beamformer), etc.) calculates beamforming weights for the sets of carriers along dimension 802, specific to the user data layers represented by IQ data along dimension 800, and for the signal ports along dimension 804. Note that in the embodiments involving pre-storing of beamforming weights at each of secondary beamformers, the calculation of beamforming weights at a primary beamformer will be omitted. As shown in FIG. 8, in accordance with matrix multiplication, the beamforming weights depicted on the top layer of the matrix (i.e., a horizontal slice of the matrix along dimensions 802 by 800) are applied to the data layers (816×818), to generate the top layer (at the top of dimension 826) of the beamformed IQ data, with the subcarriers along dimension 824. Note that for simplicity, the rows, or layers, along beamforming dimension 804 alternate between H and V polarizations, such that elements 806, 808, for example, each include separate signal port weights, such as an "H" weight and a "V" weight, that are in turn independently used to combine the data layers, such as layers 820, 822, respectively. The H/V pairs of weights, that are depicted as interleaved in the matrix columns in the vertical direction (dimension 804), may be related in some modes of operation, or may be fully independently-selected beams for H and V components (i.e., signal ports). A column of the beamforming matrix, such as column 807 or 809, may be applied to a given set of subcarriers in a corresponding given data layer according to a desired beamforming operation. Note that the beamforming matrix may also incorporate precoding matrix calculations to form linear combinations of data layers according to a desired precoding matrix. In this manner, the beamformer matrix is used to operate on user data layers to generate signal port-specific IQ data.

In the embodiment shown in FIG. 8, each set of beamformed IQ data points are packetized and transmitted to a corresponding transceiver IC/IC subarray, as described with respect to FIG. 3. In some embodiments, the packetized IQ data may remain in the frequency domain. However, in other embodiments, the packetized IQ data may be instead converted to time-domain IQ data. In some embodiments, the IQ data for 64 signal ports along dimension 826 include IQ data for 32 H and for 32 V signal ports. Each of the four sections of signal-port specific IQ data 828, 830, 832, and 834, of 826, contain 16 beamformed IQ data packets that may be combined via concatenation into eight separate dual-signal port H/V packets similar in format to the packet 302 of FIG. 3. Each one of those eight H/V IQ packets contains either time-domain or frequency-domain IQ data and is sent over a single serial data link to a respective transceiver IC subarray, such as one of the respective eight transceiver IC subarrays along the row of subarrays 238*a* depicted in FIG. 2. The IQ data of sections 830, 832, and 834, are each similarly packetized into eight unique IQ data packet streams and sent to eight corresponding transceiver subarrays within transceiver subarray rows 238*b*, 238*c*, and 238*d*, respectively. In this embodiment, each dual-signal port IQ data packet may be commonly processed by two serially-connected transceiver ICs. Alternatively, each of the eight H/V packets obtained from section 828 may be sent to a respective transceiver IC subarray in the first row of transceiver IC subarrays 421*a* of FIG. 4, with similar distribution of dual-signal port IQ packets to rows of transceiver IC subarrays 421*b*, 421*c*, 421*d*. In the embodiment of FIG. 4, each beamformed IQ data packet is commonly processed by three serially-connected transceiver ICs.

By way of example, in operation, a 64-TRX (transmit/receive) massive MIMO RU (e.g., the RU 704) may support 16 downlink beamforming layers and 8 uplink beamforming layers. (Note that in in FIG. 8 only eight layers across 818 are depicted for simplicity). The downlink (DL) beamformer (e.g., one of the secondary beamformers BF #1-4) may be configured to receive a [16×1] complex vector of user data layers as an input for each subcarrier, and then multiply this complex vector by a transmit beamforming submatrix [64×16] containing complex beamforming weights to output a [64×1] complex vector for each subcarrier within each of physical transmit (TX) antenna streams. In this regard, a stream refers to a sequence of frequency-domain IQ data packets for a given signal path (as note above, further conversion to time-domain may be possible). The matrix calculations for one subcarrier are shown below and, in practice, would be extend across the full set of subcarriers. For example, for one subcarrier:

$$\begin{bmatrix} tx0 \\ tx1 \\ tx2 \\ \vdots \\ tx63 \end{bmatrix}, 64\times 1 = \begin{bmatrix} w_{0,0} & w_{0,1} & \cdots & w_{0,15} \\ w_{1,0} & w_{1,1} & \cdots & w_{1,15} \\ w_{2,0} & w_{2,1} & \cdots & w_{2,15} \\ \vdots & \vdots & \ddots & \vdots \\ w_{63,0} & w_{63,1} & \cdots & w_{63,15} \end{bmatrix} \begin{bmatrix} \text{layer } 0 \\ \text{layer } 1 \\ \vdots \\ \text{layer } 15 \end{bmatrix},$$

$$16\times 1 = \begin{bmatrix} w_{0,0}\times\text{layer } 0 + w_{0,1}\times\text{layer } 1 + \ldots + w_{0,15}\times\text{layer } 15 \\ w_{1,0}\times\text{layer } 0 + w_{1,1}\times\text{layer } 1 + \ldots + w_{1,15}\times\text{layer } 15 \\ w_{2,0}\times\text{layer } 0 + w_{2,1}\times\text{layer } 1 + \ldots + w_{2,15}\times\text{layer } 15 \\ \vdots \\ w_{63,0}\times\text{layer } 0 + w_{63,1}\times\text{layer } 1 + \ldots + w_{63,15}\times\text{layer } 15 \end{bmatrix}$$

The [64×1] output vector is split into groups of physical antenna streams, with one group for a set of transmit antenna streams designated for each transceiver IC subarray. In embodiments in which each transceiver IC can generate two unique transmit signal paths (or simply signals), and where each subarray has two transceiver IC devices, each group would include packets associated with four separate physical antenna streams. In other embodiments in which each transceiver IC device can generate four unique transmit signals and each subarray has two transceiver devices, then each group would include packets associated with eight separate physical antenna streams. In yet further embodiments in which each transceiver IC device can generate four unique transmit signals and each subarray has only one transceiver IC device, each group would include packets associated with four separate physical antenna streams. In some embodiments, the complex beamforming weights of the beamforming matrix are specified for each PRB (physical resource block—a group of 12 subcarriers for one slot of seven symbols, for a total of eighty-four resource elements (REs)).

To illustrate, in one example embodiment, each distributed secondary beamformer within a hierarchical beamformer architecture (as discussed above) may be configured to (i) take a [16×1] complex vector of (frequency-domain subcarrier IQ) user data layers as an input, (ii) multiply that complex vector by a [4×16], beamforming transmit submatrix of complex beamforming weights, and (iii) output a [4×1] complex vector for each subcarrier of the four physical transmit antenna (signal) streams. The example calculation is shown below:

$$\begin{bmatrix} tx0 \\ tx1 \\ tx2 \\ tx3 \end{bmatrix} = \begin{bmatrix} w_{0,0}\times\text{layer } 0 + w_{0,1}\times\text{layer } 1 + \ldots + w_{0,15}\times\text{layer } 15 \\ w_{1,0}\times\text{layer } 0 + w_{1,1}\times\text{layer } 1 + \ldots + w_{1,15}\times\text{layer } 15 \\ w_{2,0}\times\text{layer } 0 + w_{2,1}\times\text{layer } 1 + \ldots + w_{2,15}\times\text{layer } 15 \\ w_{3,0}\times\text{layer } 0 + w_{3,1}\times\text{layer } 1 + \ldots + w_{3,15}\times\text{layer } 15 \end{bmatrix}$$

$$\vdots$$

$$\begin{bmatrix} tx60 \\ tx61 \\ tx62 \\ tx63 \end{bmatrix} = \begin{bmatrix} w_{60,0}\times\text{layer } 0 + w_{60,1}\times\text{layer } 1 + \ldots + w_{60,15}\times\text{layer } 15 \\ w_{61,0}\times\text{layer } 0 + w_{61,1}\times\text{layer } 1 + \ldots + w_{61,15}\times\text{layer } 15 \\ w_{62,0}\times\text{layer } 0 + w_{62,1}\times\text{layer } 1 + \ldots + w_{62,15}\times\text{layer } 15 \\ w_{63,0}\times\text{layer } 0 + w_{63,1}\times\text{layer } 1 + \ldots + w_{63,15}\times\text{layer } 15 \end{bmatrix}$$

With respect to the multi-tier beamformed IQ data packets 850, which represent beamformed IQ data for one embodiment of a transceiver IC subarray, a beamformer processor may be configured to generate commonly-processed IQ data packet 864 (in either time-domain or frequency-domain format) for one signal port (representing, e.g., subcarrier IQ data for all subcarriers, or a subset of subcarriers of one component carrier of a signal port), and a second commonly-processed IQ data packet 866 for a second signal port (where the second commonly-processed IQ data packet 866 is in either time-domain or frequency-domain format depending, e.g., on the format of the commonly-processed IQ data packet 864 for the first port), for use by transceiver ICs processing signals according to a first tier of beam forming, while also generating higher resolution beamforming of a second tier. The second-tier beamforming is performed according to fully-digital beamformed IQ packets 852, 854, 856 for processing by individual transceiver ICs and their respective horizontal signal ports (H1, H2, H3, as denoted in FIG. 8), and fully-digital beamformed IQ packets 858, 860, 862 for processing by individual transceiver ICs and their respective vertical signal ports (V1, V2, V3, as denoted in FIG. 8), as described previously with respect to FIG. 3. Further, as previously described, the second-tier beamformed IQ data packets may contain subcarriers associated with the same component carrier as the commonly-processed IQ data packets, or subcarriers associated with a second component carrier.

More specifically, a first beamformed IQ data packet may include IQ data 864 (labeled Hc, where "c" designates IQ data for common processing), 866 (Vc), for common processing by all transceiver ICs in a given transceiver IC subarray (e.g., three separate transceiver ICs, each capable of 2T2R operation). Three additional packets of transceiver IC specific IQ data containing, respectively, data 852 concatenated with data 858; data 854 concatenated with data

860; and data 856 concatenated with data 862, are also transmitted to the transceiver IC subarray, wherein a first transceiver IC combines commonly-processed data 864 with data 852, and combines commonly-processed data 866 with data 858. Another transceiver IC combines commonly-processed data 864 with data 854, and combines commonly-processed data 866 with data 860, and a third transceiver IC combines commonly-processed data 864 with data 856, and combines commonly-processed data 866 with data 862.

Figure 9:
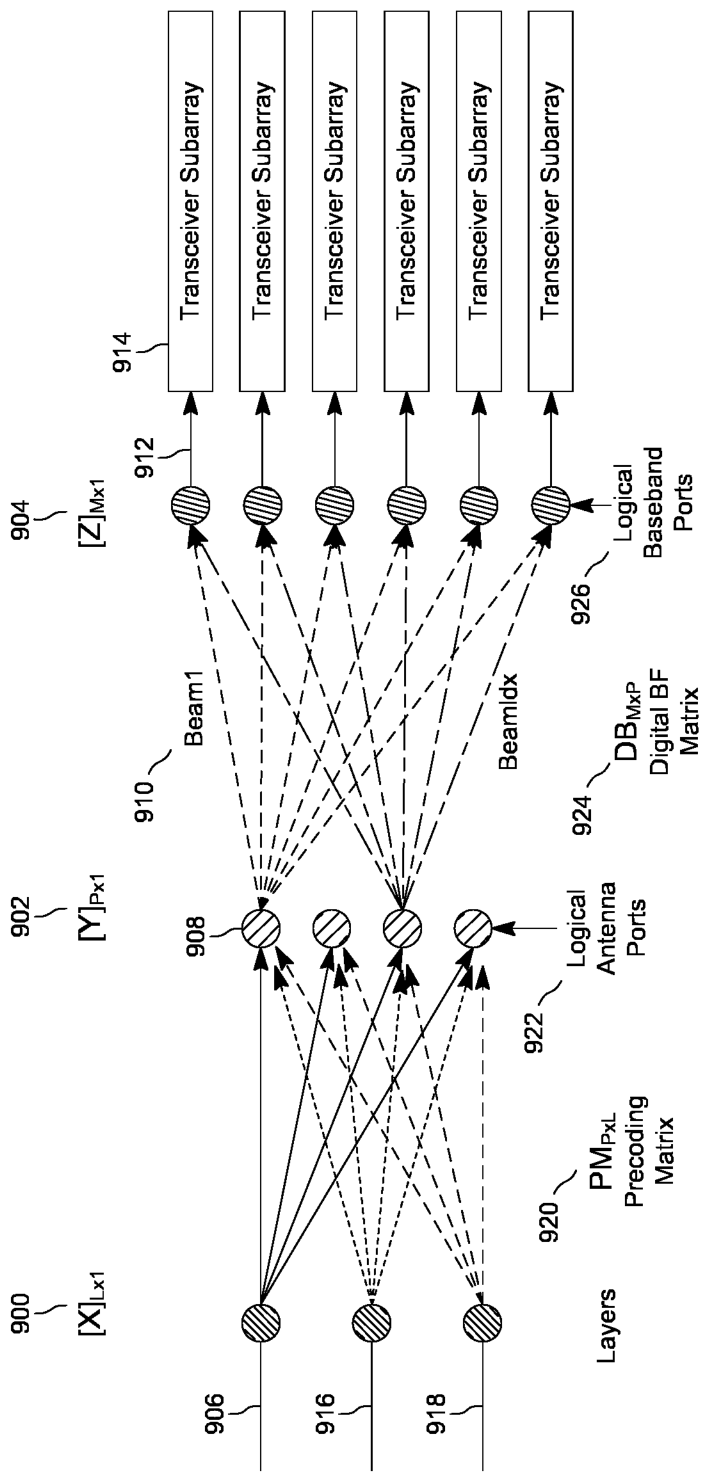
FIG. 9 is an illustration of the conversion of user data layers to beamformed downlink transmit data streams according to a precoding operation followed by a beamforming operation, in accordance with some embodiments.

FIG. 9 is a graphical illustration of the conversion of user data layers 906, 916, 918, represented by matrix [X] 900 of dimension L (i.e., a number of layers), to beamformed downlink transmit IQ data packets at logical baseband ports 926 represented by matrix [Z] 904 of dimension M. In some embodiments, the user data layers 906, 916, 918 remain in a frequency-domain format until the data associated therewith is beamformed. After the beamforming operation is completed, in some embodiments, the beamformed downlink transmit IQ data may be packetized to form beamformed frequency-domain IQ data packets. As noted above, in some further embodiments, the beamformed frequency-domain IQ data packets may be further converted to beamformed time-domain IQ data packets for transmission to respective transceiver ICs or transceiver IC subarrays (e.g., transceiver subarrays 914, as in FIG. 9). According to the simplified signal processing depicted in FIG. 9, the data layers [X] 900 undergo a precoding operation by matrix PM 920, according to a precoding operation, to obtain logical antenna port signals 922 represented by matrix [Y] 902, followed by a beamforming operation by digital beamforming matrix DB 924, using various beamforming beam indices (e.g., "BeamIdx") having weights such as "Beam1" 910, which applies the beam weights and distributes the appropriately weighted precoded signal at node 908 (which is a pre-coded linear combination of data layers 906, 916, 918) across the various logical baseband ports 926, represented by matrix [Z] 904 (also depicted as IQ data 828, 830, 832, 834). Each beamformed packet of matrix [Z], such as IQ data packet 912, is conveyed to its corresponding transceiver IC subarray 914. As explained above, the data packet 912 may contain either frequency-domain IQ data or time-domain IQ data.

Figure 10:
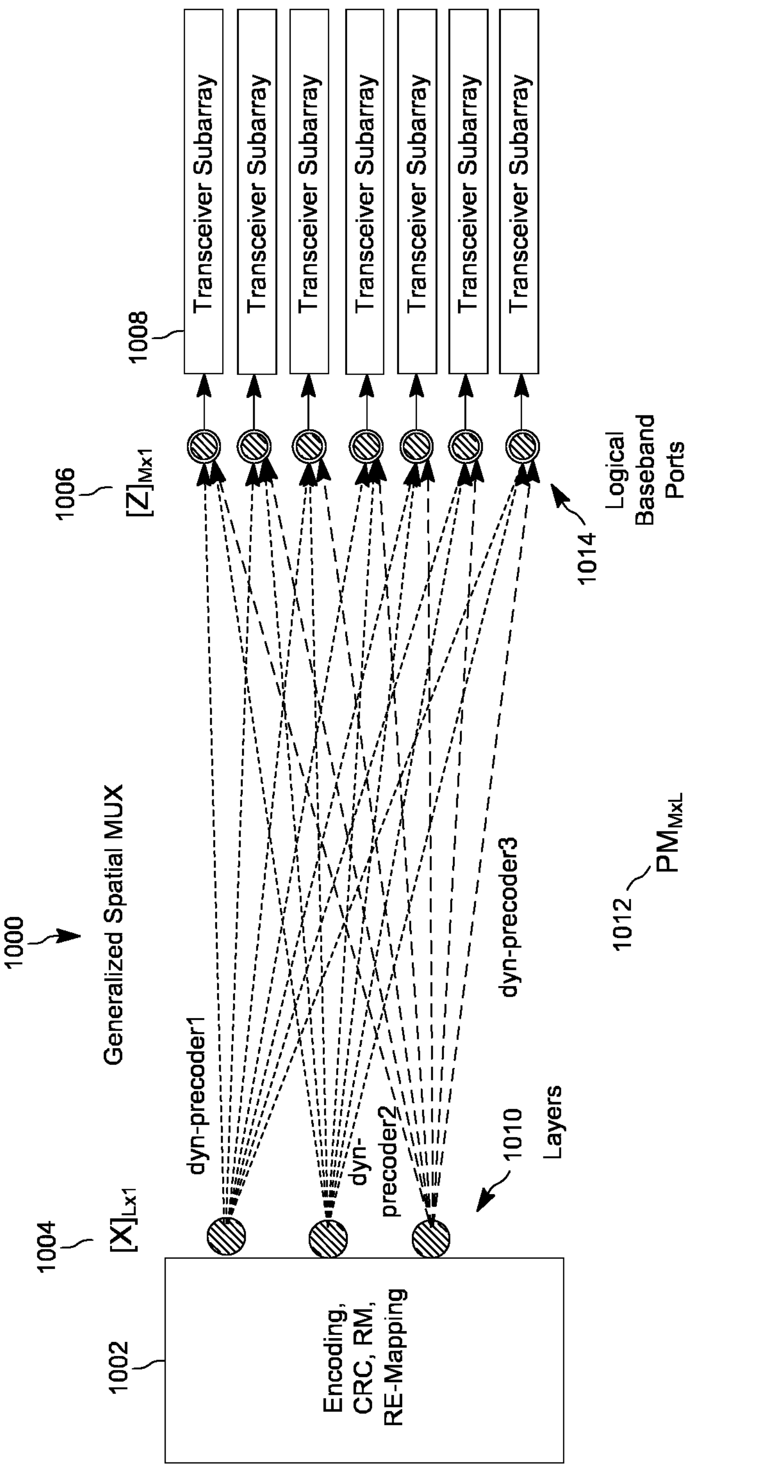
FIG. 10 is an illustration of the conversion of user data layers to beam formed data streams according to a generalized combined precoding and beamforming operation, in accordance with some embodiments.

FIG. 10 is an illustration of the conversion of user data layers to beamformed IQ data streams according to a generalized combined precoding and beamforming matrix 1012 operation 1000 resulting from a matrix multiplication of precoding matrix PM 920 and beamforming matrix DB 924. The user IQ data layers [X] 1004 are provided by processor 1002 which provides user IQ data that has been processed according to standard encoding, cyclic redundancy checks (CRC), rate matching (RM) and resource element (RE) mapping. The data layers [X] 1004 are processed according to the generalized spatial multiplexer/beamformer matrix PM in transformation 1000, to generate the logical baseband port IQ signal packets 1014 represented by signal port IQ data matrix [Z] 1006 for transmission over respective serial data links to transceiver IC subarrays, such as subarray 1008. As used herein, the term "beamforming" and "beamforming matrix" refer to the combined beamforming/precoding operation as described, whether implemented in a single matrix operation, or multiple separate matrix operations. As described in connection with FIG. 9, IQ data packet that is conveyed to its corresponding transceiver IC subarray 1008 from each respective logical baseband port 1014 (and hence following beamforming/precoding operations) may be either a frequency-domain IQ data packet or a time-domain IQ data packet (if converted to time domain).

Figure 11:
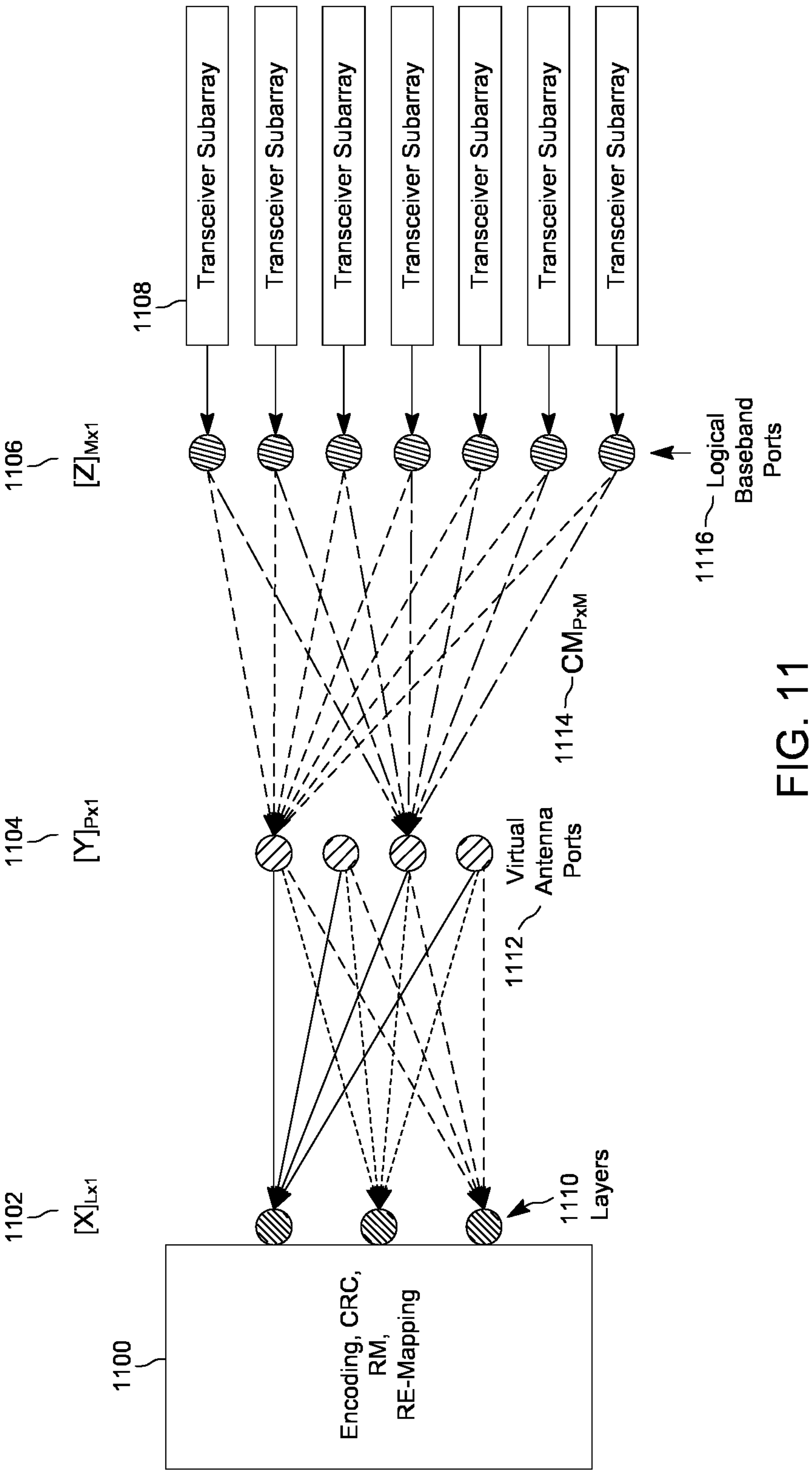
FIG. 11 is an illustration of receive uplink signal processing including receive beamforming and layer decoding, in accordance with some embodiments.

FIG. 11 is an illustration of receive uplink signal processing including receive beamforming and layer decoding. Each transceiver IC subarray 1108 provides received IQ data to the beamformer processor as logical baseband ports 1116 represented by matrix [Z] 1106. Virtual antenna port signals 1112 may be formed according to matrix [Y] 1104. Finally, the individual data layers 1110 represented by matrix [X] 1102 may be recovered.

Figure 12:
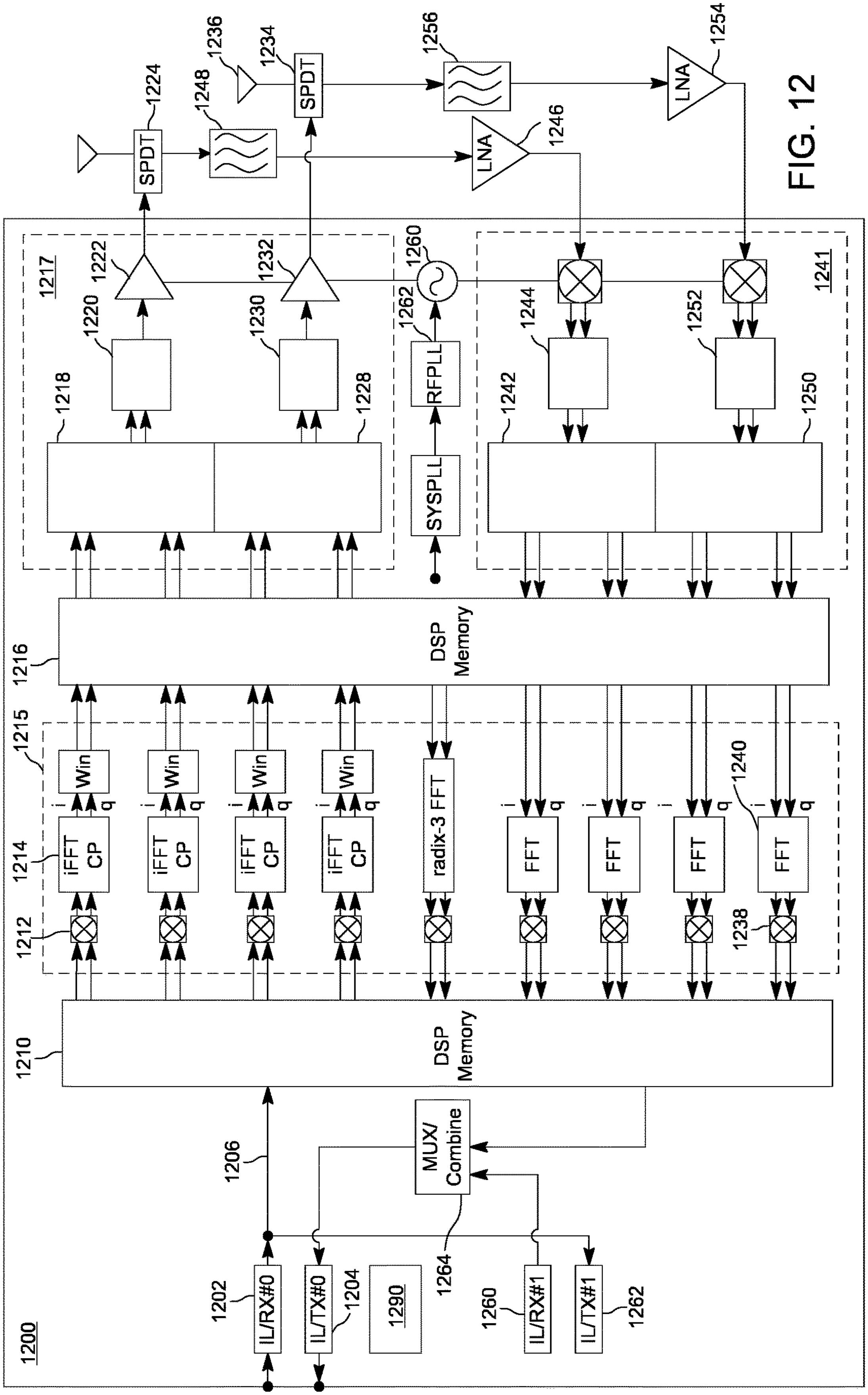
FIG. 12 is a transceiver device architecture for forming groups of serially-connected transceivers, where each transceiver includes an integrated digital signal processor for converting frequency domain digital data to/from time domain digital data, a plurality of integrated digital power amplifiers for converting digital baseband time domain signals to amplified analog RF signals, and analog RF downconverters and analog to digital converters, in accordance with some embodiments.

FIG. 12 depicts a block diagram of a transceiver IC device architecture, and which is also suitable for forming groups of serially-connected transceivers. The transceiver IC is suitable for operation in a FDD mode and in a TDD mode, and the configuration depicted in FIG. 12 is connected for operation in TDD mode. Each transceiver IC 1200 includes multiple signal processing paths for both transmit signal processing and receive signal processing. For DL transmit signal processing, transceiver IC 1200 includes a serial data receiver RX #0 1202 for receiving frequency domain IQ data packets via serial data receiver 1202. The serial data receiver 1202 includes a data buffer for storing a number of deserialized data words, and data analysis circuitry to perform packet header analysis, to determine if the received packet is intended for processing by the current transceiver IC and/or if it is intended for processing by one or more other transceiver ICs in the transceiver IC subarray. In the event that the packet is to be processed locally, it is forwarded via 1206, such as via a memory storage or direct memory access (DMA) operation, to DSP memory 1210 that is accessible to the integrated digital signal processor (DSP) 1215. In an alternative embodiment, the header inspection may be performed by the DSP 1215, which places the data in DSP memory 1210 designated for retransmission via serdes transmitter TX #1 1262.

The DSP 1215 includes programming stored in non-volatile memory that when executed causes the DSP 1215 to execute an algorithm 1214 for converting frequency domain digital IQ data to time domain digital data. The stored algorithm instructions contain processor instructions for an iFFT operation 1214, and further includes instructions for extending the converted data by the addition of a cyclic prefix (CP)).

In subarray beamforming as described herein, each IC in a given subarray processes the same frequency domain IQ packets for transmission (referred to herein as "commonly processed" IQ data), and during reception generates frequency domain IQ packets that are aggregated at each transceiver IC as they traverse the set of cascaded set of transceiver ICs on their way towards the beamformer processor(s). Because the signals being commonly processed by the transceiver ICs are aggregated beamformed signals with components from multiple data layers and multiple individual beams, it is not possible to adjust individual beams within a given subarray of commonly processed IQ data packets. However, it is possible to apply unique phase rotations to the aggregated beamformed signal at each element (i.e., each signal port) in the subarray that will have the effect of tilting the entire composite/aggregated beamformed signal. Thus, when beam tilt is desired, the transceivers are configured to incrementally adjust the phases of each commonly processed IQ data packet according to the position of the radiating elements driven by the transceiver IC in the IC subarray. Without incremental adjustment of the phase at each subarray element, a true tilt is not obtained, as only perhaps only one of the elements would be aligned, and the wavefront from the remaining elements would incrementally lead (or lag) according to their position in the subarray for a given downward (upward) tilt. In this manner, beam tilt may be obtained through baseband signal processing without adjusting any signal component directly in the analog domain (including not adjusting VCO phases).

More specifically, when a linear array of antenna elements is physically "tilted" (either a vertical array tilted in altitude up/down, or a horizontal array tilted in azimuth left/right), the result may be viewed as an incremental time delay of signal transmissions (or reception) across the antenna elements of the array that thereby changes the direction in which the propagation wave fronts add constructively to form a main lobe (and destructively combine to form nulls). Electronic tilt is the process of imposing appropriate signal delays without actually physically repositioning the antenna. The relationship between a time delay and the corresponding phase change of a signal is dependent upon the tilt angle as well as the frequency of the signal. That is, a given time delay between two signals amounts to a linear phase shift in the frequency content of the signals where a given time delay results in lower phase changes of lower frequencies within the signal and linearly higher phase changes at higher frequencies. Thus, for narrow-band signals, a specific time delay roughly translates to a specific phase shift between the delayed signals. But for wideband signals, such as OFDM signals of 50 or 100 MHz or greater, a given time delay affects the phase of the OFDM subcarriers differently. In a phased array where each subcarrier is nonetheless rotated by the same phase, this results in a non-linear phase characteristic commonly referred to as beam squint. Some amount of beam squint is acceptable in OFDM signals on the order of 100 MHz in bandwidth.

Thus, electronic beam tilting in a physically-static array may be accomplished by various methods carried out by the individual transceivers described herein, including: (i) applying an incremental phase rotation to each subcarrier frequency-domain IQ data point (via, e.g., and NCO), (ii) applying a constant phase rotation to each subcarrier frequency-domain IQ data point (e.g., via a complex multiplication), (iii) applying a constant phase rotation to each sample of the baseband time domain signal (e.g., via a complex multiplication), (iv) imposing time delays in the discrete time domain signals of the transmit baseband signals, or, (v) a combination of the above methods. Note that methods (ii) and (iii) will result in some amount of beam squint distortion.

In this regard, beam tilt may be implemented by applying a linearly increasing phase rotation across the subcarriers by complex multiplier 1212 implemented as a Numerically Controlled Oscillator (NCO) as described with respect to NCO 542 of FIG. 5. The NCO 1212 is configured to provide a sequence of complex numbers having a linearly increasing phase for multiplication by the corresponding sequence of subcarrier frequency-domain IQ data points. For a desired beam tilt, the initial phase and the incremental rate at which the phase increases from subcarrier to subcarrier is determined and the values are loaded into the NCO phase accumulator 564 and the FCW register 562, respectively. The phase increment value may be determined according to one or more various factors, including (i) a desired beam tilt angle, (ii) subcarrier spacing, (iii) the carrier frequency, and (iv) the location of the particular radiating element being driven by the transceiver IC. In general, to achieve a beam tilt of angle $\phi$, the phase rotation $\theta$ for a given subcarrier frequency ($1/\lambda$), at a location n within the array, is given by $$\theta = n\pi\left(\frac{\lambda_c}{\lambda}\right)\sin(\phi),$$

where the elements are spaced a distance $d=\lambda_c/2$ apart, for carrier wavelength $\lambda_c$. In receive beam tilt operation, the NCO may be implemented in complex multiplier 1238 after FFT processing.

Alternatively, complex multiply 1212 may be configured to provide a constant phase rotation to each frequency domain IQ data point prior to transformation via iFFT 1214 to implement an approximate time delay to achieve beam tilt. For a desired beam tilt, the frequency-domain phase rotation, represented by a single complex number, is determined and the value loaded into the complex multiplier 1212. The frequency domain phase value may be determined according to one or more various factors, including (i) a desired beam tilt angle, (ii) the array location of the particular radiating element being driven by the transceiver IC, and (iii) the carrier frequency. In receive beam tilt operation, the constant phase rotation may be implemented in complex multiplier 1238 after FFT processing.

In some embodiments, beam tilt is implemented by applying a constant phase rotation to each sample of the baseband time domain signal (e.g., via a complex multiplication). For a desired beam tilt, the time-domain phase rotation, represented by a single complex number, is determined and the value loaded into the complex multiplier 1306 (which may also simultaneously implement a gain function). The time-domain phase value may be determined according to one or more various factors, including (i) a desired beam tilt angle, and (ii) the location of the particular radiating element being driven by the transceiver IC. In receive beam tilt operation, the constant phase rotation may be implemented in complex multiplier 1386 (while also implementing a gain function) prior to FFT processing.

In some embodiments, beam tilt is implemented by imposing time delays in the discrete time domain signals of the transmit baseband signals. For a desired beam tilt, the time-domain delay is determined and the value loaded into the delay buffer 1312. The time-domain delay value may be determined according to one or more various factors, including (i) a desired beam tilt angle, (ii) the time-domain sample rate, and (iii) the location of the particular radiating element being driven by the transceiver IC. In receive beam tilt operation, the time delay may be implemented in delay buffer 1378.

In further embodiments, a combination of the above methods may be used. In one particular embodiment, electronic beam tilt may be composed of a coarse adjustment and a fine adjustment, where a coarse beam tilt may be implemented by applying a linearly increasing phase rotation across the subcarriers by complex multiplier 1212 implemented as an NCO using a limited resolution or limited number of bits, and the fine resolution may be implemented by a further adjustment in the time domain, such as a time delay or a time-domain constant phase rotation.

For the various embodiments of beam-tilt phase adjustments, the phase rotations may be specified by control message(s) provided to the transceiver ICs. The specific phase values may be provided, or a phase index value may be included in the control message, or in the header of the IQ data packet itself. The phase index value may be used to retrieve precomputed phase values from, e.g., a look up table. In some embodiments, transceiver ICs may combine factors to calculate the specific rotations to be applied (e.g., a desired tilt angle may be provided, and the transceiver IC may adjust the phase rotations according to its predetermined location within the array and/or transceiver IC subarray). Such phase rotations may be used to implement a beam-tilt phase rotation.

In some embodiments, the beam tilt may be implemented using a combination of linear phase rotations applied in the frequency domain, followed by either a constant phase rotation in the time domain, or a time delay in the time domain after iFFT conversion. In some embodiments, the frequency domain rotations may achieve a coarse tilt, or an approximation of the desired beam tilt, while the time domain rotations may a fine tilt. This may be particularly useful when larger tilt angles are desired.

In further embodiments, a dynamic adjustment of tilt angles may be implemented on a slot by slot basis, greatly enhancing the available scan range and coverage from a panel array using subarray beam forming. In such embodiments, the beam tilt information as well as which time slots, subcarriers or component carriers may be specified via in control messages.

In one embodiment, an electronic antenna beam tilt is implemented in a transceiver subarray by distributing a beamformed IQ data packet to a plurality of serially-connected transceiver ICs for common processing by the transceivers. The IQ data packet has individual IQ values for a respective plurality of subcarriers. At each transceiver IC, an electronic beam tilt phase rotation is applied. In some embodiments, applying a beam tilt phase rotation is done by altering the phase of each IQ modulated subcarrier based on a desired antenna tilt and an array position. The phase alteration may be a constant phase rotation applied to all subcarriers, or it may be a linearly increasing phase rotation that increases from subcarrier to subcarrier. The phase adjustment may be specified according to one or more control messages. The control messages may be specific to a given subarray, a transceiver IC within a subarray, or to an individual transceiver IC. The phase adjustment may be specified in terms of a time delay, frequency-domain multiplicative rotation, or time domain complex rotation, or equivalent data. A given transceiver IC may also combine the phase adjustment data with array position data unique to the transceiver IC to calculate the final phase adjustment.

Referring back to FIG. 12, the time-domain IQ data is stored in DSP memory 1216, which is accessible by transmit time-domain signal processing circuit 1217 (further described with respect to FIG. 13A). In the embodiment of FIG. 12, circuit 1217 includes two parallel component carrier processing circuits 1218, 1228, and corresponding time domain signal processing circuits 1220, 1230, each providing a baseband time-domain OFDM signal (each being a single or multi-component carrier signal) to a corresponding digital power amplifier (DPA) circuit 1222, 1232.

In one embodiment, the DPAs 1220, 1232, perform simultaneous RF modulation and amplification, which amplification may be a final power amplification of the RF signals. In some embodiments, the DPAs provide for a pre-amplification of the RF signals that are then applied to an external power amplifier that drives the radiating antenna element(s). The external power amplifiers are distributed across the active antenna panel assembly in an element-wise adjacency. The DPAs 1220, 1232 are provided with a plurality of RF carrier phases originating from the system phase-locked-loop (SYSPLL), further processed by the synchronized RF PLL 1262, which drives the RF carrier generator VCO 1260. The selected RF carrier phases are used to switch amplifier cells within the DPAs. As described herein, the specific RF carrier phases, and the respective number of activated cells that determine their relative magnitudes, are selected according to the time-domain IQ data points provided by circuits 1220, 1230.

The transceiver IC 1200 also includes a receive time-domain signal processing circuit 1241 (further described with respect to FIG. 13B) for downconverting analog RF signals via IQ mixers driven by the VCO 1260, and which generate separate baseband I and Q analog signals for sampling by an analog to digital converter (ADC) within circuits 1244, 1252. The sampled signals are then processed by time-domain filtering and downsampling circuits 1242, 1250. The processed time domain signals are then stored in DSP memory 1216 for further processing, including CP removal and conversion to the subcarrier-specific frequency domain IQ data via FFT algorithm ("FFT" 1240 in FIG. 12). The DSP 1215 includes programming stored in non-volatile memory that when executed causes the DSP 1215 to execute an algorithm for converting time domain digital data to frequency domain digital IQ data. NCOs (e.g., 1238) may then be used to apply a linearly increasing phase rotation to each frequency domain IQ (i.e., subcarrier) value, which is also an embodiment of electronic beam tilt. The receive IQ frequency domain data is then processed by MUX/combine circuit 1264, for transmission to the serial data bus via serial transmitter TX #0 1204.

FIG. 13A is a block diagram 1300 of the time domain signal processing circuit 1217. Frequency domain IQ data is received from DSP memory over lines 1302 (and similarly, 1304, 1344, 1346), and is applied to signal path power detector and to a gain unit 1306 for adjusting the power level. In some embodiments, the gain multiplier may also include a complex phase that rotates each time domain value by the same phase. This time-domain phase rotation may be used to apply an approximate time delay that can be used to implement an electronic beam tilt. While this corresponds to a phase rotation of each constituent subcarrier by the same phase, rather than a linearly incremented phase rotation, it is sufficiently accurate for bandwidths on the order of 100 MHz in the frequency ranges of the bands used for LTE and 5G signal. The signal is filtered by FIR filter stage 1308, which also includes one of more interpolation stages to increase the sample rate of the discrete time domain signal. The discrete time digital UL signal is then processed by numerically controlled oscillator (NCO) 1310. The NCOs (e.g., 1310) may be configured to multiply the time domain signal by a complex sinusoid function to perform a frequency shift of the baseband signal to a desired frequency range, such as a separate frequency range that does not overlap with other component carriers. In some embodiments, one transmit signal may be slightly shifted up in frequency, while another transmit signal, such as a separate component carrier provided on connection 1304, may be slightly shifted downward with the corresponding NCO, such that the two time domain signals representing e.g., two component carriers, may be added together without the frequency content of one signal overlapping that of the other. The signal is further processed by a delay buffer 1312 that allows refined time offset adjustments of the transmit signal. In some embodiments, the delay buffer 1312 is used to provide a per-carrier delay adjustment. The delay buffer 1312 compensates for the different processing times of the different supported sub carrier spacing (SCS) and bandwidths. Assuming all the filtering is done with a FIR filter for every carrier, the adjustable delay per carrier is the difference between the larger delay and the shortest one, on the order of 10 us. However, sharing that function with windowing relaxes that requirement.

Other discrete time domain signals 1304, 1344, 1346, resulting from the frequency domain conversion to the time domain from DSP 1215 are similarly processed. The signals may then be combined and/or routed via MUX/ADD circuit 1314 to the transmit signal processing circuits 1316, 1348, for crest factor reduction (e.g., CFR 1318), further FIR filtering (including further upsampling/interpolation) and IQ multiplication to perform phase adjustments and/or corrections (e.g., FIR IQ circuit 1322). The signal may also undergo digital pre-distortion (DPD, e.g., DPD circuit 1324) to correct for phase and amplitude distortion present in the modulator/amplifiers DPA 1328*a*, 1328*b*, for the first signal port 1342 from RF signal summer 1340 (and for DPA 1328*c*, 1328*d*, for signal port 1350). Each section 1328*a-d* of the DPA includes a clock domain crossing circuit 1330, Cascaded Integrator-Comb (CIC) filters 1332, mapper circuits 1334, delay circuits 1336 and a final DPA stage 1338.

FIG. 13B depicts the receive signal processing portion of the transceiver. Digital samples from the ADCs are received by the clock domain crossing circuit 1362 and adjusted for DC offsets by DC offset circuit 1364. IQ multiplier 1366 may be used to provide an automatic gain control of the baseband time-domain signal in response to power measured by power detector PD 1368. Quadrature Error Compensation circuit (QEC 1370) provides compensation for frequency dependent quadrature error in the RX analog front-end. In one embodiment, the QEC block 1370 divides the time domain signal (having, e.g., a sample rate of 245.76 MHz) into 16 frequency bins of 15.36 MHz each. Each frequency bin is added to the mirror frequency bin content shaped by a complex multiplier. Notch filter 1372 may be used to reduce any undesired out-of-band signals.

The MUX 1374 may be configured so as to selectively direct the receive signal samples from either path RX0 (1360), or RX1 (1394) to any or all the RX signal paths 1376, 1392, 1396, or 1398. Some examples of different possibilities are: RX0 to all 4 RX signal paths; RX1 to all 4 RX Signal paths; RX0 to RX Signal path 1376 and 1392 and RX1 to RX Signal path 1396 and 1398; and, RX0 to RX Signal path 1376 and RX1 to RX Signal paths 1392, 1396, and 1398. Each RX Signal path includes delay buffers (e.g., 1378), NCOs (e.g., 1380), FIR filter and downsamplers (e.g., 1384, 1382), and power detectors (e.g., PD 1390). Note that gain multipliers (e.g., 1386), may also implement a constant phase rotation to the time domain signal. In such an embodiment, this is equivalent to a constant phase shift applied to each subcarrier, rather than a linearly increasing phase shift across the subcarriers, but nonetheless provides for an adequate approximation of a time delay for purposes of implementing electronic beam tilt. FIR 1382 may also include a notch filter for removing a component carrier that is not being processed by the given signal path. In some embodiments, the NCO 1380 may be used to apply a time-domain frequency shift that moves the desired component carrier to the low-pass passband of the notch filter 1382.

Figure 14:
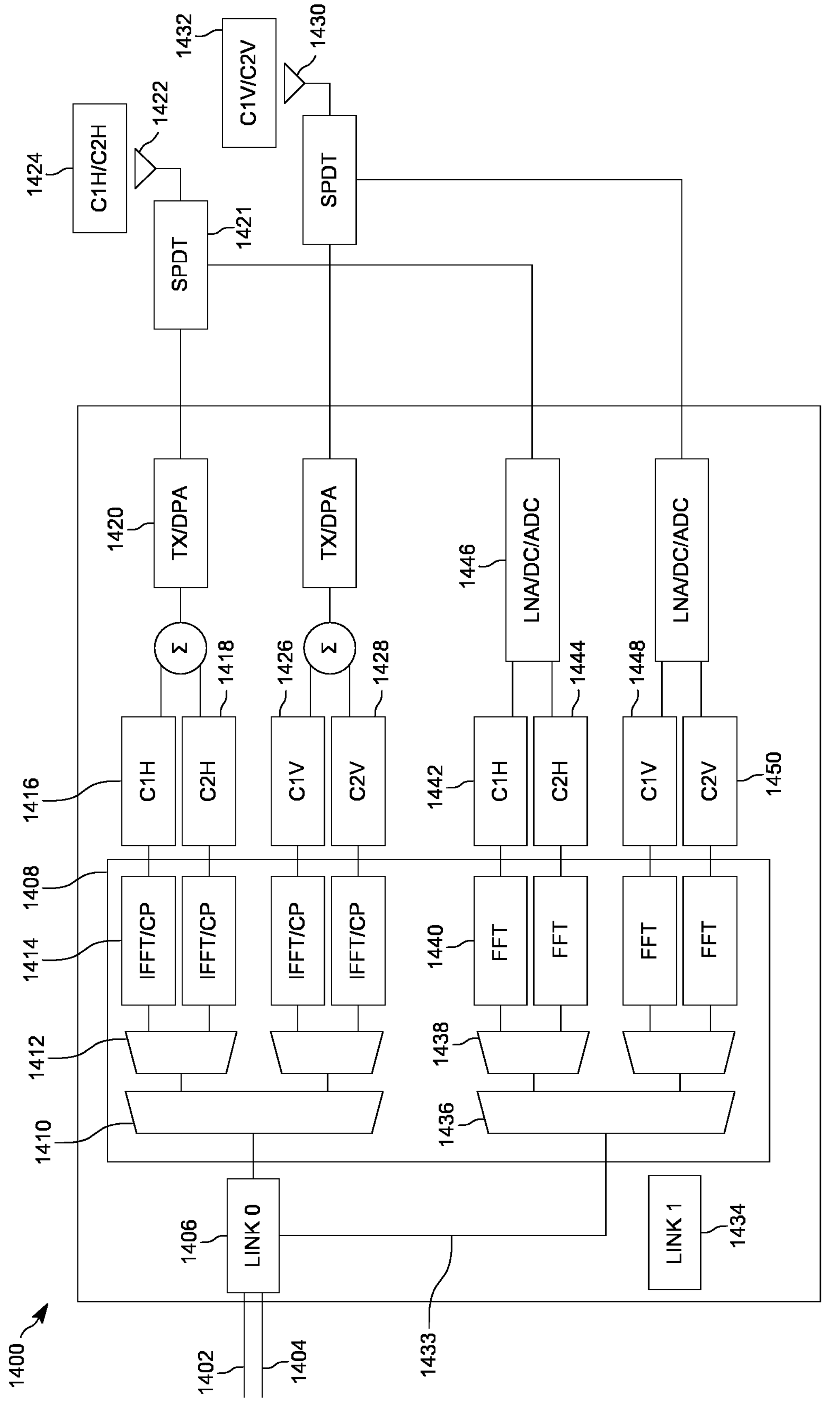
FIG. 14 shows signal processing flows through the transceiver device of FIGS. 12, 13A and 13B for a dual-carrier, dual-polarized communication signal, in accordance with some embodiments.

FIG. 14 depicts a generalized configuration of example signal processing through the transceiver IC device of FIGS. 12 and 13 for a dual-carrier, dual-polarized communication signal, in accordance with some embodiments. More specifically, an example of signal processing configuration illustrated in FIG. 14 may be applicable in embodiments involving communication of data packets associated with two different carriers (e.g., two component carriers), with each carrier signal having two polarizations (e.g., horizontal and vertical polarizations, as described hereinbefore). In illustrative embodiments, the transceiver device is a transceiver IC. Further, in the example configuration of FIG. 14, the transceiver IC operates in a TDD mode within an OFDM modulated wireless network such as an LTE or 5G-based communication system.

As shown in FIG. 14, a transceiver device (IC) 1400 includes a first serial communication port 1406 (e.g., a first serial port transmitter/receiver, such a Serdes transmitter/receiver) (denoted as "Link 0" in FIG. 14) and a second serial communication port 1434 (e.g., a second serial port transmitter/receiver, such a Serdes transmitter/receiver) (denoted as "Link 1" in FIG. 14). Note, however, that although the transceiver IC is shown as having two separate serial communication ports (1406 and 1434), in the embodiment of FIG. 14, only one of the ports 1406 and 1436 is being used. More specifically, as shown, only the serial communication port 1406 is connected to serial data links 1402 and 1404 for communicating data to/from the transceiver IC, while the serial communication port 1434 is not being actively used. However, in some embodiments, the transceiver IC may be further serially-connected to a second transceiver IC via the port 1434 (e.g., as in various embodiments described herein).

In general, as has been illustrated earlier, the transceiver IC may be configured to process four separate transmit component carriers and four separate receive component carriers. The transceiver ICs are configured with at least two separate transmit signal port paths (chains) and at least two separate receive signal port paths (chains), typically associated with two corresponding antenna radiating elements, although other configurations are possible, as described herein. Also, generally, the transceiver IC includes numerous signal processing elements, among others, an integrated digital signal processor (DSP) for converting frequency-domain digital data to/from time-domain digital data (via a number of iFFTs and FFTs), and for cyclic prefix addition and removal, a plurality of integrated modulating digital power amplifiers (DPAs) for converting digital baseband time-domain signals to amplified analog RF signals, analog RF downconverters, and analog to digital converters, etc.

Referring to FIG. 14, in some embodiments, the serial communication port 1406 may receive (e.g., from a beamformer processor), via the serial data link 1402, data packet streams (e.g. four multiplexed data packet streams) for DL (downlink) transmission, where the packets include packets for a first component carrier (hereinafter, "a carrier C1") and IQ data packets for a second different component carrier (hereinafter, "a carrier C2"), for each of horizontal (H) and vertical (V) polarizations. For sake of brevity, the combinations of two different component carriers and the horizontal and vertical polarizations are denoted herein as "C1H," "C2H," "C1V," and "C2V," respectively. In an UL (uplink) direction, the serial communication port 1406 may receive IQ data packet streams (e.g., four multiplexed sets of IQ data for four sets of OFDM subcarriers) for each of the two carriers C1 and C2, for each of the two H and V polarizations, and transmit those (e.g., to the beamformer processor) via the serial data link 1404. In illustrative embodiments, the packets received at or transmitted from the serial port communication port 1406 contain frequency-domain subcarrier-specific digital IQ data. In some embodiments, different-carrier packets destined for the same transceiver IC may contain unique carrier IDs and be addressed to the same transceiver IC.

As shown in FIG. 14, the serial communication port 1406 may be coupled to a signal processing unit 1408 that includes a number of elements configured to provide various digital signal processing functions, as, e.g., previously described in connection with FIGS. 12 and 13. In some embodiments, the signal processing unit 1408 may be a single Digital Signal Processor (DSP) that performs all of the iFFT and FFT calculations and, e.g., other signal processing functions (not explicitly shown) associated with frequency-domain/time-domain I/Q data signals.

In operation, in a downlink (DL) transmit direction, the IQ packet data streams received via the Link 0 (1406) for DL transmission may be provided to a de-multiplexer (or a similar element, such as a section of memory according to a memory map) 1410 that may separate the received data into two respective data streams for two separate transmit chains: one stream of IQ data for a dual-carrier horizontally-polarized signal (C1H/C2H signal) to be transmitted out of a signal port coupled to a radiating element 1422 and another stream of IQ data for a dual-carrier vertically-polarized signal (C1V/C2V signal) to be transmitted out of a signal port coupled to a radiating element 1430. Elements 1412 (e.g., in the form of a DSP memory) may further separate out horizontal and vertical frequency-domain components (data points) for subcarriers of each respective component carrier C1 and C2, that are then sent to four separate iFFT/CP (IFFT/Cyclic Prefix) elements 1414 for frequency-domain to time-domain conversion to generate four separate discrete time-domain baseband data signals, two for each carrier frequency and two for each signal polarization. Although not explicitly shown, additional time-domain and frequency-domain processing may include, e.g., cyclic prefix addition, frequency offsets, phase and gain adjustments, filtering and sample rate conversions, etc.

In effect, as described above, the incoming data is split into four separate transmit paths. More specifically, illustrated in FIG. 14, the output of the unit 1408 includes (i) two separate discrete time-domain baseband data signals 1416 and 1418, denoted as C1H (1416) and C2H(1418), and (ii) two separate discrete time-domain baseband data signals 1426 and 1428, denoted as C1V (1426) and C2V(1428). As shown, following the frequency-domain to time-domain conversion, the time-domain signals C1H (1416) and C2H (1418) are added (summed) in time and C1V (1426) and C2V (1428) are added (summed) in time, and the results of the signal addition are provided to respective TX/DPA elements 1420 that generally represent transmit RF chains and digital power amplifiers to generate an amplified analog RF signal C1H/C2H (1424) for a horizontal signal port and an amplified analog RF signal C1V/C2V (1432) for a vertical signal port. The signals 1424 and 1432 are then provided to the corresponding radiating elements 1422 and 1430 via respective SPDTs for transmission. Note that although not explicitly shown, as described herein before, additional time-domain processing may include, e.g., additional sample rate conversions, Crest Factor Reduction (CFR), Digital pre-Distortion (DPD), etc.

In operation, in a receive direction, data-modulated dual-component carrier RF uplink signals may be received by the transceiver IC (1400) at the horizontal and vertical signal ports via the radiating elements 1422 and 1430. For ease of discussion and merely for the sake of example, assume that the amplified analog RF signal C1H/C2H (1424) and the amplified analog RF signal C1V/C2V (1432) are now uplink signals received by the transceiver IC. As shown in FIG. 14, the horizontally and vertically-polarized RF signals may be provided, via the respective SPDT, to separate LNA/DC/ADC elements 1446. The LNA/DC/ADC elements 1446 may perform RF to baseband signal conversion, analog to digital signal conversion, followed, e.g., by further time-domain processing (e.g., quadrature error correction, filtering, etc. (not explicitly shown)).

As further shown, the outputs of the elements 1446 include two copies of discrete time-domain baseband data signals. The two signals are filtered by FIR filters 1442, 1444, but one of the signals is first shifted in frequency by an NCO (within either filter 1442 or 1444), to separate the component carriers. The separated carriers are denoted as C1H (1442) and C2H (1444). Two additional identical discrete time-domain baseband data signals are provided to filters 1426 and 1428, and generate time domain signals representing component carrier time domain signals (after NCO conversion and FIR filtering) denoted as C1V (provided by filter 1448) and C2V (provided by filter 1450). Those four separate time-domain baseband signals 1442, 1444, 1148, and 1450 (two for each carrier and two for each polarization) are next input into the DSP 1408 for signal processing, including CP removal and conversion from time-domain IQ signal samples to frequency-domain IQ data representing the magnitude and phase of the respective subcarriers of the corresponding component carriers.

Hence, the receive RF signals are effectively split into four discrete time-domain baseband data signals to be processed on four separate receive paths. More specifically, the C1H signal (1442), the C2H signal (1444), the C1V signal (1448), and the C2V signal (1450) are parsed, such as by memory mapping, for four separate FFT signal processing operations (e.g., 1440) for time-domain to frequency-domain conversion (via FFT) to generate four separate frequency-domain IQ data packets (or streams of packets, with each packet in the stream representing a symbol time within a slot), for each of the two component carrier frequencies, for each signal polarization.

Although not explicitly shown, other time-to-frequency pre-conversion signal processing may include, e.g., sample rate conversion, filtering, cyclic prefix detection and removal, etc., as described hereinabove. Following the conversion performed by the FFT elements 1440, elements 1436, 1438 (e.g., in the form of a DSP memory and digital logic) may subsequently formulate IQ data packets for the different component carriers associated with both component carriers C1 and C2 for each polarization (H or V).

Figure 15:
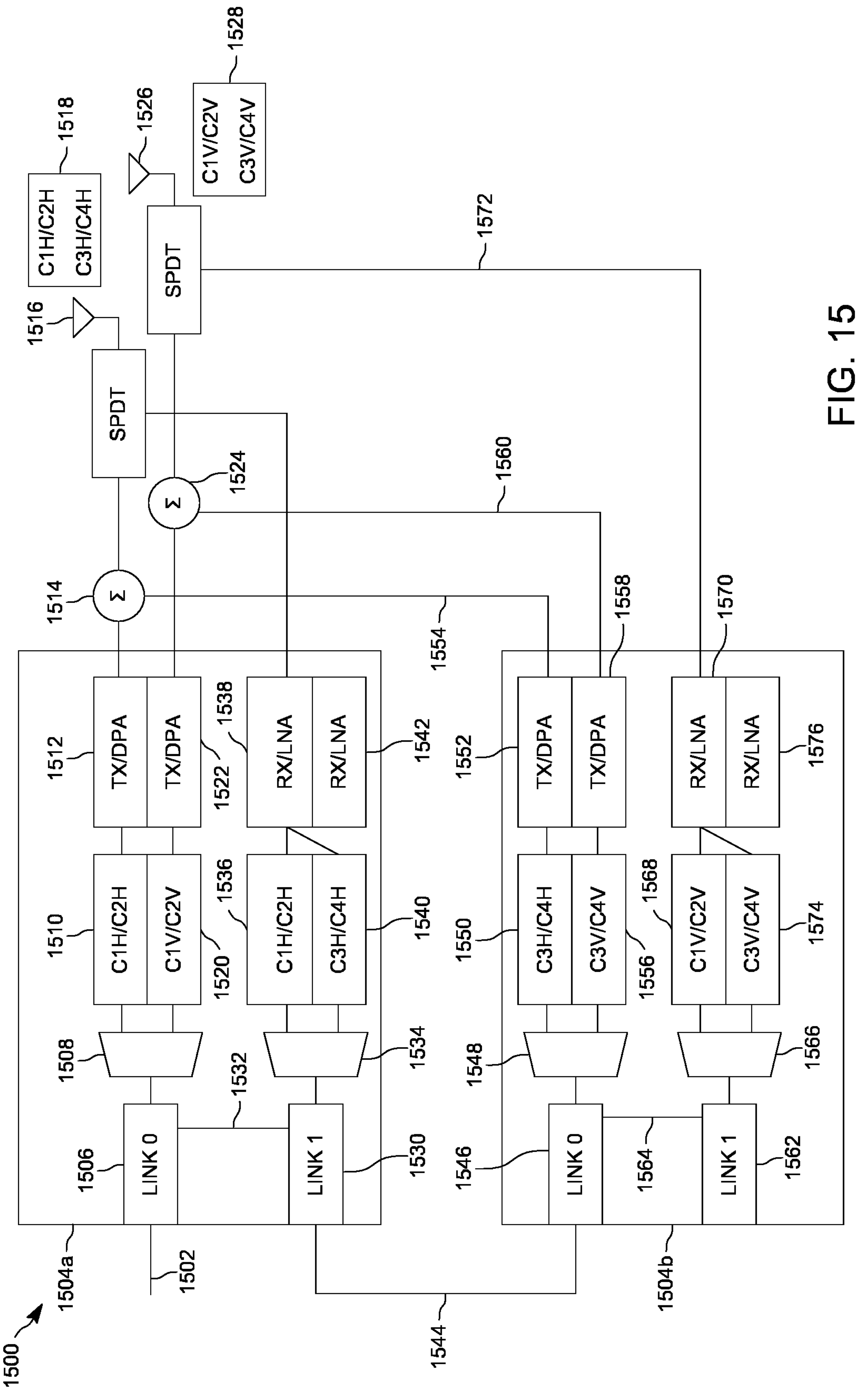
FIG. 15 shows signal processing flows through two serially connected transceiver devices of FIGS. 12, 13A and 13B to generate a four-carrier, dual-polarized communication signal, in accordance with some embodiments.

As a further illustration of other embodiments, FIG. 15 depicts a generalized configuration of example signal processing through two serially-connected transceiver devices of FIGS. 12 and 13 to generate a four-carrier, dual-polarized communication signal, in accordance with some embodiments. More specifically, FIG. 15 shows a transceiver device architecture 1500 including a first transceiver device 1504*a* and a second transceiver device 1504*b*. As in FIG. 14, in illustrative embodiments, the transceiver device is a transceiver IC and operates in a TDD mode within an OFDM modulation system such as a 5G or LTE-based communication system. Note that various principles of operation and nomenclature described in connection with FIG. 14 apply to the embodiment of FIG. 15, and hence some details of operation will be omitted or generalized for ease of discussion.

Referring to FIG. 15, the first transceiver device (IC) 1504*a* includes a first serial communication port 1506 (e.g., a first serial port transmitter/receiver, such a Serdes transmitter/receiver) (denoted as "Link 0" in FIG. 15) and a second serial communication port 1530 (e.g., a second serial port transmitter/receiver, such a Serdes transmitter/receiver) (denoted as "Link 1" in FIG. 15). Similarly, the second transceiver device (IC) 1504*b* includes a first serial communication port 1546 (e.g., a first serial port transmitter/receiver, such a Serdes transmitter/receiver) (denoted as "Link 0" in FIG. 15) and a second serial communication port

1562 (e.g., a second serial port transmitter/receiver, such a Serdes transmitter/receiver) (denoted as "Link 1" in FIG. 15). The transceiver devices (ICs) 1504*a* and 1504*b* are serially-connected via a bi-directional serial data link 1544.

In some embodiments, the serial communication port 1506 may receive (e.g., from a beamformer processor), via the bi-directional serial data link 1502, IQ data packet streams (eight sets of IQ data, packetized in four carrier-specific H/V combinations, or packetized as eight separate data packet streams in the embodiment depicted) for DL transmission, where the packets include IQ subcarrier data for four different component carriers (hereinafter, "a carrier C1," a "carrier C2," a "carrier C3," and a "carrier C4") for each of horizontal (H) and vertical (V) polarizations. For sake of brevity, the combinations of four different carriers on the horizontal and vertical polarizations are denoted herein as "C1H," "C2H," "C3H," "C4H," "C1V," "C2V," "C3V," and "C4V," respectively. In an UL (uplink) direction, the serial communication port 1506 may receive data packet streams (e.g., eight multiplexed data packet streams) for each of the four carriers C1, C2, C3, and C4 for each of the two H and V polarizations, and transmit those (e.g., to the beamformer processor) via the same bi-directional serial data link 1502. In illustrative embodiments, the packets received at or transmitted from the serial port communication port 1506 contain frequency-domain digital IQ data.

In operation, in a DL transmit direction, the first transceiver IC (1504*a*) receives the packetized IQ data streams via the port 1506 for DL transmission. The first transceiver IC is configured to process data associated with the first two carriers, for each polarization, i.e., C1H, C2H, C1V, and C2V. Similar to the transmit operation described in connection with FIG. 14, the first transceiver IC performs signal processing to separate (via a de-multiplexer or a similar element (1508)) the received IQ data for the carriers C1 and C2 into respective data sets for two separate transmit paths: one stream of IQ data for a dual-carrier horizontally-polarized signal (C1H/C2H signal) and another stream of IQ data for a dual-carrier vertically-polarized signal (C1V/C2V signal). As generally shown by elements 1510 and 1520 (denoted as "C1H/C2H" and "C1V/C2"), as in FIG. 14, horizontal and vertical frequency-domain components for subcarriers of each respective component carrier C1 and C2 may be further split and processed by four separate iFFT/CP elements to generate four separate discrete time-domain baseband data signals (two for each component carrier and two for each signal polarization) that are subsequently pairwise added in time, where the results of the signal addition (C1H+C2H, and C1V+C2V) are provided to respective TX/DPA elements 1512 and 1522 to generate a modulated and amplified analog RF signal C1H/C2H for a horizontal signal port of transceiver IC 1504*a* and an amplified analog RF signal C1V/C2V for a vertical signal port of transceiver IC 1504*a*.

Unlike the embodiment of FIG. 14, the packet data associated with the other two carriers C3 and C4 received at the port 1506 are forwarded to the second transceiver IC (1504*b*) for processing. More specifically, the first transceiver IC may be configured to forward the IQ data packets for the carriers C3 and C4, for each polarization, i.e., C3H, C4H, C3V, and C4V, to the second transceiver IC 1504*b* for processing. In some embodiments, different carrier packets destined for either the first or second transceiver IC may contain unique carrier IDs and be addressed to the respective transceiver ICs through one or more identification fields in the IQ data packets. Hence the first transceiver may be configured to examine the incoming packets to determine which packets are intended for the first transceiver IC and which packets are to be forwarded to the second transceiver IC.

In some embodiments, the first transceiver IC may forward those packets over an internal path 1532 to its second serial communication port 1530 that is serially interconnected over the serial data link 1544 with the second transceiver ICs (namely, the serial communication port 1546 within the second transceiver IC). The second transceiver IC performs similar signal processing as that of the first transceiver IC via elements 1548, 1550, 1556, 1552, and 1558 (but with respect to the carriers C3 and C4) to output amplified analog RF signal C3H/C4H and C3V/C4V on the two signal ports of transceiver IC 1504*b*.

Subsequently, (i) the two signals C1H/C2H and C3H/C4H for the horizontal polarization may be combined via a summing element 1514 to produce a combined signal 1518 that is provided, via a first SPDT, to the radiating element 1516 for transmission, while (ii) the two signals C1V/C2V and C3V/C4V for the vertical polarization may be combined via a summing element 1524 to produce a combined signal 1528 that is provided, via a second SPDT, to the radiating element 1526 for transmission.

Similarly, in a receive direction, data-modulated four-carrier, dual-polarized RF uplink signals may be received by the two serially-connected transceiver ICs (1504*a* and 1504*b*) via the radiating elements 1516 and 1526 corresponding to the horizontal and vertical signal ports, respectively. As in FIG. 14, for ease of discussion and merely for the sake of example, assume that the analog RF signal C1H/C2H/C3H/C4H (1518) and the analog RF signal C1V/C2V/C3V/C4V (1628) are now the received uplink signals.

As shown in FIG. 15, the RF signal (1518) received on the horizontally polarized antenna element 1516 is provided, via the respective SPDT, to RX/LNA element 1538 within the first transceiver IC (1504*a*), while the RF signal (1528) received on the vertically-polarized antenna element is provided, via the respective SPDT, to RX/LNA element 1570 within the second transceiver IC (1504*b*). Similar to the processing illustrated in FIG. 14, each of the respective horizontal and vertical receive RX/LNA chains may be configured to perform RF to baseband signal conversion, analog to digital signal conversion, etc. to output a first four-carrier discrete time-domain domain signal on the horizontal receive path and a second four-carrier discrete time-domain domain signal on the vertical path. Hence, in some embodiments, the output of the RX/LNA 1538 element may be the first four-carrier discrete time-domain signal on the horizontally-polarized receive path and the output of the RX/LNA element 1570 the second four-carrier discrete time-domain signal on the vertically-polarized receive path. Note that, in this embodiment, each transceiver IC processes four component carriers in one of the RX/LNA elements, while the other RX/LNA elements (1542, 1576) is disabled.

Referring back to the signal processing illustrated in FIG. 15, with respect to the horizontal polarization, the output of the RX/LNA element 1538 includes discrete time-domain baseband data signals 1536 and 1540 to be processed on two separate signal-processing branches, with (i) the carriers C1 and C2, denoted as C1H/C2H (1536), being processed on one branch, and (ii) the carriers C3 and C4, denoted as C3H/C4H (1540), being processed on the other branch. Similarly, with respect to the vertical polarization, the output of the RX/LNA element 1570 may include discrete time-domain baseband data signals 1568 and 1574 to be processed on two separate signal-processing branches, with (i)

the carriers C1 and C2, denoted as C1V/C2V (1568), being processed on one branch, and the carriers C3 and C4, denoted as C3V/C4V (1574), being processed on the other branch.

Various principles of operation of receive signal processing (including a conversion from time-domain signal to frequency-domain IQ data), as described in connection with FIG. 14, will similarly apply on the receive path of the arrangement of FIG. 15 and will not be repeated here in detail. To illustrate, in some embodiments, the received C1H/C2H signal (1536) for the horizontal polarization may be separated from C3H/C4H by time domain FIR filtering, notch filtering, and the like, and further separated into the constituent component carriers C1H and C2H by time-domain filtering in one signal path to remove C2H components to obtain C1H, while another path includes complex multiplication via a numerically controlled oscillator (NCO) frequency to shift the C2H component to a desired baseband signal, followed by additional filtering to remove the residual components of C1H. Thus, one transceiver IC 1504*a* may receive four component carriers on a single receive RF signal port (e.g., via either one of the H or V polarized antenna elements) and resolve the signal into four separate component carriers. In the embodiment shown, the four separate component carriers C1H, C2H, C3H, C4H are all separated using time domain signal processing, which are then sent to four separate FFT operations (all performed by a single DSP processor, in some embodiments) for time-domain to frequency-domain conversion. Similarly, the C1V/C2V/C3V/C4V signal (1528) for the vertical polarization, initially processed by a single LNA and ADC 1570, is processed via filtering, frequency offset (i.e., NCO modulation), and further filtering, to be conditioned for four separate FFT operations for time-domain to frequency-domain conversion. Although not explicitly shown, other time-to-frequency pre-conversion signal processing may include, e.g., sample rate sample rate conversion, filtering, cyclic prefix detection and removal, etc., as described hereinabove.

Following the time-to-frequency domain conversion, the elements 1534 and 1566 (on the horizontal and vertical path, respectively) subsequently route and/or store in memory, the IQ data points for the subcarriers associated with individual component carriers C1, C2, C3, and C4 for each respective polarization (H or V). The frequency-domain IQ data for all four component carriers, for each polarization, may be further combined into packet data streams (e.g., eight packet data streams, or four combined V/H packet streams) for transmission from the two serially-connected transceiver ICs (1504*a* and 1504*b*) over the bi-directional serial link 1502 (e.g., to the beamformer processor).

More specifically, in this regard, the frequency domain IQ packet data corresponding to vertically-polarized signals for the four carriers C1, C2, C3 and C4 may be received at the serial-communication port 1562 of the second (transceiver IC (1504*b*). The second transceiver IC may be configured to forward those data packets over an internal link 1564 to its other serial-communication port 1546 that is serially interconnected over the serial data link 1544 with the first transceiver ICs (namely, the serial communication port 1530 within first transceiver IC). Although not explicitly shown in FIG. 15, in some embodiments, the packet data output by the element 1534 (for the horizontal polarization for all four carriers C1, C2, C3, C4) may be combined by multiplexing the packet data corresponding to vertically-polarized signals for the four carriers C1, C2, C3 and C4 that is received at the serial-communication port 1530 to produce IQ data packet streams to be sent onto the data link 1532 to the serial data link transceiver 1506 for communication to the beamformer processor via the serial-communication link 1502.

Note that in the embodiment of FIG. 15, the DL and UL signal processing is not performed symmetrically across the serially-connected transceiver ICs: the DL transmit signal processing is divided according to the component carriers (both H and V polarities of C1 and C2 being processed in transceiver IC 1504*a*, and both polarities of C3 and C4 being processed in transceiver IC 1504*b*), while UL receive signal processing is divided according to the polarity (all H polarities of C1, C2, C3, and C4 being processed by transceiver IC 1504*a*, and all V polarities of C1, C2, C3, and C4 being processed by transceiver IC 1504*b*). This has the advantage on the transmit side of relaxing the bandwidth requirements on the transmit modulator to span only two component carriers (C1, C2 being processed in transceiver IC 1504*a*, and C3, C4 being processed in transceiver IC 1504*b*), while having the advantage on the receive side of not splitting the receive signal to two different signal ports of the two different transceiver ICs prior to processing via downconversion and sampling via an ADC. Thus, in the embodiment described, a dual-polarized four-component-carrier system may be implemented using the wideband capabilities of the receiver portions of the transceiver IC to process a receive signal having a bandwidth of four component carriers, while also relaxing the transmit modulator/amplifier bandwidth requirements to accommodate a transmit signal having a bandwidth of only two component carriers.

The invention claimed is:

1. An apparatus comprising:

a primary beamformer processor in a radio unit (RU), the primary beamformer processor configured to receive user data layers containing a set of frequency-domain in-phase and quadrature (IQ) data points over a user-plane interface and a beamforming matrix over a control-plane interface, the primary beamformer processor configured to partition the beamforming matrix into a plurality of beamforming submatrices, each beamforming submatrix containing beamforming combining weights associated with antenna elements in a respective region of an antenna array;

a plurality of distributed secondary beamformer processors connected to the primary beamformer processor, each of the plurality of distributed secondary beamformer processors being physically distributed adjacent or within, and associated with, a respective one of the regions of the antenna array and further configured to receive a respective one of the plurality of beamforming submatrices from the primary beamformer processor; and a plurality of sets of serially-connected transceiver integrated circuits (ICs) connected to the plurality of distributed secondary beamformer processors, wherein:

each set of serially-connected transceiver ICs is connected to a corresponding one of the plurality of distributed secondary beamformer processors and is positioned within the respective region of the antenna array associated with the corresponding secondary beamformer processor, the transceiver ICs in a given set of serially-connected transceiver ICs interconnected via serial digital data interfaces for exchanging frequency-domain IQ data points between the transceiver ICs and each distributed secondary beamformer processor is configured to receive the set of frequency-domain IQ data points, and to process the respective set of frequency-domain IQ data points according to the respective beamforming submatrix to form a respective plurality of sets of beamformed frequency-domain IQ data points.

2. The apparatus of claim 1, wherein the primary beamformer processor is configured as a transmit beamformer processor and wherein the distributed secondary beamformer processors are configured as secondary transmit beamformer processors with beamforming submatrix for transmit beamforming, and the secondary transmit beamformers generate beamformed frequency-domain IQ data points.

3. The apparatus of claim 1, wherein the primary beamformer processor is configured as a primary receive beamformer processor and the plurality of distributed secondary receive beamformer processors are configured as secondary receive beamformer processors and are configured with beamforming submatrices for receive beamforming, and wherein the frequency-domain IQ data points are received frequency-domain IQ data from the sets of serially-connected transceiver ICs, and the secondary transmit beamformers are configured to generate partially beamformed frequency-domain IQ data points and the primary receive beamformer processor is configured to combine corresponding sets of receive partial beamformed frequency-domain IQ data points received from all secondary receive beamformer processors to form a plurality of fully beamformed frequency-domain subcarrier IQ user data layers.

4. The apparatus of claim 3, wherein the primary receive beamformer processor is configured to partition a receive beamforming matrix of beamforming combining weights into the plurality of receive beamforming submatrices, and to transmit each respective receive beamforming submatrix to a corresponding one of the plurality of secondary receive beamformer processors.

5. The apparatus of claim 3, wherein each distributed secondary receive beamformer processor is further configured to form the respective plurality of sets of partial beamformed frequency domain IQ data points by applying the receive beamforming combining weights of the respective receive beamforming submatrix to the set of frequency domain IQ data points.

6. A method comprising:

receiving, at a primary beamformer processor, a beamforming matrix over a control-plane interface, and responsively partitioning the beamforming matrix into a plurality of receive beamforming submatrices, each beamforming submatrix containing beamforming combining weights associated with antenna elements in a respective region of an antenna array;

receiving, at each of a plurality of distributed secondary receive beamformer processors connected to the primary receive beamformer processor, a respective set of frequency-domain in-phase and quadrature (IQ) data points from a corresponding one of a plurality of sets of serially-connected transceiver integrated circuits (ICs) interconnected via serial digital data interfaces for exchanging frequency-domain IQ data between the transceiver ICs in a given set of serially-connected transceiver ICs, wherein each of the plurality of secondary receive beamformer processors are associated with a respective one of the regions of the antenna array, and wherein the corresponding set of serially-connected transceiver ICs is positioned within the respective region of the antenna array associated with the secondary receive beamformer processor;

using, by each secondary receive beamformer processor, the respective set of frequency-domain IQ data points and the respective receive beamforming submatrix to form a respective plurality of sets of receive partial beamformed frequency-domain IQ data points; and transmitting, by each distributed secondary receive beamformer processor, the respective plurality of sets of receive partial beamformed frequency-domain IQ data points to the primary receive beamformer processor.

7. The method of claim 6, further comprising combining, by the primary receive beamformer processor, corresponding sets of receive partial beamformed frequency-domain IQ data points received from all of the plurality of distributed secondary receive beamformer processors to form a plurality of frequency domain IQ user data layers.

8. The method of claim 6, further comprising partitioning, by the primary receive beamformer processor, a receive beamforming matrix of beamforming combining weights into the plurality of receive beamforming submatrices, and to transmit each respective receive beamforming submatrix to a corresponding one of the plurality of secondary receive beamformer processors.

9. A method comprising:

at a primary transmit beamforming processor, partitioning a transmit beamforming matrix of beamforming combining weights into a plurality of transmit beamforming submatrices, each transmit beamforming submatrix containing transmit beamforming combining weights associated with antenna elements in a respective region of an antenna array;

providing (i) the transmit beamforming submatrices and (ii) one or more frequency-domain in-phase and quadrature (FDIQ) user data layers, to a plurality of secondary transmit beamformer processors connected to the transmit primary beamforming processor, each secondary transmit beamformer processor receiving a respective one of the transmit beamforming submatrices; and, calculating, at each secondary transmit beamformer processor, beamformed transmit FDIQ data packets based on the respective transmit beamforming submatrix and the one or more FDIQ user data layers; and, transmitting the beamformed transmit FDIQ data packets to a plurality of sets of serially-connected transceiver integrated circuits (ICs) interconnected via serial digital data interfaces for exchanging frequency-domain IQ data between the transceiver ICs in a given set of serially-connected transceiver ICs, each set of serially-connected transceiver integrated circuits positioned within the respective region of the array panel and connected to a corresponding secondary transmit beamformer processor of the plurality of secondary transmit beamformer processors.

10. The method of claim 9 wherein the primary transmit beamformer processor is configured to transmit the transmit beamforming submatrices to corresponding secondary transmit beamformer processors, and to transmit frequency-domain subcarrier IQ user data layers to all of the distributed secondary transmit beamformer processors.

11. The method of claim 10 wherein each distributed secondary transmit beamformer processor is configured to receive the frequency-domain subcarrier IQ user data layers and the respective transmit beamforming submatrix and to calculate sets of beamformed frequency domain IQ data points by applying the respective beamforming weights of the beamforming submatrix to the IQ user data layers, and to distribute the beamformed frequency domain IQ data point sets to respective sets of serially-connected transceiver ICs that are arranged in transceiver IC subarrays located within the secondary beamformer processor's respective region.

* * * * *